United States Patent [19]
Shiraishi et al.

[11] Patent Number: 5,341,468
[45] Date of Patent: Aug. 23, 1994

[54] IMAGE PROCESSOR

[75] Inventors: Naoto Shiraishi, Minoo; Tatsuya Fujii, Nishinomiya, both of Japan

[73] Assignee: Ricoh Company, Ltd., Tokyo, Japan

[21] Appl. No.: 823,892

[22] Filed: Jan. 22, 1992

[30] Foreign Application Priority Data

| Jan. 28, 1991 | [JP] | Japan | 3-26914 |
| Jan. 28, 1991 | [JP] | Japan | 3-26915 |
| Apr. 3, 1991 | [JP] | Japan | 3-98129 |
| Apr. 3, 1991 | [JP] | Japan | 3-98130 |
| Sep. 5, 1991 | [JP] | Japan | 3-254573 |

[51] Int. Cl.[5] .................. G06F 15/64
[52] U.S. Cl. .................. 395/132; 395/129
[58] Field of Search ........ 395/133, 134, 162, 141, 395/142, 143, 121, 122; 340/797, 750; 345/114, 118, 147

[56] References Cited

U.S. PATENT DOCUMENTS

| 3,927,948 | 12/1975 | Cox et al. | 364/512 X |
| 4,181,954 | 1/1980 | Rosenthal et al. | 364/512 X |
| 4,388,610 | 6/1983 | Tsunekawa | 382/8 |
| 4,519,026 | 5/1985 | Nozawa et al. | 364/474.25 |
| 4,530,046 | 7/1985 | Munekata et al. | 364/474.24 X |
| 4,586,145 | 4/1986 | Bracewell et al. | 364/512 |
| 4,618,924 | 10/1986 | Hinds | 364/474.05 X |
| 4,642,754 | 2/1987 | Kishi et al. | 364/474.01 X |
| 4,727,496 | 2/1988 | Ryouki | 364/474.25 X |
| 4,788,636 | 11/1988 | Shiratori et al. | 364/474.25 X |
| 4,792,889 | 12/1988 | Kragelin et al. | 364/474.24 X |
| 4,802,083 | 1/1989 | Isobe et al. | 364/474.24 X |
| 4,815,009 | 3/1989 | Blatin | 364/518 |
| 4,933,865 | 6/1990 | Yamamoto et al. | 364/518 |
| 4,951,227 | 8/1990 | Todd | 364/518 |
| 5,129,051 | 7/1992 | Cain | 395/133 |
| 5,216,516 | 6/1993 | Tanaka et al. | 358/426 |
| 5,222,204 | 6/1993 | Swanson | 395/127 |

*Primary Examiner*—Phu K. Nguyen
*Attorney, Agent, or Firm*—Cooper & Dunham

[57] ABSTRACT

An image processor has an end point memory for storing two end point information of X and Y constituting a polygon and respective end point information of internal pattern information; an outline processor for performing outline processings of address information of an outline of the polygon and the internal pattern information corresponding to the polygon on the basis of the two end point information and the respective end point information of the internal pattern information from the end point memory; an internal figure-drawing processor for calculating an address between two opposite polygonal sides calculated by the outline processor on the basis of the outline address information, the internal figure-drawing processor calculating an address of the internal pattern information corresponding to the polygonal outline; and a display for displaying image information of a figure. An image is displayed by deforming an internal pattern shown by the internal pattern information based on contour point information of a supplied figure.

15 Claims, 72 Drawing Sheets

Fig. 12

START

READ X-STARTING POINT ADDRESS, Y-STARTING POINT ADDRESS, X-STARTING POINT ADDRESS AND Y-STARTING POINT ADDRESS OF MAPPING PATTERN, Z-VALUE FROM END POINT MEMORY, AND SET THESE ADDRESSES AND Z-VALUE TO RAM

READ Y-TERMINAL POINT ADDRESS FROM END POINT MEMORY
CALCULATE W2 = Y-TERMINAL POINT − Y-STARTING POINT
SET VALUE W2 TO REGISTER 125
SET Y-STARTING POINT ADDRESS TO BSYL-REGISTER
WRITE Y-TERMINAL POINT ADDRESS TO RAM 115 AS Y-STARTING POINT ADDRESS

READ X-TERMINAL POINT ADDRESS FROM END POINT MEMORY
CALCULATE W1 = (X-TERMINAL POINT − X-STARTING POINT)/DY
SET VALUE W1 TO BDDX-REGISTER
SET X-STARTING POINT ADDRES TO BSXL-REGISTER
WRITE X-TERMINAL POINT ADDRESS TO RAM 115 AS X-STARTING POINT ADDRESS

READ X-TERMINAL POINT ADDRESS OF MAPPING PATTERN FROM END POINT MEMORY     CALCULATE W1 = (X-TERMINAL POINT OF MAPPING PATTERN − X-STARTING POINT OF MAPPING PATTERN)/DY
SET VALUE W1 TO BDDMX-REGISTER
SET X-STARTING POINT ADDRESS OF MAPPING PATTERN TO BMXL-REGISTER
WRITE X-TERMINAL POINT ADDRESS OF MAPPING PATTERN TO RAM 115 AS X-STARTING POINT

READ Y-TERMINAL POINT ADDRESS OF MAPPING PATTERN FROM END POINT MEMORY     CALCULATE W1 = (Y-TERMINAL POINT OF MAPPING PATTERN − Y-STARTING POINT OF MAPPING PATTERN)/DY
SET VALUE W1 TO BDDMY-REGISTER
SET Y-STARTING POINT ADDRESS OF MAPPING PATTERN TO BMYI-REGISTER
WRITE Y-TERMINAL POINT ADDRESS OF MAPPING PATTERN TO RAM 115 AS Y-STARTING POINT

TRANSFER Z-VALUE TO BZ-REGISTER

RUN = 1 ? — Y

| Y-ADDRESS | 1 | | 2 | |
|---|---|---|---|---|
| | LEFT-HAND INTERSECTION POINT | RIGHT-HAND INTERSECTION POINT | LEFT-HAND INTERSECTION POINT | RIGHT-HAND INTERSECTION POINT |
| 0 | | | | |
| 1 | | | | |
| 2 | 5 | 5 | 7 | 7 |
| 3 | 1 | 5 | 6 | 9 |
| 4 | 1 | 5 | 5 | 10 |
| 5 | 1 | 6 | 4 | 12 |
| 6 | 1 | 6 | 3 | 12 |
| 7 | 1 | 6 | 2 | 12 |
| 8 | 2 | 7 | 4 | 11 |
| 9 | 2 | 7 | 7 | 11 |
| 10 | 2 | 7 | 9 | 11 |
| 11 | 2 | 2 | 11 | 11 |
| 12 | | | | |

Fig. 21

| Y-ADDRESS | 1 | | | | 2 | | | |
|---|---|---|---|---|---|---|---|---|
| | MX | | MY | | MX | | MY | |
| | LEFT-HAND INTERSECTION POINT | RIGHT-HAND INTERSECTION POINT | LEFT-HAND INTERSECTION POINT | RIGHT-HAND INTERSECTION POINT | LEFT-HAND INTERSECTION POINT | RIGHT-HAND INTERSECTION POINT | LEFT-HAND INTERSECTION POINT | RIGHT-HAND INTERSECTION POINT |
| 0 | | | | | | | | |
| 1 | | | | | | | | |
| 2 | 6 | 6 | 1 | 1 | 1 | 1 | 1 | 1 |
| 3 | 1 | 6 | 1 | 1 | 1 | 2 | 2 | 1 |
| 4 | 1 | 6 | 1 | 2 | 1 | 4 | 3 | 1 |
| 5 | 1 | 6 | 2 | 2 | 1 | 6 | 4 | 1 |
| 6 | 1 | 6 | 2 | 3 | 1 | 6 | 5 | 2 |
| 7 | 1 | 6 | 3 | 4 | 1 | 6 | 6 | 3 |
| 8 | 1 | 6 | 4 | 4 | 2 | 6 | 6 | 3 |
| 9 | 1 | 6 | 4 | 5 | 3 | 6 | 6 | 4 |
| 10 | 1 | 6 | 5 | 6 | 5 | 6 | 6 | 5 |
| 11 | 1 | 1 | 6 | 6 | 6 | 6 | 6 | 6 |
| 12 | | | | | | | | |

Fig. 22

| Z-VALUE / Y-ADDRESS | 1 | 2 |
|---|---|---|
| 0 | | |
| 1 | | |
| 2 | 5 | 10 |
| 3 | 5 | 10 |
| 4 | 5 | 10 |
| 5 | 5 | 10 |
| 6 | 5 | 10 |
| 7 | 5 | 10 |
| 8 | 5 | 10 |
| 9 | 5 | 10 |
| 10 | 5 | 10 |
| 11 | 5 | 10 |
| 12 | | |

Fig. 23

| Y-ADDRESS | 1 LEFT-HAND INTERSECTION POINT | 1 RIGHT-HAND INTERSECTION POINT | 2 LEFT-HAND INTERSECTION POINT | 2 RIGHT-HAND INTERSECTION POINT | n RIGHT-HAND INTERSECTION POINT |
|---|---|---|---|---|---|
| Y-ADDRESS 1 | X-ADDRESS | X-ADDRESS | X-ADDRESS | X-ADDRESS | X-ADDRESS |
| 2 | | | | | |
| 3 | | | | | |
| ⋮ | | | | | |
| 400 | | | | | |

Fig. 24

| Y-ADDRESS | 1 LEFT-HAND INTERSECTION POINT | 1 RIGHT-HAND INTERSECTION POINT | 2 LEFT-HAND INTERSECTION POINT | 2 RIGHT-HAND INTERSECTION POINT | | n RIGHT-HAND INTERSECTION POINT |
|---|---|---|---|---|---|---|
| Y-ADDRESS | POINT | POINT | POINT | POINT | | POINT |
| Y-ADDRESS 1 2 3 ⋮ 400 | MAPPING MEMORY XY-ADDRESS | MAPPING MEMORY XY-ADDRESS | | | | |

Fig. 25

| Y-ADDRESS | 1 Z-VALUE | 2 Z-VALUE | | n Z-VALUE |
|---|---|---|---|---|
| Y-ADDRESS 1 2 3 ⋮ 400 | Z-VALUE | Z-VALUE | | Z-VALUE |

Fig. 26

| | | SCREEN X-COORDINATE | SCREEN Y-COORDINATE | MAPPING PATTERN X-COORDINATE | MAPPING PATTERN Y-COORDINATE | POLYGONAL Z-VALUE |
|---|---|---|---|---|---|---|
| POLYGON 1 | END POINT 1 | 5 | 2 | 6 | 1 | 5 |
| | END POINT 2 | 1 | 3 | 1 | 1 | 5 |
| | END POINT 3 | 2 | 11 | 1 | 6 | 5 |
| | END POINT 4 | 7 | 10 | 6 | 6 | 5 |
| POLYGON 2 | END POINT 1 | 7 | 2 | 6 | 1 | 10 |
| | END POINT 2 | 2 | 7 | 1 | 1 | 10 |
| | END POINT 3 | 11 | 11 | 1 | 6 | 10 |
| | END POINT 4 | 12 | 5 | 6 | 6 | 10 |

Fig. 28
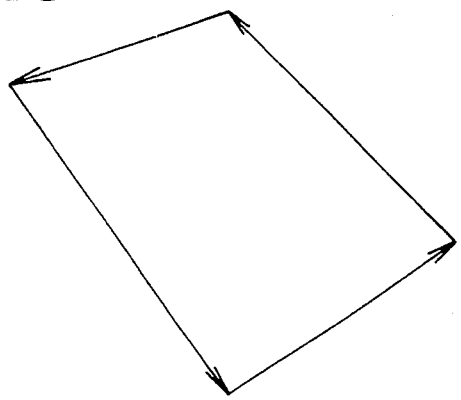
Fig. 29
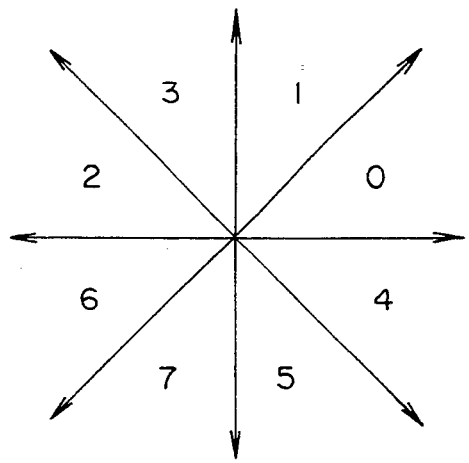
Fig. 30
| DIRECTIONAL VECTOR | SIDES |
|---|---|
| 0 | RIGHT-HAND SIDE |
| 1 | RIGHT-HAND SIDE |
| 2 | RIGHT-HAND SIDE |
| 3 | RIGHT-HAND SIDE |
| 4 | LEFT-HAND SIDE |
| 5 | LEFT-HAND SIDE |
| 6 | LEFT-HAND SIDE |
| 7 | LEFT-HAND SIDE |

| | X-STARTING POINT ADD. | X-TERMINAL POINT ADD. | COLOR |
|---|---|---|---|
| POLYGON 1 | 1 | 7 | 1 |
| POLYGON 2 | 2 | 3 | 2 |
| POLYGON 3 | 3 | 8 | 3 |
| POLYGON 4 | 0 | 9 | 4 |

Fig. 35

| X-ADDRESS | 0 | 1 | 2 | 3 | 4 | 5 | 6 | 7 | 8 | 9 |
|---|---|---|---|---|---|---|---|---|---|---|
| MASK BIT | 0 | 0 | 0 | 0 | 0 | 0 | 0 | 0 | 0 | 0 |
| X-TERMINAL POINT ADDRESS | 0 | 0 | 0 | 0 | 0 | 0 | 0 | 0 | 0 | 0 |
| COLOR | 0 | 0 | 0 | 0 | 0 | 0 | 0 | 0 | 0 | 0 |

Fig. 36

| X-ADDRESS | 0 | 1 | 2 | 3 | 4 | 5 | 6 | 7 | 8 | 9 |
|---|---|---|---|---|---|---|---|---|---|---|
| MASK BIT | 0 | 1 | 1 | 1 | 1 | 1 | 1 | 1 | 0 | 0 |
| X-TERMINAL POINT ADDRESS | 0 | 7 | 7 | 7 | 7 | 7 | 7 | 7 | 0 | 0 |
| COLOR | 0 | 1 | 1 | 1 | 1 | 1 | 1 | 1 | 0 | 0 |

Fig. 37

| X-ADDRESS | 0 | 1 | 2 | 3 | 4 | 5 | 6 | 7 | 8 | 9 |
|---|---|---|---|---|---|---|---|---|---|---|
| MASK BIT | 0 | 1 | 1 | 1 | 1 | 1 | 1 | 1 | 0 | 0 |
| X-TERMINAL POINT ADDRESS | 0 | 7 | 7 | 7 | 7 | 7 | 7 | 7 | 0 | 0 |
| COLOR | 0 | 1 | 1 | 1 | 1 | 1 | 1 | 1 | 0 | 0 |

Fig. 38

| X-ADDRESS | 0 | 1 | 2 | 3 | 4 | 5 | 6 | 7 | 8 | 9 |
|---|---|---|---|---|---|---|---|---|---|---|
| MASK BIT | 0 | 1 | 1 | 1 | 1 | 1 | 1 | 1 | 1 | 0 |
| X-TERMINAL POINT ADDRESS | 0 | 7 | 7 | 7 | 7 | 7 | 7 | 7 | 8 | 0 |
| COLOR | 0 | 1 | 1 | 1 | 1 | 1 | 1 | 1 | 3 | 0 |

Fig. 39

| X-ADDRESS | 0 | 1 | 2 | 3 | 4 | 5 | 6 | 7 | 8 | 9 |
|---|---|---|---|---|---|---|---|---|---|---|
| MASK BIT | 1 | 1 | 1 | 1 | 1 | 1 | 1 | 1 | 1 | 1 |
| X-TERMINAL POINT ADDRESS | 9 | 7 | 7 | 7 | 7 | 7 | 7 | 7 | 8 | 9 |
| COLOR | 4 | 1 | 1 | 1 | 1 | 1 | 1 | 1 | 3 | 4 |

| | X-STARTING POINT ADDRESS | MASK MEMORY X-ADDRESS | MASK MEMORY Y-ADDRESS | X-TERMINAL POINT ADDRESS | MASK MEMORY X-ADDRESS | MASK MEMORY Y-ADDRESS |
|---|---|---|---|---|---|---|
| POLYGON 1 | 1 | 10 | 10 | 5 | 18 | 14 |
| POLYGON 2 | 2 | 150 | 10 | 3 | 155 | 20 |
| POLYGON 3 | 3 | 10 | 150 | 8 | 60 | 200 |
| POLYGON 4 | 0 | 150 | 150 | 9 | 240 | 240 |

Fig. 44

|  |  | 0 | 1 | 2 | 3 | 4 | 5 | 6 | 7 | 8 | 9 |
|---|---|---|---|---|---|---|---|---|---|---|---|
| MASK |  | 0 | 0 | 0 | 0 | 0 | 0 | 0 | 0 | 0 | 0 |
| MASK MEMORY ADDRESS | X |  | 10 | 12 | 14 | 16 | 18 |  |  |  |  |
|  | Y |  | 10 | 11 | 12 | 13 | 14 |  |  |  |  |
| MASK MEMORY ADDRESS OUTPUT | R |  | 1 | 1 | 1 | 1 | 1 |  |  |  |  |
|  | G |  | 1 | 1 | 1 | 1 | 1 |  |  |  |  |
|  | B |  | 1 | 1 | 1 | 1 | 1 |  |  |  |  |
| MEMORY VALUE | R |  | 1 | 1 | 1 | 1 | 1 |  |  |  |  |
|  | G |  | 1 | 1 | 1 | 1 | 1 |  |  |  |  |
|  | B |  | 1 | 1 | 1 | 1 | 1 |  |  |  |  |

Fig. 45

|  |  | 0 | 1 | 2 | 3 | 4 | 5 | 6 | 7 | 8 | 9 |
|---|---|---|---|---|---|---|---|---|---|---|---|
| MASK |  | 0 | 1 | 1 | 1 | 1 | 1 | 0 | 0 | 0 | 0 |
| MASK MEMORY ADDRESS | X |  |  | 150 | 155 |  |  |  |  |  |  |
|  | Y |  |  | 10 | 20 |  |  |  |  |  |  |
| MASK MEMORY ADDRESS OUTPUT | R |  |  | 2 | 2 |  |  |  |  |  |  |
|  | G |  |  | 2 | 2 |  |  |  |  |  |  |
|  | B |  |  | 2 | 2 |  |  |  |  |  |  |
| MEMORY VALUE | R |  | 1 | 1 | 1 | 1 | 1 |  |  |  |  |
|  | G |  | 1 | 1 | 1 | 1 | 1 |  |  |  |  |
|  | B |  | 1 | 1 | 1 | 1 | 1 |  |  |  |  |

Fig. 46

|  |  | 0 | 1 | 2 | 3 | 4 | 5 | 6 | 7 | 8 | 9 |
|---|---|---|---|---|---|---|---|---|---|---|---|
| MASK |  | 0 | 1 | 1 | 1 | 1 | 1 | 0 | 0 | 0 | 0 |
| MASK MEMORY ADDRESS | X |  |  | 10 | 20 | 30 | 40 | 50 | 60 |  |  |
|  | Y |  |  | 150 | 160 | 170 | 180 | 190 | 200 |  |  |
| MASK MEMORY ADDRESS OUTPUT | R |  |  | 3 | 3 | 3 | 3 | 3 | 3 |  |  |
|  | G |  |  | 3 | 3 | 3 | 3 | 3 | 3 |  |  |
|  | B |  |  | 3 | 3 | 3 | 3 | 3 | 3 |  |  |
| MEMORY VALUE | R |  | 1 | 1 | 1 | 1 | 1 | 3 | 3 | 3 |  |
|  | G |  | 1 | 1 | 1 | 1 | 1 | 3 | 3 | 3 |  |
|  | B |  | 1 | 1 | 1 | 1 | 1 | 3 | 3 | 3 |  |

Fig. 47

|  |  | 0 | 1 | 2 | 3 | 4 | 5 | 6 | 7 | 8 | 9 |
|---|---|---|---|---|---|---|---|---|---|---|---|
| MASK |  | 0 | 1 | 1 | 1 | 1 | 1 | 1 | 1 | 1 | 0 |
| MASK MEMORY ADDRESS | X | 150 | 160 | 170 | 180 | 190 | 200 | 210 | 220 | 230 | 240 |
|  | Y | 150 | 160 | 170 | 180 | 190 | 200 | 210 | 220 | 230 | 240 |
| MASK MEMORY ADDRESS OUTPUT | R | 4 |  |  |  |  |  |  |  |  | 4 |
|  | G | 4 |  |  |  |  |  |  |  |  | 4 |
|  | B | 4 |  |  |  |  |  |  |  |  | 4 |
| MEMORY VALUE | R | 4 | 1 | 1 | 1 | 1 | 1 | 3 | 3 | 3 | 4 |
|  | G | 4 | 1 | 1 | 1 | 1 | 1 | 3 | 3 | 3 | 4 |
|  | B | 4 | 1 | 1 | 1 | 1 | 1 | 3 | 3 | 3 | 4 |

Fig. 50

| | 0 | 1 | 2 | 3 | 4 | 5 | 6 | 7 | 8 | 9 |
|---|---|---|---|---|---|---|---|---|---|---|
| MASK | 0 | 0 | 0 | 0 | 0 | 0 | 0 | 0 | 0 | 0 |
| MASK MEMORY ADDRESS  X<br>Y | | | | | | | | | | |
| X-TERMINAL POINT ADDRESS | | | | | | | | | | |
| LINE MEMORY VALUE  R<br>G<br>B | | | | | | | | | | |

Fig. 51

| | 0 | 1 | 2 | 3 | 4 | 5 | 6 | 7 | 8 | 9 |
|---|---|---|---|---|---|---|---|---|---|---|
| MASK | 0 | 1 | 1 | 1 | 1 | 1 | 0 | 0 | 0 | 0 |
| MASK MEMORY ADDRESS  X<br>Y | | 10<br>10 | 12<br>11 | 14<br>12 | 16<br>13 | 18<br>14 | | | | |
| X-TERMINAL POINT ADDRESS | | 5 | 5 | 5 | 5 | 5 | | | | |
| LINE MEMORY VALUE  R<br>G<br>B | | 1<br>1<br>1 | 1<br>1<br>1 | 1<br>1<br>1 | 1<br>1<br>1 | 1<br>1<br>1 | | | | |

Fig. 52

|  |  | 0 | 1 | 2 | 3 | 4 | 5 | 6 | 7 | 8 | 9 |
|---|---|---|---|---|---|---|---|---|---|---|---|
| MASK | | 0 | 1 | 1 | 1 | 1 | 1 | 0 | 0 | 0 | 0 |
| MASK MEMORY ADDRESS | X | | | 150 | | | | | | | |
| | Y | | | 10 | | | | | | | |
| X-TERMINAL POINT ADDRESS | | | 5 | 5 | 5 | 5 | 5 | | | | |
| LINE MEMORY VALUE | R | | 1 | 1 | 1 | 1 | 1 | | | | |
| | G | | 1 | 1 | 1 | 1 | 1 | | | | |
| | B | | 1 | 1 | 1 | 1 | 1 | | | | |

Fig. 53

|  |  | 0 | 1 | 2 | 3 | 4 | 5 | 6 | 7 | 8 | 9 |
|---|---|---|---|---|---|---|---|---|---|---|---|
| MASK | | 0 | 1 | 1 | 1 | 1 | 1 | 1 | 1 | 1 | 0 |
| MASK MEMORY ADDRESS | X | | | | 10 | | | 40 | 50 | 60 | |
| | Y | | | | 150 | | | 180 | 190 | 200 | |
| X-TERMINAL POINT ADDRESS | | | 5 | 5 | 5 | 5 | 5 | 8 | 8 | 8 | |
| LINE MEMORY VALUE | R | | 1 | 1 | 1 | 1 | 1 | 3 | 3 | 3 | |
| | G | | 1 | 1 | 1 | 1 | 1 | 3 | 3 | 3 | |
| | B | | 1 | 1 | 1 | 1 | 1 | 3 | 3 | 3 | |

|  |  | 0 | 1 | 2 | 3 | 4 | 5 | 6 | 7 | 8 | 9 |
|---|---|---|---|---|---|---|---|---|---|---|---|
| MASK |  | 0 | 1 | 1 | 1 | 1 | 1 | 1 | 1 | 1 | 1 |
| MASK MEMORY ADDRESS | X | 100 |  |  |  |  |  |  |  |  | 240 |
|  | Y | 150 |  |  |  |  |  |  |  |  | 240 |
| X-TERMINAL POINT ADDRESS |  | 9 | 5 | 5 | 5 | 5 | 5 | 8 | 8 | 8 | 9 |
| LINE MEMORY VALUE | R | 4 | 1 | 1 | 1 | 1 | 1 | 3 | 3 | 3 | 4 |
|  | G | 4 | 1 | 1 | 1 | 1 | 1 | 3 | 3 | 3 | 4 |
|  | B | 4 | 1 | 1 | 1 | 1 | 1 | 3 | 3 | 3 | 4 |

|  | X-STARTING POINT ADDRESS | R | G | B | X-TERMINAL POINT ADDRESS | R | G | B |
|---|---|---|---|---|---|---|---|---|
| POLYGON 1 | 1 | 5 | 0 | 1 | 5 | 1 | 0 | 5 |
| 2 | 2 | 3 | 0 | 0 | 3 | 3 | 0 | 0 |
| 3 | 3 | 0 | 1 | 0 | 8 | 0 | 6 | 0 |
| 4 | 0 | 0 | 0 | 9 | 9 | 0 | 0 | 0 |

Fig. 62

| ADDRESS | | 0 | 1 | 2 | 3 | 4 | 5 | 6 | 7 | 8 | 9 |
|---|---|---|---|---|---|---|---|---|---|---|---|
| MASK | | 0 | 0 | 0 | 0 | 0 | 0 | 0 | 0 | 0 | 0 |
| SHADING | R | | 5 | 4 | 3 | 2 | 1 | | | | |
| | G | | 0 | 0 | 0 | 0 | 0 | | | | |
| | B | | 1 | 2 | 3 | 4 | 5 | | | | |
| MEMORY VALUE | R | | 5 | 4 | 3 | 2 | 1 | | | | |
| | G | | 0 | 0 | 0 | 0 | 0 | | | | |
| | B | | 1 | 2 | 3 | 4 | 5 | | | | |

Fig. 63

| ADDRESS | | 0 | 1 | 2 | 3 | 4 | 5 | 6 | 7 | 8 | 9 |
|---|---|---|---|---|---|---|---|---|---|---|---|
| MASK | | 0 | 1 | 1 | 1 | 1 | 1 | 0 | 0 | 0 | 0 |
| SHADING | R | | | 3 | 3 | | | | | | |
| | G | | | 0 | 0 | | | | | | |
| | B | | | 0 | 0 | | | | | | |
| MEMORY VALUE | R | | 5 | 4 | 3 | 2 | 1 | | | | |
| | G | | 0 | 0 | 0 | 0 | 0 | | | | |
| | B | | 1 | 2 | 3 | 4 | 5 | | | | |

Fig. 64

| ADDRESS | | 0 | 1 | 2 | 3 | 4 | 5 | 6 | 7 | 8 | 9 |
|---|---|---|---|---|---|---|---|---|---|---|---|
| MASK | | 0 | 1 | 1 | 1 | 1 | 1 | 0 | 0 | 0 | 0 |
| SHADING | R | | | | 0 | 0 | 0 | 0 | 0 | 0 | |
| | G | | | | 1 | 2 | 3 | 4 | 5 | 6 | |
| | B | | | | 0 | 0 | 0 | 0 | 0 | 0 | |
| MEMORY VALUE | R | | 5 | 4 | 3 | 2 | 1 | 0 | 0 | 0 | |
| | G | | 0 | 0 | 0 | 0 | 0 | 4 | 5 | 6 | |
| | B | | 1 | 2 | 3 | 4 | 5 | 0 | 0 | 0 | |

Fig. 65

| ADDRESS | | 0 | 1 | 2 | 3 | 4 | 5 | 6 | 7 | 8 | 9 |
|---|---|---|---|---|---|---|---|---|---|---|---|
| MASK | | 0 | 1 | 1 | 1 | 1 | 1 | 1 | 1 | 1 | 0 |
| SHADING | R | 0 | 0 | 0 | 0 | 0 | 0 | 0 | 0 | 0 | 0 |
|  | G | 0 | 0 | 0 | 0 | 0 | 0 | 0 | 0 | 0 | 0 |
|  | B | 9 | 8 | 7 | 6 | 5 | 4 | 3 | 2 | 1 | 0 |
| MEMORY VALUE | R | 0 | 5 | 4 | 3 | 2 | 1 | 0 | 0 | 0 | 0 |
|  | G | 0 | 0 | 0 | 0 | 0 | 0 | 4 | 5 | 6 | 0 |
|  | B | 9 | 1 | 2 | 3 | 4 | 5 | 0 | 0 | 0 | 0 |

Fig. 66

| X-ADDRESS | | 0 | 1 | 2 | 3 | 4 | 5 | 6 | 7 | 8 | 9 |
|---|---|---|---|---|---|---|---|---|---|---|---|
| MASK BIT | | 0 | 0 | 0 | 0 | 0 | 0 | 0 | 0 | 0 | 0 |
| X-TERMINAL POINT ADDRESS | | | | | | | | | | | |
|  | R | | | | | | | | | | |
|  | G | | | | | | | | | | |
|  | B | | | | | | | | | | |

Fig. 67

| X-ADDRESS | | 0 | 1 | 2 | 3 | 4 | 5 | 6 | 7 | 8 | 9 |
|---|---|---|---|---|---|---|---|---|---|---|---|
| MASK BIT | | 0 | 1 | 1 | 1 | 1 | 1 | 0 | 0 | 0 | 0 |
| X-TERMINAL POINT ADDRESS | | 0 | 5 | 5 | 5 | 5 | 5 | 0 | 0 | 0 | 0 |
|  | R | | 5 | 4 | 3 | 2 | 1 | | | | |
|  | G | | 0 | 0 | 0 | 0 | 0 | | | | |
|  | B | | 1 | 2 | 3 | 4 | 5 | | | | |

Fig. 68

| X-ADDRESS | 0 | 1 | 2 | 3 | 4 | 5 | 6 | 7 | 8 | 9 |
|---|---|---|---|---|---|---|---|---|---|---|
| MASK BIT | 0 | 1 | 1 | 1 | 1 | 1 | 0 | 0 | 0 | 0 |
| X-TERMINAL POINT ADDRESS | 0 | 5 | 5 | 5 | 5 | 5 | 0 | 0 | 0 | 0 |
| R | | 5 | 4 | 3 | 2 | 1 | | | | |
| G | | 0 | 0 | 0 | 0 | 0 | | | | |
| B | | 1 | 2 | 3 | 4 | 5 | | | | |

Fig. 69

| X-ADDRESS | 0 | 1 | 2 | 3 | 4 | 5 | 6 | 7 | 8 | 9 |
|---|---|---|---|---|---|---|---|---|---|---|
| MASK BIT | 0 | 1 | 1 | 1 | 1 | 1 | 1 | 1 | 1 | 0 |
| X-TERMINAL POINT ADDRESS | 0 | 5 | 5 | 5 | 5 | 5 | 8 | 8 | 8 | 0 |
| R | | 5 | 4 | 3 | 2 | 1 | 0 | 0 | 0 | |
| G | | 0 | 0 | 0 | 0 | 0 | 4 | 5 | 6 | |
| B | | 1 | 2 | 3 | 4 | 5 | 0 | 0 | 0 | |

Fig. 70

| X-ADDRESS | 0 | 1 | 2 | 3 | 4 | 5 | 6 | 7 | 8 | 9 |
|---|---|---|---|---|---|---|---|---|---|---|
| MASK BIT | 1 | 1 | 1 | 1 | 1 | 1 | 1 | 1 | 1 | 1 |
| X-TERMINAL POINT ADDRESS | 9 | 5 | 5 | 5 | 5 | 5 | 8 | 8 | 8 | 9 |
| R | 0 | 5 | 4 | 3 | 2 | 1 | 0 | 0 | 0 | 0 |
| G | 0 | 0 | 0 | 0 | 0 | 0 | 4 | 5 | 6 | 0 |
| B | 9 | 1 | 2 | 3 | 4 | 5 | 0 | 0 | 0 | 0 |

| IN | | | | | | | | OUT | | | | | | | | | | | | | | | | |
|---|---|---|---|---|---|---|---|---|---|---|---|---|---|---|---|---|---|---|---|---|---|---|---|---|
| 7 | 6 | 5 | 4 | 3 | 2 | 1 | 0 | 0 | 1 | 2 | 3 | 4 | 5 | 6 | 7 | 8 | 9 | 10 | 11 | 12 | 13 | 14 | 15 | 16 | 17 | 18 | ... | 318 | 319 |
| ○ | ○ | ○ | ○ | ○ | ○ | ○ | ○ | ○ | ○ | ○ | ○ | ○ | ○ | ○ | ○ | ○ | ○ | ○ | ○ | ○ | ○ | ○ | ○ | ○ | ○ | ○ | ... | ○ | ○ |
| ○ | ○ | ○ | ○ | ○ | ○ | ○ | ○ | ○ | ○ | ○ | ○ | ○ | ○ | ○ | ○ | ○ | ○ | ○ | ○ | ○ | ○ | ○ | ○ | ○ | ○ | ○ | ... | ○ | ○ |
| ○ | ○ | ○ | ○ | ○ | ○ | ○ | — | — | ○ | ○ | ○ | ○ | ○ | ○ | ○ | ○ | ○ | ○ | ○ | ○ | ○ | ○ | ○ | ○ | ○ | ○ | ... | ○ | ○ |
| ○ | ○ | ○ | ○ | ○ | ○ | — | — | — | — | ○ | ○ | ○ | ○ | ○ | ○ | ○ | ○ | ○ | ○ | ○ | ○ | ○ | ○ | ○ | ○ | ○ | ... | ○ | ○ |
| ○ | ○ | ○ | ○ | ○ | — | — | ○ | — | — | — | ○ | ○ | ○ | ○ | ○ | ○ | ○ | ○ | ○ | ○ | ○ | ○ | ○ | ○ | ○ | ○ | ... | ○ | ○ |
| ○ | ○ | ○ | ○ | — | — | ○ | ○ | — | — | — | — | ○ | ○ | ○ | ○ | ○ | ○ | ○ | ○ | ○ | ○ | ○ | ○ | ○ | ○ | ○ | ... | ○ | ○ |
| ○ | ○ | ○ | — | — | ○ | ○ | ○ | — | — | — | — | — | ○ | ○ | ○ | ○ | ○ | ○ | ○ | ○ | ○ | ○ | ○ | ○ | ○ | ○ | ... | ○ | ○ |
| ○ | ○ | — | — | ○ | ○ | ○ | ○ | — | — | — | — | — | — | ○ | ○ | ○ | ○ | ○ | ○ | ○ | ○ | ○ | ○ | ○ | ○ | ○ | ... | ○ | ○ |
| ○ | — | — | — | — | — | — | — | — | — | — | — | — | — | — | — | — | — | — | — | — | — | — | — | — | — | — | ... | — | — |
| ○ | ○ | — | — | — | — | — | — | — | — | — | — | — | — | — | — | — | — | — | — | — | — | — | — | — | — | — | ... | — | — |
| — | ○ | ○ | — | — | — | — | — | — | — | — | — | — | — | — | — | — | — | — | — | — | — | — | — | — | — | — | ... | — | — |

Fig. 88

| OUT \ IN | 0 | 1 | 2 | 3 | 4 | 5 | 6 | 7 | 8 | 9 | 10 | 11 | 12 | 13 | 14 | 15 | 16 | 17 | 18 | ... | 259 | 255 |
|---|---|---|---|---|---|---|---|---|---|---|---|---|---|---|---|---|---|---|---|---|---|---|
| 0 | — | × | × | × | × | × | × | × | × | × | × | × | × | × | × | × | × | × | × | ... | × | × |
| 1 | O | — | × | × | × | × | × | × | × | × | × | × | × | × | × | × | × | × | × | ... | × | × |
| 2 | O | O | — | × | × | × | × | × | × | × | × | × | × | × | × | × | × | × | × | ... | × | × |
| 3 | O | O | O | — | × | × | × | × | × | × | × | × | × | × | × | × | × | × | × | ... | × | × |
| 4 | O | O | O | O | — | × | × | × | × | × | × | × | × | × | × | × | × | × | × | ... | × | × |
| 5 | O | O | O | O | O | — | × | × | × | × | × | × | × | × | × | × | × | × | × | ... | × | × |
| 6 | O | O | O | O | O | O | — | × | × | × | × | × | × | × | × | × | × | × | × | ... | × | × |
| 7 | O | O | O | O | O | O | O | — | × | × | × | × | × | × | × | × | × | × | × | ... | × | × |
| 0 | O | O | O | O | O | O | O | O | — | × | × | × | × | × | × | × | × | × | × | ... | × | × |
| 1 | O | O | O | O | O | O | O | O | O | — | × | × | × | × | × | × | × | × | × | ... | × | × |
| 2 | O | O | O | O | O | O | O | O | O | O | — | × | × | × | × | × | × | × | × | ... | × | × |
| 3 | O | O | O | O | O | O | O | O | O | O | O | — | × | × | × | × | × | × | × | ... | × | × |
| 4 | O | O | O | O | O | O | O | O | O | O | O | O | — | × | × | × | × | × | × | ... | × | × |
| 5 | O | O | O | O | O | O | O | O | O | O | O | O | O | — | × | × | × | × | × | ... | × | × |
| 6 | O | O | O | O | O | O | O | O | O | O | O | O | O | O | — | × | × | × | × | ... | × | × |
| 7 | O | O | O | O | O | O | O | O | O | O | O | O | O | O | O | — | × | × | × | ... | × | × |
| — | O | O | O | O | O | O | O | O | O | O | O | O | O | O | O | O | O | O | O | ... | O | O |

Fig. 100

|  | SEGMENT | | MAPPING ADDRESS |
|---|---|---|---|

MODE 1  | 7 6 5 | 4 3 2 1 0 |

2 | 7 6 5 4 | 3 2 1 0 |

3 | 7 6 5 4 3 | 2 1 0 |

4 | 7 6 5 4 3 2 | 1 0 |

MSB ............................................................ LSB

Fig. 104

| Y ADDRESS \ | SCREEN X ADDRESS | | MAPPING X ADDRESS | | MAPPING Y ADDRESS | | SEGMENT | |
|---|---|---|---|---|---|---|---|---|
| | LEFT-HAND INTERSECTION POINT | RIGHT-HAND INTERSECTION POINT | LEFT-HAND INTERSECTION POINT | RIGHT-HAND INTERSECTION POINT | LEFT-HAND INTERSECTION POINT | RIGHT-HAND INTERSECTION POINT | H | L |
| 50 | 50 | 6 61 | 1 | 12 | | 1 | | |
| 51 | 50 | 6 61 | 1 | 12 | 2 | 2 | 0 | 0 |
| 52 | 50 | 6 61 | 1 | 12 | 3 | 3 | 0 | 0 |
| 53 | 50 | 6 61 | 1 | 12 | 4 | 4 | 0 | 0 |
| 54 | 50 | 6 61 | 1 | 12 | 5 | 5 | 0 | 0 |
| 55 | 50 | 6 61 | 1 | 12 | 6 | 6 | 0 | 0 |
| 56 | 50 | 6 61 | 1 | 12 | 7 | 7 | 0 | 0 |
| 57 | 50 | 6 61 | 1 | 12 | 8 | 8 | 0 | 0 |
| 58 | 50 | 6 61 | 1 | 12 | 9 | 9 | 0 | 0 |
| 59 | 50 | 6 61 | 1 | 12 | 10 | 10 | 0 | 0 |
| 60 | 50 | 6 61 | 1 | 12 | 11 | 11 | 0 | 0 |
| 61 | 50 | 6 61 | 1 | 12 | 12 | 12 | 0 | 0 |

IMAGE PROCESSOR

BACKGROUND OF THE INVENTION

1. Field of the Invention

The present invention relates to an image processor used in three-dimensional computer graphics such as a workstation, a game machine, etc. and capable of outputting an image signal based on polygonal image information in real time.

2. Description of the Related Art

An image processor synthesizes and outputs various kinds of image signals for a CRT display based on image information supplied from the exterior of the image processor. The image processor can synthesize and output a solid two-dimensional image signal, i.e., a pseudo three-dimensional image signal in addition to a two-dimensional plane image signal. Accordingly, for example, the image processor is widely used in a game machine for a three-dimensional image, computer graphics, etc.

A general image processor of this kind uses the technique of a bit mapping display (graphics display). Therefore, the image processor has a bit mapping memory having memory areas one-to-one corresponding to all pixels on a CRT screen. All pixel information displayed with respect to one picture are written to each of the memory areas of this bit mapping memory. For example, when an arbitrary figure is displayed in the computer graphics, etc., the contour of a polygon is drawn on the screen and the interior of this polygon is filled with a designated color written to the memory. Therefore, when the number of polygons is increased, a memory having a large capacity is required and it is impossible to process image information at the real time.

Japanese Patent Application Laying Open (KOKAI) No. 62-231379 (international patent class G06F 15/62) shows an image synthesizer which can synthesize and output an image signal at the real time on the basis of contour line information of a supplied figure. This image synthesizer has a contour point information memory means for sequentially writing and storing contour point information into a horizontal scanning memory area corresponding to each of horizontal scanning lines together with a priority of the contour point information. The contour point information are constructed by a pair of leftward and rightward contour points provided by making a contour line of the figure for a CRY display crossing each of the horizontal scanning lines. The contour point information are also constructed by accompanying data of this figure. The image synthesizer also has an index memory for reading the accompanying data included in the respective contour information in synchronization with a horizontal scanning signal from the horizontal scanning memory area corresponding to a vertical scanning position of the horizontal scanning signal. The read accompanying data are written and stored to the index memory at each of addresses thereof in accordance with a priority of the accompanying data. The image synthesizer also has a read address generating means for sequentially reading the contour point pair included in the respective contour information in synchronization with the horizontal scanning signal from the horizontal scanning memory area corresponding to the vertical scanning position. When a horizontal scanning operation is performed in a region designated by each of contour point pairs, the read address generating means outputs a read address of the corresponding accompanying data to the index memory in accordance with the priority of the accompanying data. An image signal for a CRT display is synthesized and outputted at the real time on the basis of the contour point information of the supplied figure.

In the above general image synthesizer, a color code for a polygon is provided as the accompanying data to fill the figure with a color. The polygonal interior is filled with a color based on color information of the color code. This color code is used for only a single color so that only a polygon having the single color can be synthesized and outputted. The accompanying data are used as data provided in a lookup table in a coloring operation. Accordingly, no accompanying data can be changed in accordance with a deformation of the polygon. Therefore, no accompanying data can be changed in accordance with the deformation of the polygon in the case of colors except for the single color.

Recently, various kinds of graphics have been required. Therefore, it is necessary to fill the interior of a polygon with colors except for a single color and shadow the polygon. Further, it is necessary to deform and display a basic pattern in accordance with a figure.

In mapping processing of the image processor, it is necessary to read data out of a mapping memory and write these data to a frame memory in accordance with an area for polygons geometrically transformed with respect to the frame memory. Accordingly, the number of processed polygons is small when an image is synthesized by a CRT at the real time as in a game machine. Accordingly, it is substantially impossible to process the image at the real time.

A Z-buffer method is known as a hidden face processing method for overlapping and displaying a plurality of figures. In this Z-buffer method, a numeric value in a Z-axis direction is compared with a numeric value in a buffer memory one-to-one corresponding to the frame memory. Thus, only a polygon having a small numeric value on the Z-axis is written to the frame memory at any time.

Therefore, at the worst time, it is necessary to perform reading and writing operation of the Z-buffer memory, a reading operation of the mapping memory and a writing operation of the frame memory with respect to all polygons to be processed. Each of the frame memory, the mapping memory and the Z-buffer memory has a large memory capacity and is normally constructed by a memory cheaply manufactured such as a dynamic random access memory (DRAM). Therefore, no real time mapping processing can be performed since a memory access time is long and the number of memory accesses is large.

Further, in the image processor, a plurality of polygons are simultaneously displayed in many cases. In particular, when the plurality of polygons are overlapped and displayed, it is important how an overlapping region of the polygons is filled with a color. Therefore, hidden face erasing processing of the polygons is performed by a hidden face erasing processing circuit.

However, in the hidden face erasing processing circuit, an upper limit of the number of polygons for the hidden face erasing processing is determined in advance. The hidden face erasing processing is performed by the upper limit of the number of polygons by transmitting data from the frame memory to the hidden face erasing processing circuit. Therefore, for example, when the number of processing units is limited to 128, undisplayed polygons are really processed so that it is impossible to display polygons to be displayed later.

SUMMARY OF THE INVENTION

It is therefore an object of the present invention to provide an image processor in which an operation of the image processor is performed at a high speed and real time mapping processing is performed.

The above object of the present invention can be achieved by an image processor comprising an end point memory for storing two end point information of X and Y constituting a polygon and respective end point information of internal pattern information; outline processing means for performing outline processings of address information of an outline of the polygon and the internal pattern information corresponding to the polygon on the basis of the two end point information and the respective end point information of the internal pattern information from the end point memory; internal figure-drawing processing means for calculating an address between two opposite polygonal sides calculated by the outline processing means on the basis of the outline address information, the internal figure-drawing processing means calculating an address of the internal pattern information corresponding to the polygonal outline; and display means for displaying image information of a figure. The image processor is constructed such that an image is displayed by deforming an internal pattern shown by the internal pattern information based on contour point information of a supplied figure.

When the internal pattern information are constructed by brightness information data, the internal pattern is additionally shaded in accordance with a polygonal shape.

Further, when the internal pattern information are constructed by color information data of red, green and blue, the polygonal interior can be filled with a color by changing the color in accordance with the polygonal shape.

The outline processing means has a polygonal outline processing section for performing the outline processing of the polygon and an internal pattern outline processing section for performing the outline processing of the internal pattern information.

The polygonal outline processing section comprises a differential circuit for subtracting a starting point address of X or Y from a terminal point address thereof on each of polygonal sides to provide a first subtracted value; a differential arithmetic circuit for subtracting the starting point address of Y or X from the terminal point address thereof to provide a second subtracted value, the differential arithmetic circuit dividing the second subtracted value by the first subtracted value; and an interpolating arithmetic circuit for adding this divided value of the differential arithmetic circuit to an initial value of X or Y. The internal pattern outline processing section comprises a differential arithmetic circuit for subtracting a starting point address from a terminal point address with respect to the internal pattern information at end points on each of the polygonal sides to provide a third subtracted value, this differential arithmetic circuit dividing the third subtracted value by the first subtracted value calculated by the polygonal outline processing section; and an interpolating arithmetic circuit for adding this divided value of the differential arithmetic circuit to an initial value of the internal pattern information.

The internal figure-drawing processing means comprises a differential circuit for subtracting a starting point address of X or Y from a terminal point address thereof on each of polygonal sides to provide a first differential value; a differential arithmetic circuit for subtracting a starting point address from a terminal point address with respect to the internal pattern information at end points on each of the polygonal sides to provide a second differential value; the differential arithmetic circuit dividing the second differential value by the first differential value calculated by the differential circuit; and an interpolating arithmetic circuit for adding this divided value of the differential arithmetic circuit to an initial value of the internal pattern information.

The above object of the present invention can be also achieved by an image processor comprising a mapping memory for storing a basic pattern; an end point memory for storing two end point information of X and Y constituting a polygon and respective end point information of internal pattern information; outline processing means for performing outline processings of address information of an outline of the polygon and mapping pattern information corresponding to the polygon on the basis of predetermined addresses of the two end point information from the end point memory and respective end point information of the mapping pattern information; internal figure-drawing processing means for calculating an address between two opposite polygonal sides calculated by the outline processing means on the basis of the outline address information, the internal figure-drawing processing means calculating an address of the mapping pattern information corresponding to the polygonal outline; and display means for displaying image information of a figure. The image processor is constructed such that an image signal is outputted by deforming the basic pattern of the mapping memory based on contour point information of a supplied figure.

The above object of the present invention can be also achieved by an image processor comprising an end point memory for storing two end point information of X and Y constituting a polygon and data indicative of a priority of the polygon; outline processing means for performing outline processing of address information of an outline of the polygon based on a predetermined address of the two end point information from the end point memory; invisible face removing means for inputting an address between two opposite polygonal sides calculated by the outline processing means in the order of a higher priority; the invisible face removing means judging and selecting a visible or invisible polygon based on the address between the two opposite polygonal sides of the outline of the polygon; internal figure-drawing processing means for calculating polygonal internal information corresponding to the polygonal outline based on the outline address information; and display means for displaying image information. The image processor is constructed such that the polygonal internal information are calculated by the internal figure-drawing processing means to output an image signal with respect to only a polygon judged as the visible polygon by the invisible face removing means.

The invisible face removing means comprises memory means for storing a starting point address and a terminal point address as the address between the two opposite polygonal sides calculated by the outline processing means; first comparing means for comparing a starting point address of an inputted polygon with the starting point address stored to the memory means; second comparing means for comparing a terminal point address of the inputted polygon with the terminal point address stored to the memory means; means for rewriting the starting point address of the memory means to the starting point address of the inputted polygon when the starting point address of the polygon inputted to the first comparing means is smaller than the starting point address of the memory means; and means for rewriting the terminal point address of the memory means to the terminal point address of the inputted polygon when the terminal point address of the polygon inputted to the second comparing means is greater than the terminal point address of the memory means. The inputted polygon is judged as the invisible polygon when the starting point address of the polygon inputted to the first comparing means is greater than the starting point address of the memory means and the terminal point address of the polygon inputted to the second comparing means is smaller than the terminal point address of the memory means.

The above object of the present invention can be also achieved by an image processor comprising an end point memory for storing two end point information of X and Y constituting a polygon and data indicative of a priority of the polygon; outline processing means for calculating address information of an outline of the polygon crossing each of horizontal scanning lines based on a predetermined address of the two end point information from the end point memory; memory means for storing an address between two opposite polygonal sides calculated by the outline processing means together with the priority; invisible face removing means for inputting the address between the two opposite polygonal sides from the memory means in the order of a higher priority; the invisible face removing means judging and selecting a visible or invisible polygon based on the address between the two opposite polygonal sides of the polygonal outline; internal figure-drawing processing means for calculating polygonal internal information corresponding to the polygonal outline based on the outline address information; and display means for displaying image information. The image processor is constructed such that the polygonal internal information are calculated by the internal figure-drawing processing means to output an image signal with respect to only a polygon judged as the visible polygon by the invisible face removing means.

The invisible face removing means comprises memory means for storing a starting point address and a terminal point address of an inputted polygon; a first logic circuit for indicating a region from a first directional position to a position of the starting point address with data stored to this memory means as an address; a second logic circuit for indicating a region from a second directional position to a position of the terminal point address with data stored to this memory means as an address; first logical product means for carrying out a logical product between outputs of the first and second logic circuits; a flip-flop circuit for sequentially inputting data from the first logical product means; second logical product means for carrying out a logical product between an inverted output of the flip-flop circuit and an output of the first logical product means; and logical sum means for carrying out a logical sum between outputs of the second logical product means.

As mentioned above, in accordance with the present invention, X and Y addresses of an outline of a figure and an outline of the internal pattern information are calculated on the basis of information from the end point memory. Internal image data can be calculated from address information between these two calculated address points. Accordingly, the number of accesses with respect to the end point memory can be greatly reduced so that a polygon is filled with a color at a high speed.

Further, in accordance with the present invention, only a displayed polygon is selected by the invisible face removing means based on information from the end point memory. Accordingly, image processing is performed without any restriction of an undisplayed polygon. Therefore, the polygon can be processed even when polygonal information exceeding allowable polygonal information set by performance of the image processor are stored to a memory.

Further objects and advantages of the present invention will be apparent from the following description of the preferred embodiments of the present invention as illustrated in the accompanying drawings.

BRIEF DESCRIPTION OF THE DRAWINGS

FIG. 12 is a flow chart showing an operation of the outline processing circuit shown in FIG. 11;

FIG. 20 is a table showing address states of a frame memory used in the present invention;

FIG. 21 is a table showing address states of the frame memory used in the present invention;

FIG. 22 is a table showing address states of the frame memory used in the present invention;

FIG. 23 is a table showing address states of the frame memory used in the present invention;

FIG. 24 is a table showing address states of the frame memory used in the present invention;

FIG. 25 is a table showing address states of the frame memory used in the present invention;

FIG. 26 is a table showing address states of the frame memory used in the present invention;

FIG. 28 is a diagram showing the relation between side vectors of a polygon;

FIG. 29 is a view showing the relation between side vector directions of the polygon;

FIG. 30 is a table showing the relation between directional vectors and sides of the polygon;

FIG. 35 is a table showing contents of a mask memory and a line buffer memory used in the present invention and showing initial states of these memories;

FIG. 36 is a table showing contents of the mask memory and the line buffer memory used in the present invention and showing processed results of polygon 1;

FIG. 37 is a table showing contents of the mask memory and the line buffer memory used in the present invention and showing processed results of polygon 2;

FIG. 38 is a table showing contents of the mask memory and the line buffer memory used in the present invention and showing processed results of polygon 3;

FIG. 39 is a table showing contents of the mask memory and the line buffer memory used in the present invention and showing processed results of polygon 3;

FIG. 44 is a table showing contents of the mask memory used in the second example;

FIG. 45 is a table showing contents of the mask memory used in the second example;

FIG. 46 is a table showing contents of the mask memory used in the second example;

FIG. 47 is a table showing contents of the mask memory used in the second example;

FIG. 50 is a table showing an initial state of a line buffer memory and addresses of the mapping memory processed from contents of a polygon memory disposed in the internal processing circuit used in the second example;

FIG. 51 is a table showing contents of the line buffer memory and addresses of the mapping memory processed from contents of the polygon memory in the internal processing circuit used in the second example, and showing contents of processed results of polygon 1;

FIG. 52 is a table showing contents of the line buffer memory and addresses of the mapping memory processed from contents of the polygon memory in the internal processing circuit used in the second example, and showing contents of processed results of polygon 2;

FIG. 53 is a table showing contents of the line buffer memory and addresses of the mapping memory processed from contents of the polygon memory in the internal processing circuit used in the second example, and showing contents of processed results of polygon 3;

FIG. 62 is a table showing contents of a mask memory used in the third example and processed results of polygon 1;

FIG. 63 is a table showing contents of the mask memory used in the third example and processed results of polygon 2;

FIG. 64 is a table showing contents of the mask memory used in the third example and processed results of polygon 3;

FIG. 65 is a table showing contents of the mask memory used in the third example and processed results of polygon 3;

FIG. 66 is a table showing an initial state of a line buffer memory and addresses of a mapping memory processed from contents of the polygon memory in an internal processing circuit used in the third example;

FIG. 67 is a table showing contents of the line buffer memory and addresses of the mapping memory processed from contents of the polygon memory in the internal processing circuit used in the third example, and showing contents of processed results of polygon 1;

FIG. 68 is a table showing contents of the line buffer memory and addresses of the mapping memory processed from contents of the polygon memory in the internal processing circuit used in the third example, and showing contents of processed results of polygon 2;

FIG. 69 is a table showing contents of the line buffer memory and addresses of the mapping memory processed from contents of the polygon memory in the internal processing circuit used in the third example, and showing contents of processed results of polygon 3;

FIG. 70 is a table showing contents of the line buffer memory and addresses of the mapping memory processed from contents of the polygon memory in the internal processing circuit used in the third example, and showing contents of processed results of polygon 4;

FIG. 76 is a truth table of a programmable logic array used in the invisible face removing circuit shown in FIG. 75;

FIG. 77 is a truth table of a programmable logic array used in the invisible face removing circuit shown in FIG. 75;

FIG. 88 is a truth table of a priority encoder in the fourth example;

FIG. 100 is a typical view showing address patterns in accordance with respective modes;

FIG. 104 is a typical view showing the construction of a frame memory disposed in the internal drawing processing circuit used in the fifth example.

DESCRIPTION OF THE PREFERRED EMBODIMENTS

The preferred embodiments of an image processor in the present invention will next be described in detail with reference to the accompanying drawings.

Recently, various kinds of graphics have been required. Therefore, it is necessary to fill the interior of a polygon with colors except for a single color and shadow the polygon. Further, it is necessary to deform and display a basic pattern in accordance with a figure.

Figure 3:
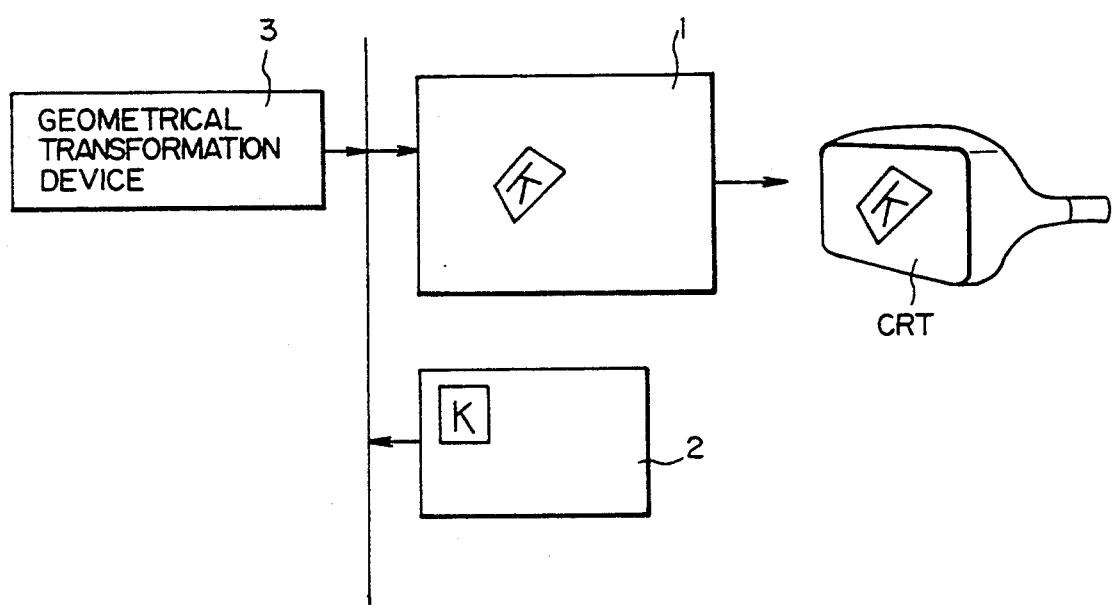
FIG. 3 is a block diagram showing a general image processor.

In general image processing satisfying the above requirements, for example, there is "Geometrical transformation LSI for digital image" shown in technical research report Vol. 88, No. 90, ICD 88-38 published by Japanese electronic information communication society. In this image processing, a mapping operation is performed with respect to a two-dimensional arrangement (or frame data) of picture element data by using a geometrical transformation function representing a shape transformation. In this image processing, as shown in FIG. 3, with respect to a frame memory 1 for bit mapping, a mapping pattern from a mapping memory 2 having the same bit mapping construction is calculated by a geometrical transformation device 3 every one bit in accordance with the following formulas (1) and (2).

$$u = ax + by + c \quad (1)$$

$$v = dx + ey + f \quad (2).$$

Figure 2:
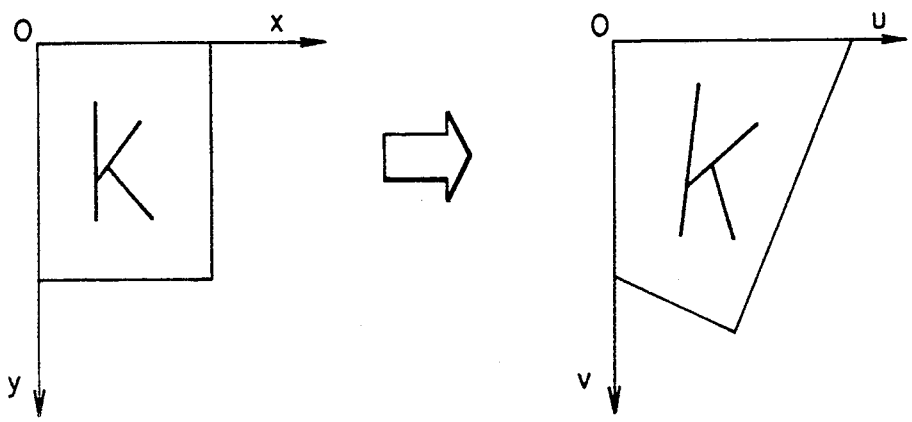
FIG. 2 is a typical view for explaining a general image processing method.

As shown in FIG. 2, mapping pattern values of the mapping memory at X and Y addresses thereof are stored to the frame memory at u and v addresses thereof.

However, in the mapping processing of the above image processor, it is necessary to read data out of the mapping memory 2 and write these data to the frame memory 1 in accordance with an area for polygons geometrically transformed with respect to the frame memory 1. For example, when the mapping memory has a memory region for 256×256 bits and a memory cycle thereof is set to 100 ns, a processing time of 256×256×100 ns=6.5 ms is required with respect to one polygon. Accordingly, when an image is synthesized by a CRT at the real time as in a game machine, the processing time is set to (1/60 s)/6.5 ms=2.5 so that only two polygons can be processed. Accordingly, it is substantially impossible to process the image at the real time.

A Z-buffer method is known as a hidden face processing method for overlapping and displaying a plurality of figures. In this Z-buffer method, a numeric value in a Z-axis direction is compared with a numeric value in a buffer memory one-to-one corresponding to the frame memory. Thus, only a polygon having a small numeric value on the Z-axis is written to the frame memory at any time.

Therefore, at the worst time, it is necessary to perform reading and writing operations of the Z-buffer memory, a reading operation of the mapping memory and a writing operation of the frame memory with respect to all polygons to be processed. Each of the frame memory, the mapping memory and the Z-buffer memory has a large memory capacity and is normally constructed by a memory cheaply manufactured such as a dynamic random access memory (DRAM). Therefore, no real time mapping processing can be performed since a memory access time is long and the number of memory accesses is large.

Further, in the image processor, a plurality of polygons are simultaneously displayed in many cases. In particular, when the plurality of polygons are overlapped and displayed, it is important how an overlapping region of the polygons is filled with a color. Therefore, hidden face erasing processing of the polygons is performed by a hidden face erasing processing circuit.

Figure 1:
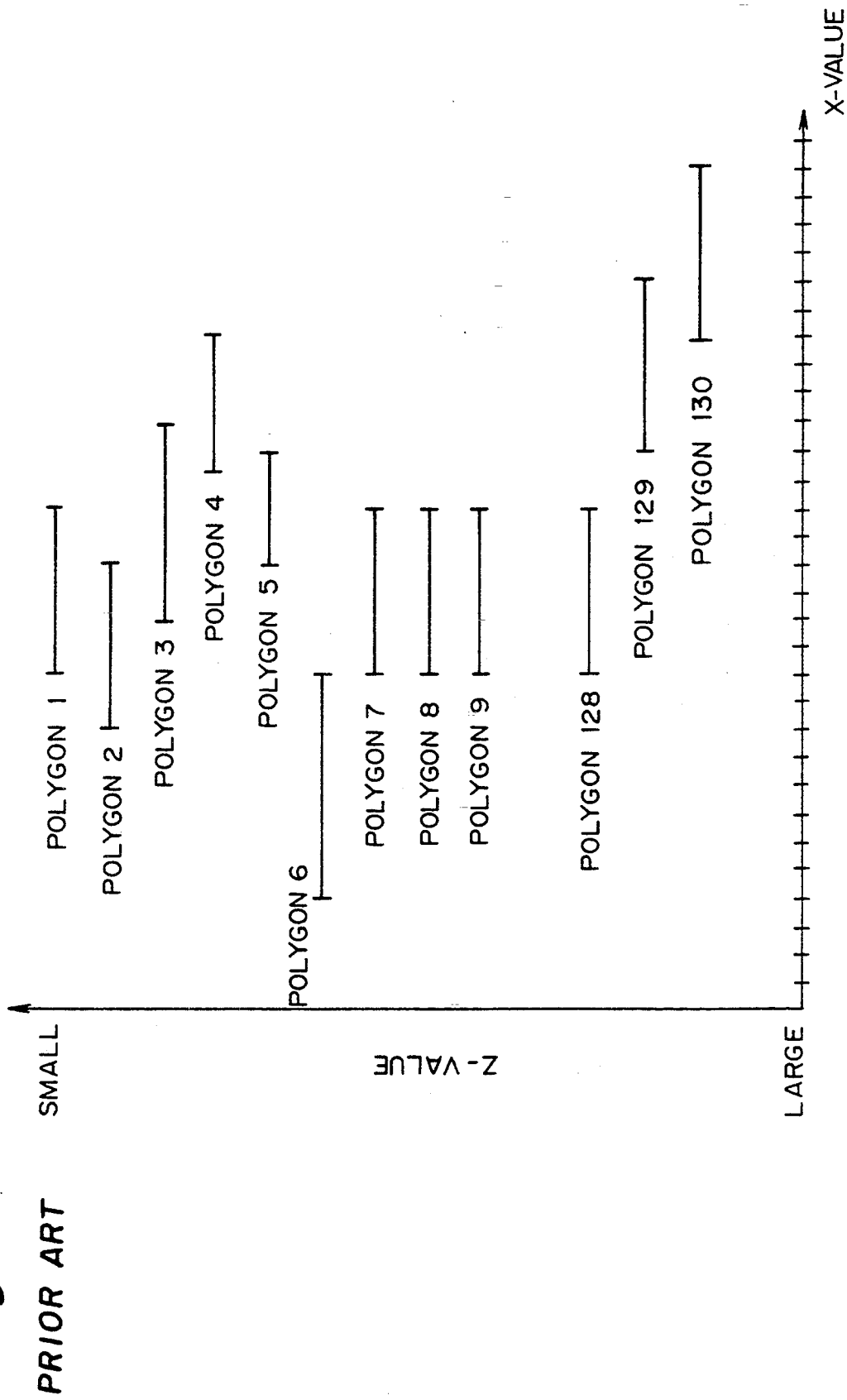
FIG. 1 is a view showing the relation between respective polygons in a Z-direction.

However, in the hidden face erasing processing circuit, an upper limit of the number of polygons for the hidden face erasing processing is determined in advance. The hidden face erasing processing is performed by the upper limit of the number of polygons by transmitting data from the frame memory to the hidden face erasing processing circuit. Therefore, for example, when the number of processing units is limited to 128, undisplayed polygons are really processed as shown in FIG. 1 so that it is impossible to display polygons 129 and 130 to be displayed later.

Figure 4:
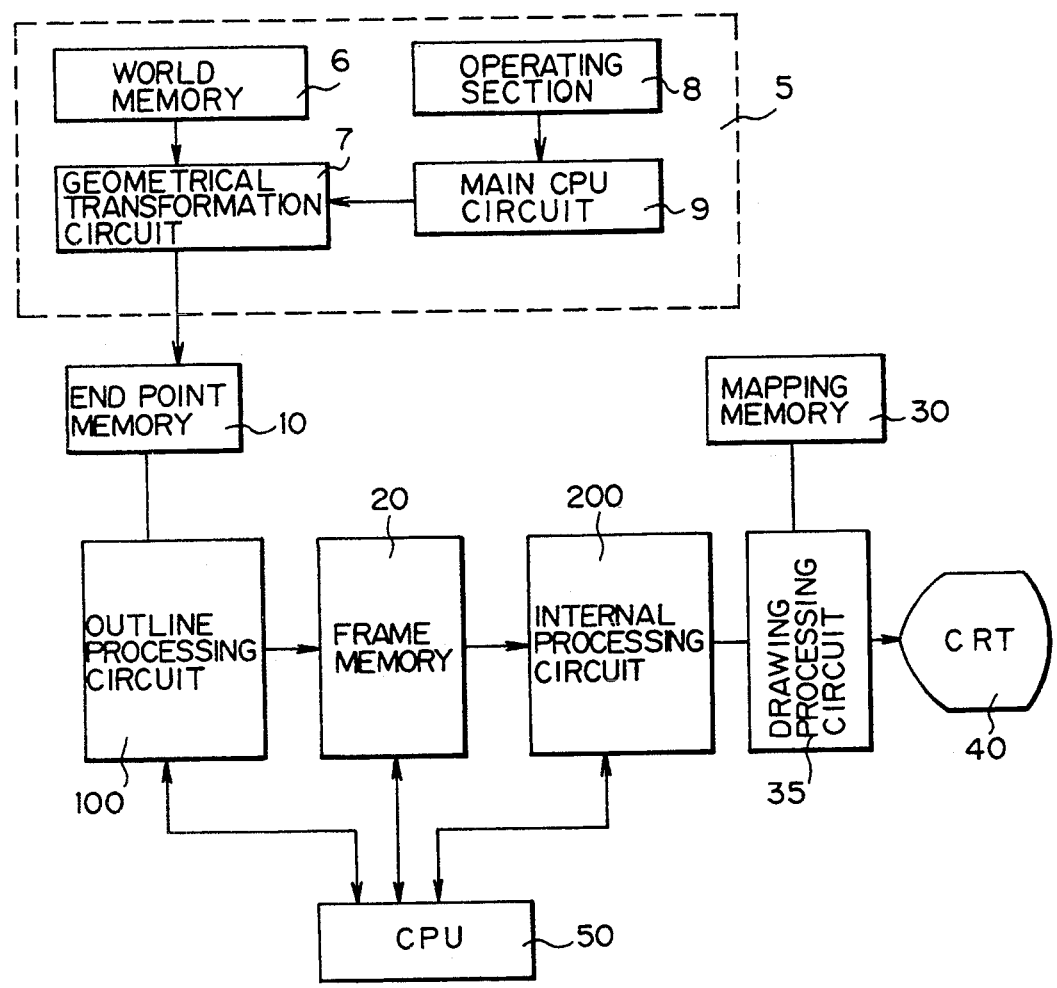
FIG. 4 is a block diagram showing the entire construction of an image processor in the present invention.

FIG. 4 is a block diagram showing the entire construction of a pseudo three-dimensional image processor using the present invention. For example, this image processor is suitably used in machines for games such as a racing game and a control simulation of an aeroplane.

The entire construction of this image processor in the present invention will next be described with reference to FIG. 4.

In FIG. 4, an image information feeder 5 calculates a simulation image in each of various kinds of conditions in an operation of the image processor and outputs this simulation image to an end point memory 10 as information of plural polygons.

The image information feeder 5 has a world memory 6, a geometrical transformation circuit 7 an operating section 8 and a main CPU circuit 9.

In the world memory 6, all objects are represented as an aggregate of the plural polygons. End point information indicative of respective end points of a polygon are stored to this world memory 6. Further, the world memory 6 stores data of color information and end point information of a mapping memory, etc. in which patterns, etc. are formed in accordance with this polygon.

The operating section 8 is constructed by a handle, an accelerator, a brake, etc. An operation of this operating section 8 is converted to an electric signal and this electric signal is outputted to the main CPU circuit 9.

The main CPU circuit 9 receives operating signals indicative of various kinds of operating states outputted from the operating section 8 and the geometrical transformation circuit 7. For example, the main CPU circuit 9 receives information such as "an automobile is accelerated", "the automobile hit against a guard rail", and "the automobile is turned along a road". The main CPU circuit 9 calculates situation data in accordance with these information and outputs the situation data to the geometrical transformation circuit 7.

The geometrical transformation circuit 7 calculates a scene visible to a driver in accordance with the present position of the automobile calculated by the main CPU circuit 9 with reference to various kinds of polygonal data stored to the world memory 6. The geometrical transformation circuit 7 outputs end point information of a polygon geometrically deformed in accordance with this scene to the end point memory 10. Namely, the geometrical transformation circuit 7 geometrically transforms vertex coordinates of each of polygons by a transparent projecting transformation and outputs transformed two-dimensional coordinates (X, Y) to the end point memory 10.

In such a transparent projecting transformation, a distance from a visual point and each of the polygons is calculated in advance. Then, it is judged whether or not each of the polygons calculated by the transparent projecting transformation is located within a visual field of the driver, i.e., a visual field on the screen. With respect to a polygon located within the visual field, a typical value of the distance from the visual point to this polygon is determined. A polygon having a smaller typical value of this distance is sequentially outputted to the end point memory 10 as a polygon having a higher priority.

The end point memory 10 stores the end point information of each of the polygons calculated by the geometrical transformation circuit 7. The end point memory 10 further stores a shape, a position and a priority of each of the polygons, end point information indicative of a mapping pattern region of a selected basic pattern, color information such as red (R), green (G), blue (B)

respectively corresponding to end points of the polygons, brightness information, and other accompanying data.

Figure 15:
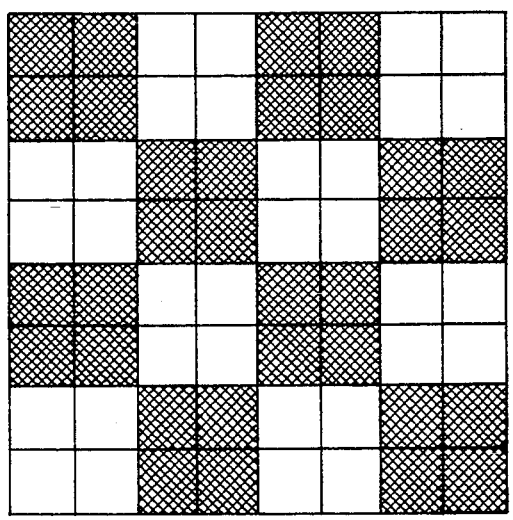
FIG. 15 is a typical view showing one example of a basic pattern stored to a mapping memory.
Figure 16:
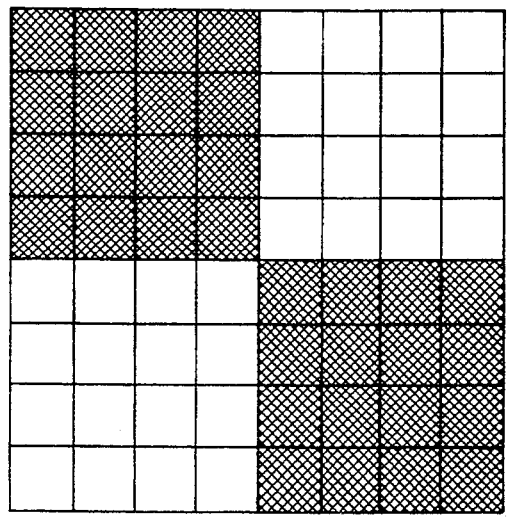
FIG. 16 is a typical view showing another example of the basic pattern stored to the mapping memory.

A mapping memory 30 stores address information of the basic pattern, color information such as red, green and blue respectively corresponding to this basic pattern, brightness information, etc. For example, this mapping memory 30 additionally stores X and Y addresses in accordance with each of basic patterns as shown in FIGS. 15 and 16, and stores color information data and other accompanying information at each of these X and Y address values.

Two-end point information (X, Y) constituting each of the polygons, addresses (MX, MY) at end points of the basic pattern, color information data such as red, green and blue, or brightness information data corresponding to each of the end points, and a Z-value indicative of a priority of each of the polygons are outputted from the end point memory 10 to an outline processing circuit 100.

The outline processing circuit 100 transmits end points on each of sides constituting a polygon from the end point memory 10 to a memory (RAM) for internal processing. These end points on each of the polygonal sides are shown by starting and terminal point addresses (XS) and (XE) of X, and starting and terminal point addresses (YS) and (YE) of Y. The outline processing circuit 100 also transmits starting and terminal point addresses (MXS) and (MXE) of X, and starting and terminal point addresses (MYS) and (MYE) of Y at end points on each of sides constituting the basic pattern to the memory for internal processing. Further, the outline processing circuit 100 transmits color information data such as red, green and blue, or brightness information data corresponding to each of the above end points to the memory for internal processing. Further, the outline processing circuit 100 transmits the Z-value indicative of a priority of each of the polygons to the memory for internal processing.

The outline processing circuit 100 first performs outline processing of a polygon. To perform this outline processing, a central processing unit (CPU) 50 judges a vector direction on each of the polygonal sides with reference to FIG. 29 on the basis of the starting and terminal point addresses of X and Y on each of the polygonal sides read out of the end point memory 10. A right-hand or left-hand side of each of the polygons is determined in accordance with this vector direction as shown in FIG. 30.

A distance (DY) in a Y-direction is calculated as shown by the following formula (3) from the starting and terminal point addresses of Y on each of the polygonal sides read out of the end point memory 10.

$$DY = YE - YS \qquad (3).$$

Subsequently, to provide a polygonal outline, an address from the X-terminal point to the X-starting point on each of the polygonal sides is calculated by a digital differential analysis (DDA) by using the above distance (DY). Data at this address are stored to a frame memory 20. Namely, a differential value (DDX) is calculated as shown by the following formula (4), $$DDX = \frac{XE - XS}{DY} \qquad (4)$$

Then, an X-address from the X-terminal point to the X-starting point on each of the polygonal sides is calculated by making an interpolating calculation as shown by the following formula (5).

$$X = X + DDX \qquad (5).$$

An initial value of X in the formula (5) is shown by the X-starting point (XS) and the interpolating calculation shown by the formula (5) is repeatedly made from zero to the distance (DY). The number of Y-addresses is increased or incremented by one from the starting point address (YS) of Y until the above distance (DY).

The outline processing circuit 100 further performs the outline processing of internal pattern information. In the outline processing of the internal pattern information, end point addresses (MX, MY) of a basic pattern stored to the end point memory 10 are changed when the basic pattern is deformed. Brightness information data provided at each of the end points of a polygon are changed when the polygon is shaded. Further, color information data provided at each of the end points of the polygon are changed when color information such as red, green and blue are changed. The outline processing circuit 100 performs the same outline processing operation with respect to the end point addresses of the basic pattern, the brightness information data and the color information data. Therefore, in the following description, these output processings will be explained by using reference numeral I as a whole.

Data (DIX) and (IX) corresponding to the polygon are calculated by the digital differential analysis (DDA) from addresses of the basic pattern or shading information data, and end point information data (I) as color information data read out of the end point memory 10 in accordance with the following formulas (6) and (7).

$$DIX = \frac{IXE - IXS}{DY} \qquad (6)$$

$$IX = IX + DIX \qquad (7)$$

The calculated data are stored to the frame memory 20. Namely, data from terminal point data to starting point data on each of the polygonal sides are calculated by the digital differential analysis (DDA) and are stored to the frame memory 20. Differential value (DIX) of these calculated data is first calculated as shown by the formula (6). Then, data (IX) from a terminal point to a starting point on each of the polygonal sides are calculated by making an interpolating calculation as shown by the formula (7). An initial value of the data (IX) in the formula (7) is shown by data at the starting point. The interpolating calculation shown by the formula (7) is repeatedly made from zero to the distance (DY).

Figure 17:
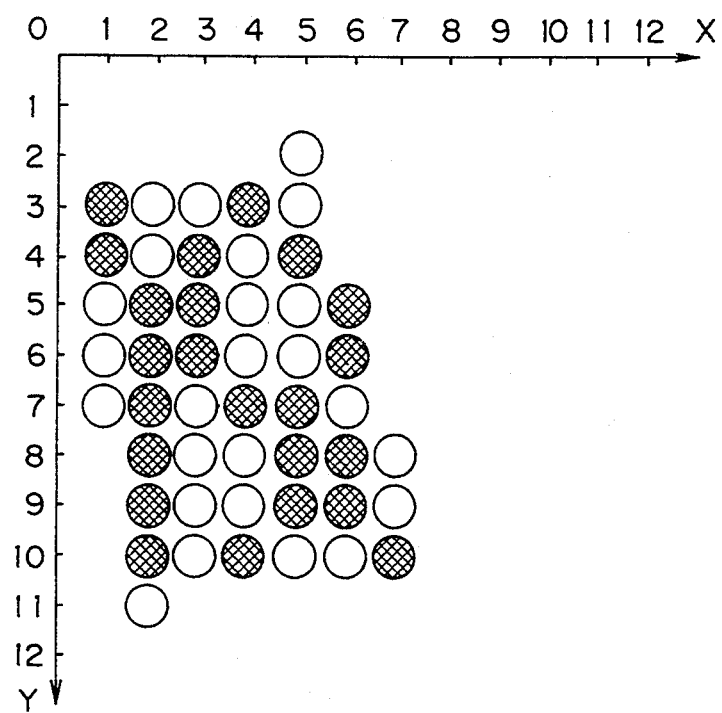
FIG. 17 is a typical view showing a state in which the basic pattern shown in FIG. 15 is deformed in accordance with polygon 1 shown in FIG. 14 in the present invention.

When outline addresses (MX, MY) of the basic pattern are converted, reference numeral I in the formulas (6) and (7) is read as processings of MX and MY. Thus, as shown in FIGS. 16 and 17, a polygonal outline and address information of an outline of a basic pattern deformed on the basis of the polygonal outline are stored to the frame memory 20 in accordance with the formulas (3) to (7).

When shading information are converted, reference numeral I designates processing of the shading information data and the shading information are deformed in accordance with the formulas (3) to (7). The deformed data are stored to the frame memory 20.

When color information of red, green and blue are converted, reference numeral I in the formulas (6) and (7) is read as processings of red, green and blue. Thus, the respective color information are deformed in accordance with the formulas (3) to (7) and are stored to the frame memory 20.

The above-mentioned processings can be independently performed, and can be also performed in combination with various kinds of processings for shading the basic pattern and adding color information in accordance with necessity.

In this embodiment, a polygonal outline, address information of an outline of a basic pattern deformed on the basis of this polygonal outline, color information or shading information are stored to the frame memory 20 every Y-address indicative of a vertical position on a horizontal scanning line in synchronization with the horizontal scanning line.

An internal figure-drawing processing circuit (or an internal processing circuit) 200 reads X and Y addresses between two opposite polygonal sides out of the frame memory 20. The internal figure-drawing processing circuit 200 then calculates an address of each of bit patterns inside a polygon as an internal pattern address based on the read address information in accordance with the above formula (7) and the following formula (8).

$$DXY = XE(Y) - XS(Y) \tag{8}$$

Namely, in this embodiment, starting and terminal points (XS) and (XE) of X indicative of an outline of the polygon and corresponding to the Y-address indicative of the vertical position, mapping addresses (MX, MY) provided by deforming the basic pattern, deformed color information data (R, G, B), or deformed shading information data are read out of the frame memory 20 in synchronization with a horizontal scanning signal.

As shown by the formula (8), a distance (DXY) in an X-direction is calculated from the starting and terminal point addresses of X read out of the frame memory 20. Internal pattern data corresponding to the polygon are calculated to deform the basic pattern or the shading information in accordance with a polygonal shape by the digital differential analysis (DDA) using this distance (DXY). These internal pattern data are calculated from the end point mapping addresses of the basic pattern, the color information data, or the shading information data read out of the frame memory 20 in accordance with the following formulas (9) and (10).

$$DDT = \frac{IE(Y) - IS(Y)}{DXY} \tag{9}$$

$$T = DDT * X + TS(Y) \tag{10}$$

Data from the terminal point to the starting point every Y-address are calculated by the digital differential analysis (DDA) using the distance (DXY) calculated in the formula (8) to provide the internal pattern data of the polygon. Namely, a differential value (DDT) is calculated as shown by the formula (9). Further, a data value (T) from the terminal point to the starting point on a Y-axis are calculated by making an interpolating calculation as shown by the formula (10). An initial value of X in this formula (10) is shown by the starting point and the interpolating calculation shown by the formula (10) is repeatedly made from zero to the distance (DXY).

Similar to the above outline processing circuit 100, the internal figure-drawing processing circuit 200 changes end point addresses (MX, MY) of a basic pattern stored to the frame memory 20 when the basic pattern is deformed. The internal figure-drawing processing circuit 200 changes brightness information data provided at each of end points of a polygon when the polygon is shaded. Further, when color information such as red, green and blue are changed, the internal figure-drawing processing circuit 200 changes color information data provided at each of the end points of the polygon. The internal figure-drawing processing circuit 200 performs the same outline processing operation with respect to the end point addresses of the basic pattern, the brightness information data and the color information data. Therefore, in the following description, these outline processings will be explained by using reference numeral T as a whole.

In accordance with the formulas (9) and (10), data (DDT) and (T) corresponding to the polygon are calculated by the digital differential analysis (DDA) from addresses of the basic pattern or shading information data, and end point information data (T) as color information data read out of the end point memory 10. Namely, data from terminal point data to starting point data on each of polygonal sides are calculated by the digital differential analysis (DDA). A differential value (DDT) of these data is first calculated as shown by the formula (9). Then, data from a terminal point to a starting point on each of the polygonal sides are calculated by making an interpolating calculation as shown by the formula (10). An initial value of X in the formula (10) is shown by data at the starting point. The interpolating calculation shown by the formula (10) is repeatedly made from zero to the distance (DXY).

When addresses (MX, MY) of the basic pattern are converted, reference numeral T in the above formulas (9) and (10) is read as two processings of MX and MY. Thus, the internal address information of a deformed basic pattern are transmitted to a drawing processing circuit 35.

When shading information are converted, reference numeral T designates processing of the shading information data and the shading information are deformed in accordance with the formulas (9) and (10). The deformed data are transmitted to the drawing processing circuit 35.

When color information of red, green and blue are converted, reference numeral T in the above formulas (9) and (10) is read as processings of red, green and blue. Thus, the respective color information are deformed and transmitted to the drawing processing circuit 35.

An X-address SX as a screen address for displaying data by a CRT 40 is calculated by XS+X.

Figure 18:
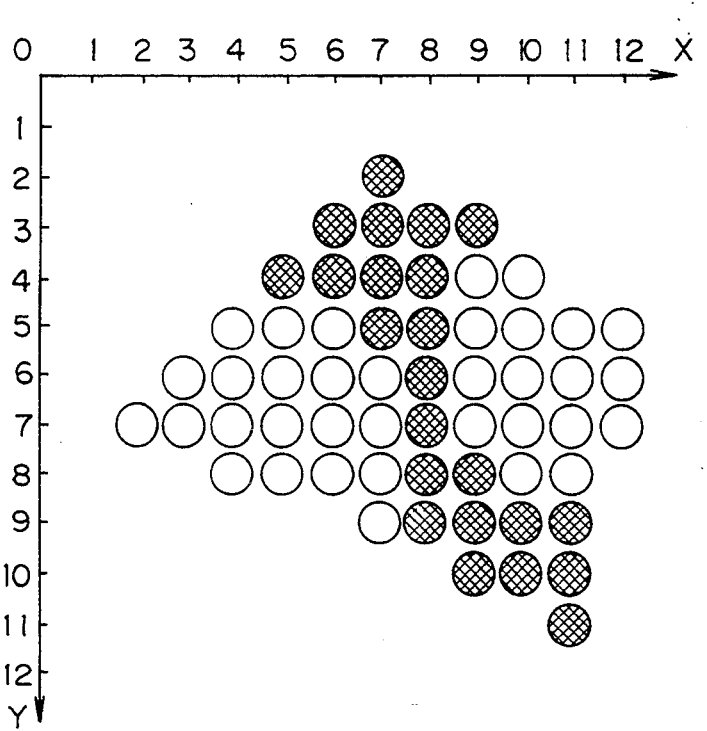
FIG. 18 is a typical view showing a state in which the basic pattern shown in FIG. 16 is deformed in accordance with polygon 2 shown in FIG. 14 in the present invention.

To display data by the CRT 40, the drawing processing circuit 35 reads a matching pattern address of a polygon having a higher priority order every X-address at a Y-address corresponding to a horizontal scanning signal. This polygon having a higher priority order is a polygon having a smaller Z-value indicative of the priority order. The drawing processing circuit 35 designates an address of the mapping memory 30 in accordance with this matching pattern address. The drawing processing circuit 35 then reads information corresponding to this designated address by using the mapping memory 30 as a lookup table. This information is displayed by the CRT 40. Thus, as shown in FIGS. 17 and 18, it is possible to deform and display basic patterns shown in FIGS. 15 and 16 in accordance with polygonal shapes shown in FIG. 14.

When only shading or color information are added, the drawing processing circuit 35 reads an address of a polygon having a higher priority order every X-address at a Y-address corresponding to the horizontal scanning signal. This polygon having a higher priority order is a polygon having a smaller Z-value indicative of the priority order. A change in shade or color corresponding to a polygonal shape is caused by reading the shading information or the color information every read address.

In the image processor schematically constructed above, the above operations of the outline processing circuit 100, the frame memory 20, the internal drawing processing circuit 200, etc. are controlled by the CPU 50.

Figure 5:
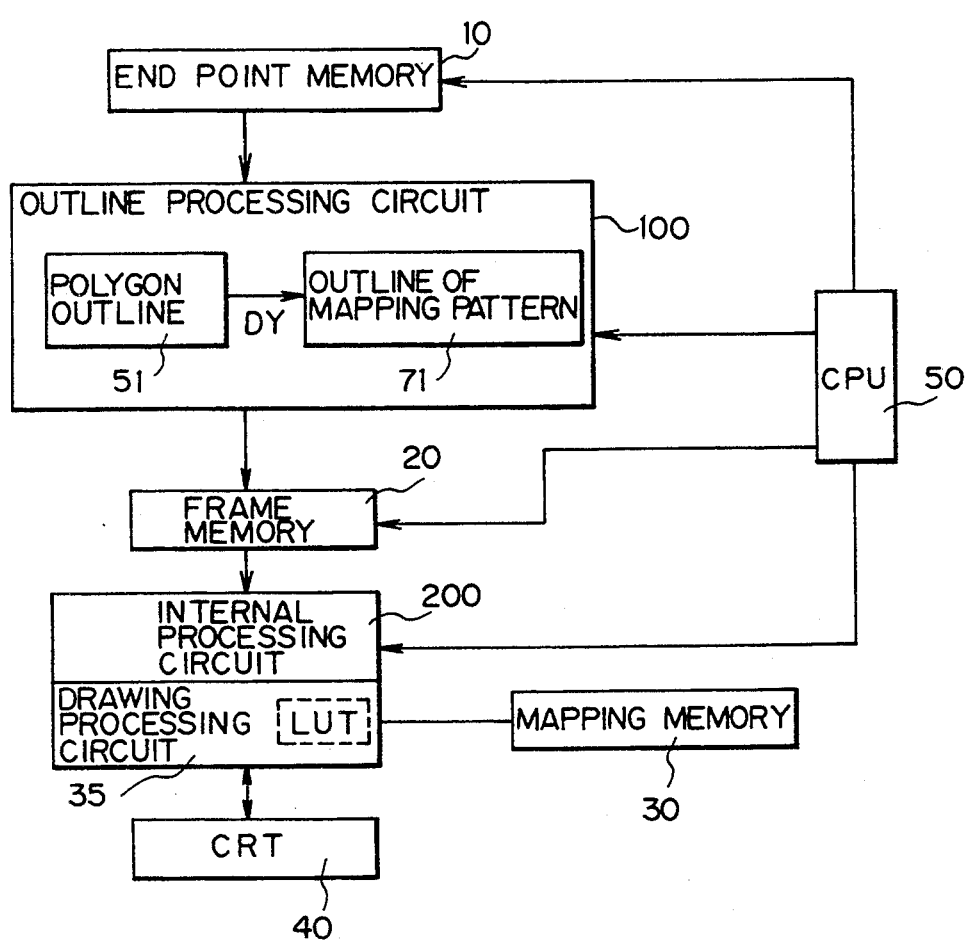
FIG. 5 is a block diagram showing a construction of the image processor in which a basic pattern in the present invention is deformed in accordance with the deformation of a polygon.
Figure 6:
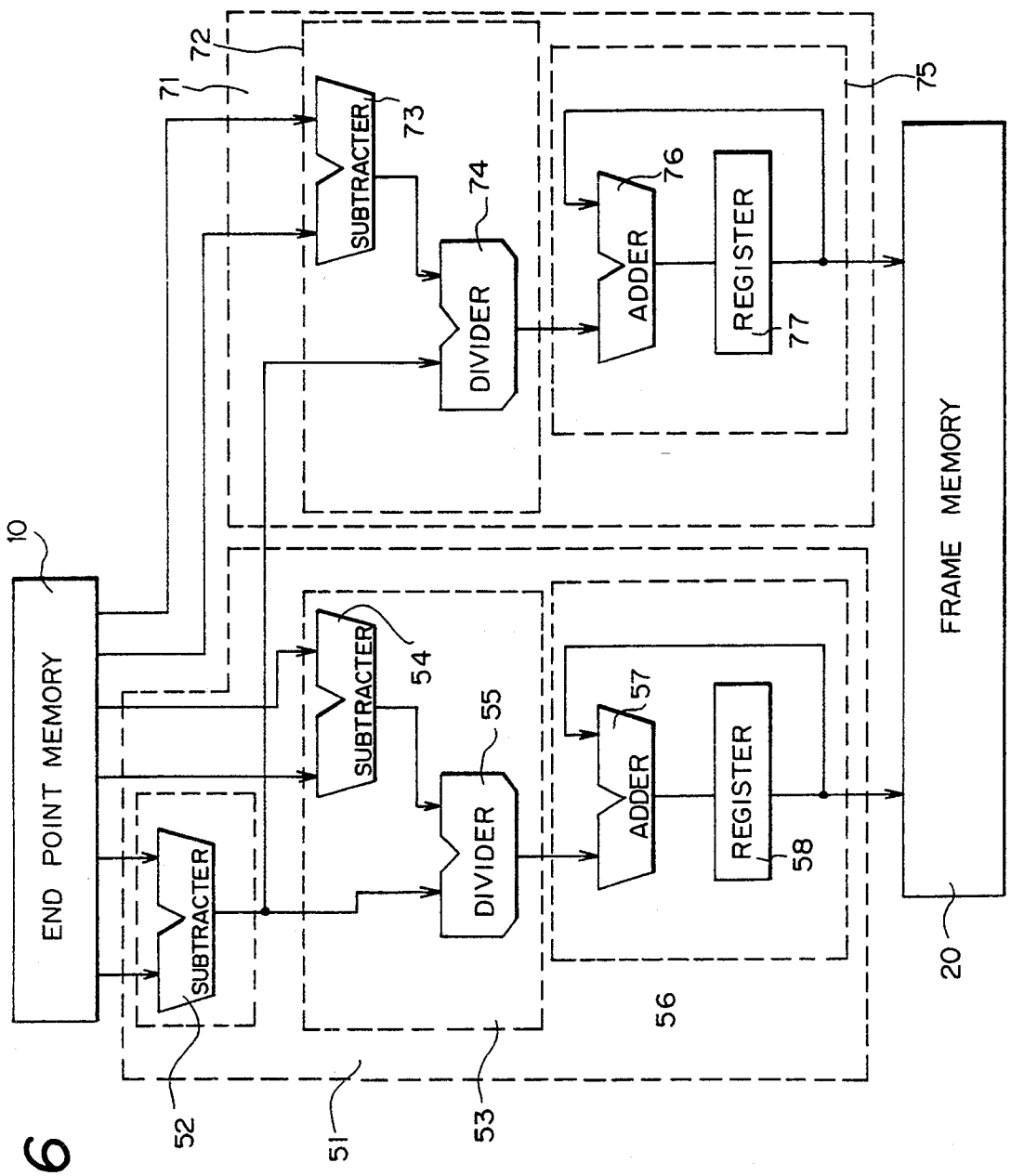
FIG. 6 is a block diagram showing the construction of an outline processing circuit used in the present invention.
Figure 7:
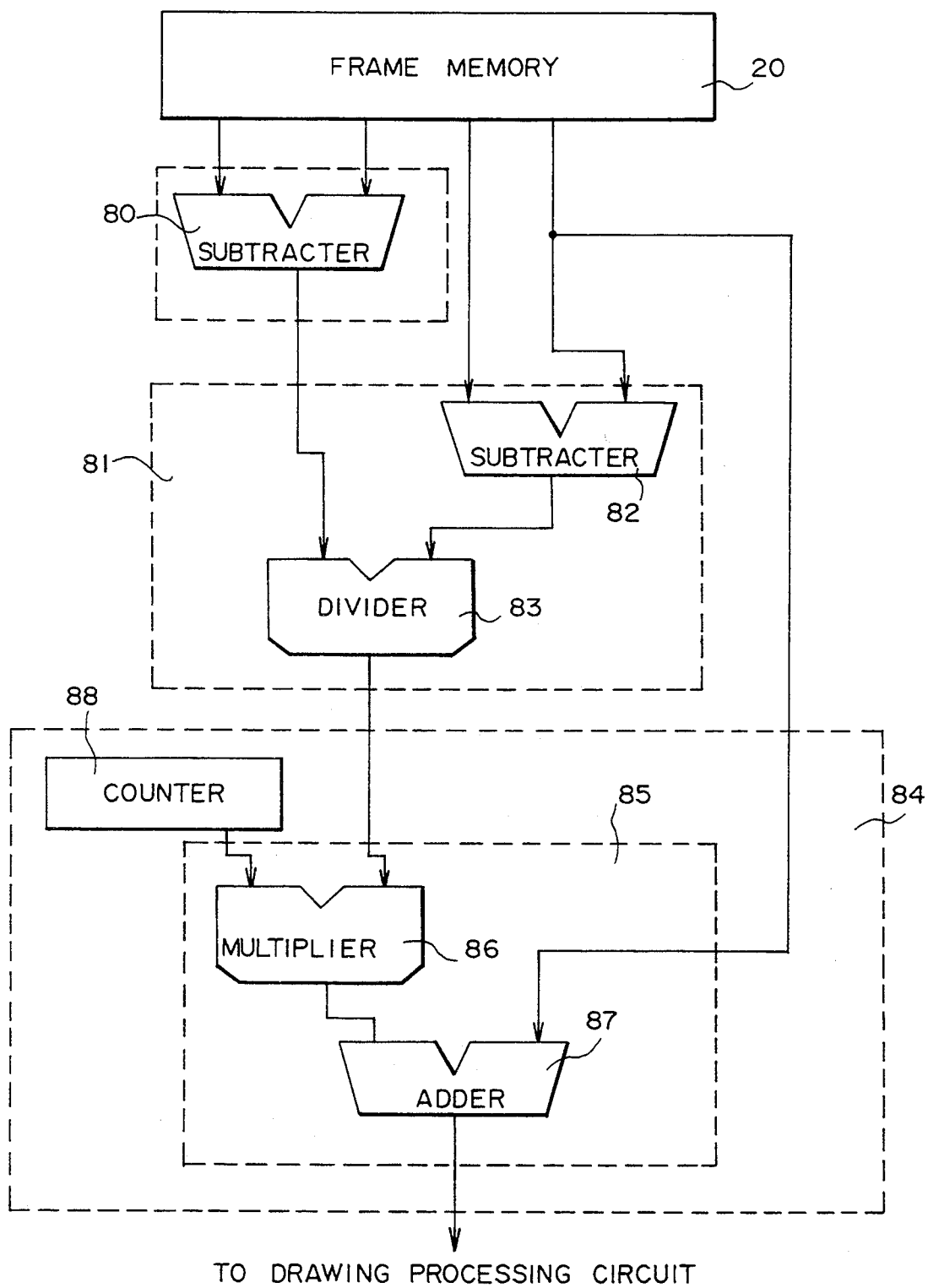
FIG. 7 is a block diagram showing the construction of an internal processing circuit used in the present invention.
Figure 8:
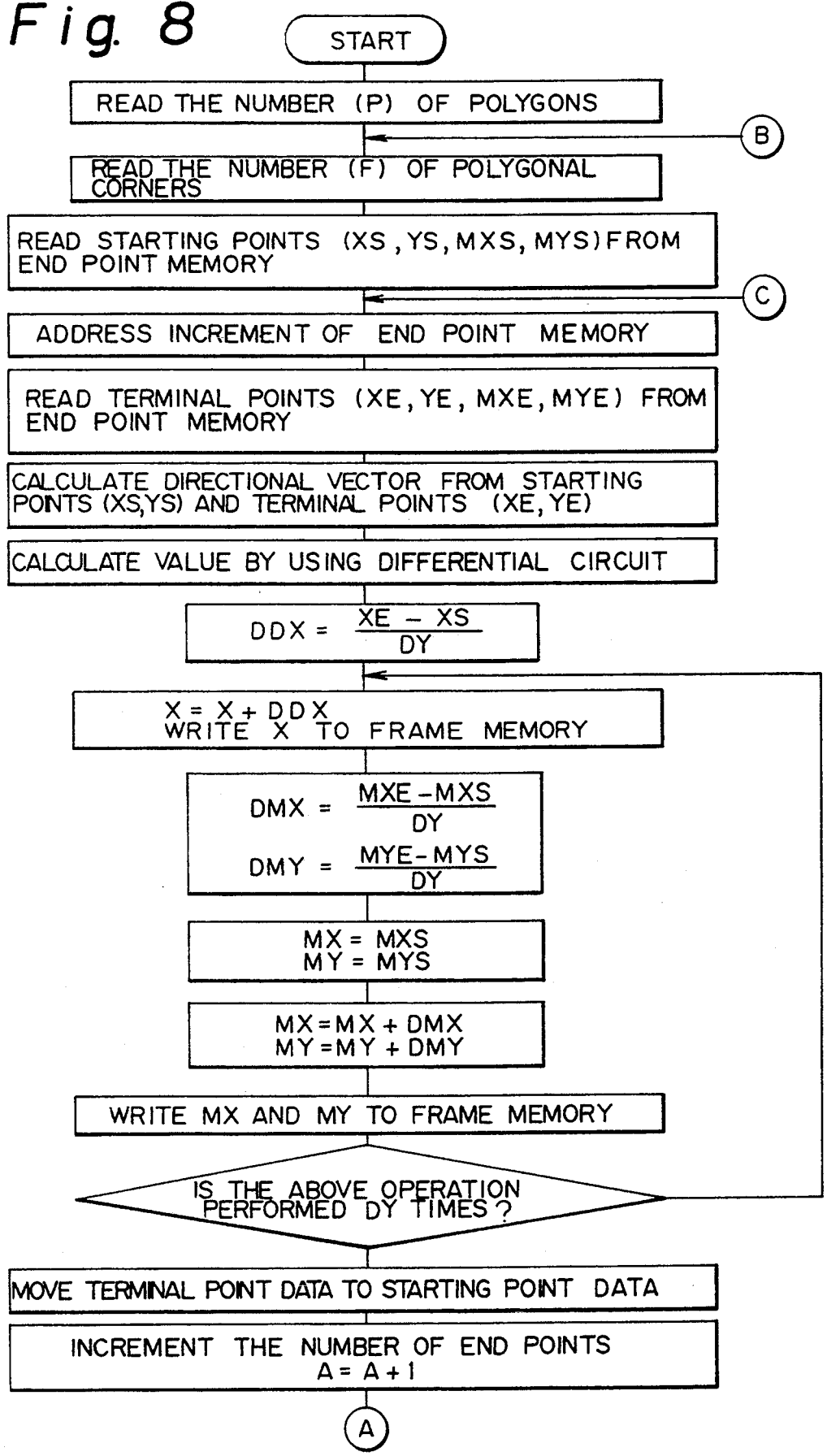
FIG. 8 is a flow chart showing an operation of the outline processing circuit used in the present invention.
Figure 9:
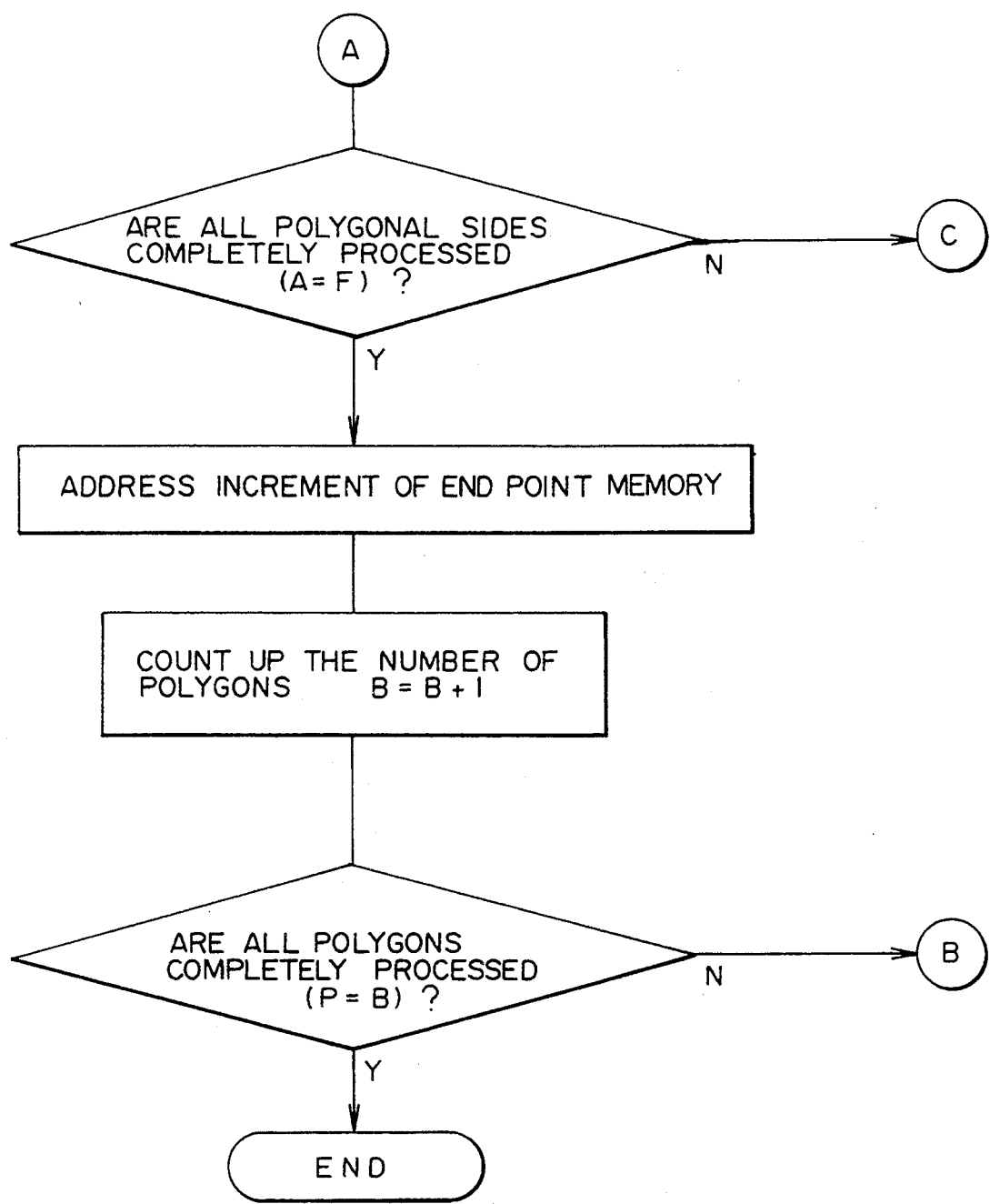
FIG. 9 is a flow chart showing an operation of the outline processing circuit used in the present invention.
Figure 10:
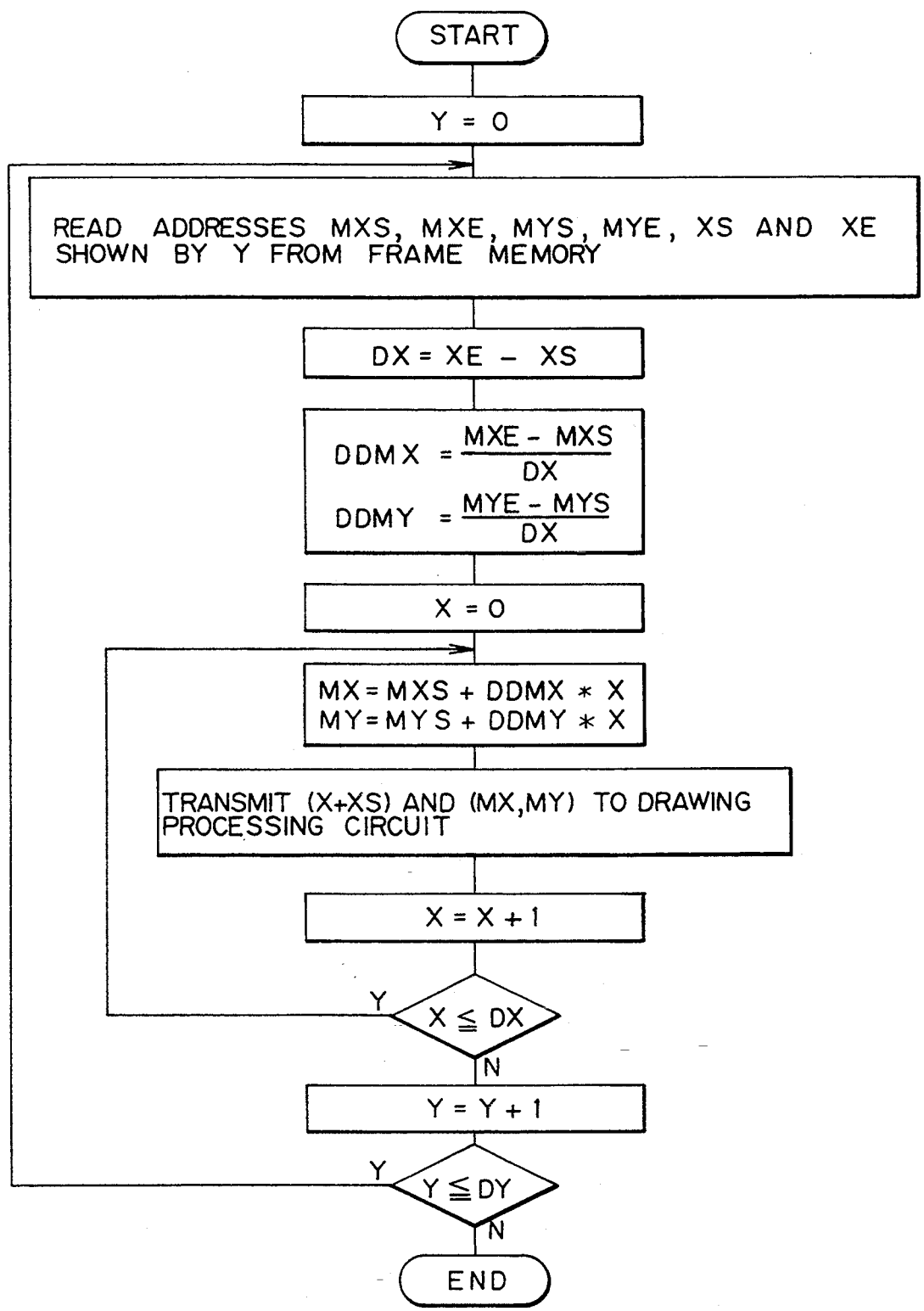
FIG. 10 is a flow chart showing an operation of the internal processing circuit used in the present invention.

FIG. 5 is a block diagram showing the construction of an image processor in the present invention in which a basic pattern is deformed in accordance with the deformation of a polygon. FIG. 6 is a block diagram showing the construction of an outline processing circuit. FIG. 7 is a block diagram showing the construction of an internal processing circuit. FIGS. 8 to 10 are flow charts showing operations of the outline processing circuit and the internal processing circuit.

Figure 19:
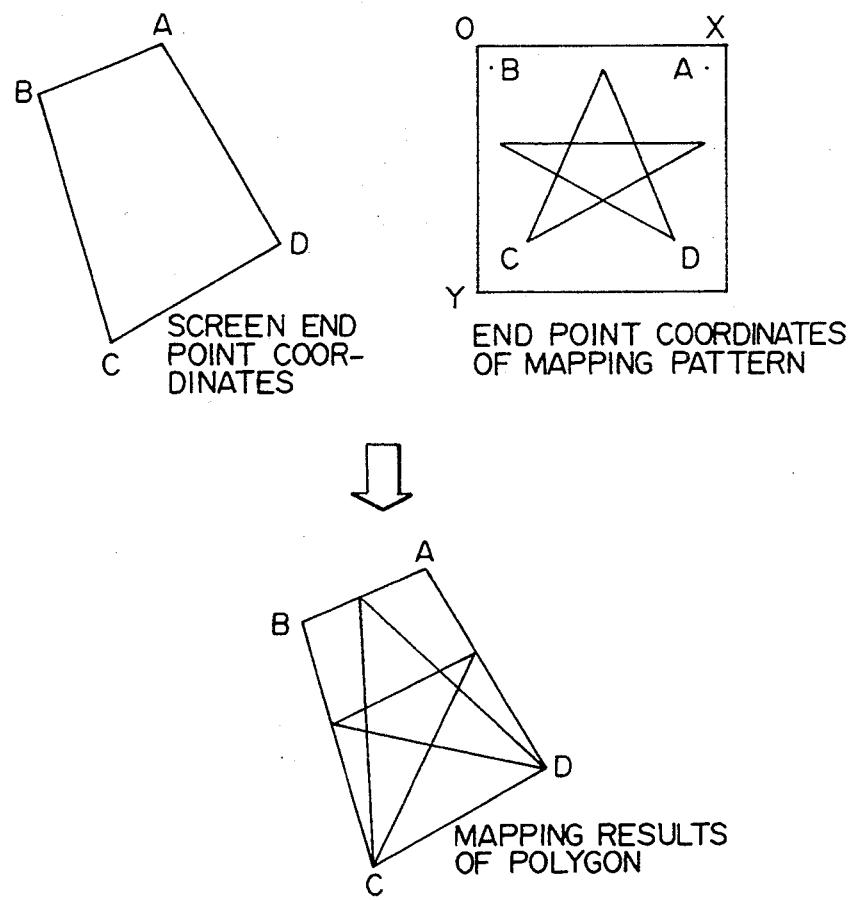
FIG. 19 is a typical view for explaining the deforming state of a polygon in the present invention.

In the present invention, the basic pattern is deformed as follows in accordance with the deformation of a polygon. As shown in FIG. 19, in this embodiment, the polygon has screen end point coordinates (X, Y) and end point coordinates (MX, MY) of the basic pattern as a mapping pattern. A mapping operation is performed by deforming the basic pattern on a polygonal face as shown in FIG. 19.

Outline processing of the polygon is first performed by a polygonal outline processing circuit 51. To perform this outline processing, the CPU 50 judges a vector direction on each of polygonal sides shown in FIG. 29 on the basis of starting and terminal point addresses of X and Y on each of the polygonal sides read out of an end point memory 10. As shown in FIG. 30, the right-hand or left-hand side of the polygon is determined in accordance with this vector direction. The end point memory 10 stores screen end point coordinates (X, Y) as shown in FIG. 22, end point coordinates (MX, MY) of the mapping pattern, and a Z-value of the polygon.

As shown by the above formula (3), the distance (DY) in a Y-direction is calculated from the starting and terminal point addresses of Y on each of the polygonal sides read out of the end point memory 10. Subsequently, an address from the X-terminal point to the X-starting point on each of the polygonal sides is calculated by the digital differential analysis (DDA) using this distance (DY) to provide a polygonal outline. The calculated address data are then stored to the frame memory 20. Namely, as shown by the above formula (4), a differential value (DDX) of these address data is calculated. Then, an X-address from the X-terminal point to the X-starting point on each of the polygonal sides is calculated by making an interpolating calculation as shown by the above formula (5).

Further, a mapping pattern outline processing circuit 71 performs outline processing of basic pattern information. In this outline processing, the end point addresses (MX, MY) of the basic pattern stored to the end point memory 10 are changed when the basic pattern is deformed.

Data corresponding to the polygon are calculated by the digital differential analysis (DDA) from data of addresses (MXS, MYS) and (MXE, MYE) of the basic pattern read out of the end point memory 10 in accordance with the following formulas (11) and (12).

$$DMX = \frac{MXE - MXS}{DY} \quad (11)$$

$$DMY = \frac{MYE - MYS}{DY} \quad (12)$$

The calculated data are stored to the frame memory 20. Namely, data from terminal point data (MXE, MYE) to starting point data (MXS, MYS) on each of the polygonal sides are calculated by the digital differential analysis (DDA) and are stored to the frame memory 20.

Differential values (DMX) and (DMY) of these data are first calculated as shown by the formulas (11) and (12). Then, data (MX) and (MY) from a terminal point to a starting point on each of the polygonal sides are calculated by making interpolating calculations as shown by the following formulas (13) and (14).

$$MX = MX + DMX \quad (13)$$

$$MY = MY + DMY \quad (14).$$

An initial value of the data (MX) in the formula (13) is shown by data (MXS) at the starting point. An initial value of the data (MY) in the formula (14) is shown by data (MYS) at the starting point. The interpolating calculations shown by the formulas (13) and (14) are repeatedly made from zero to the distance (DY).

In this embodiment, a polygonal outline and address information of an outline of a basic pattern deformed on the basis of the polygonal outline are stored to the frame memory 20 in synchronization with a horizontal scanning line every Y-address indicative of a vertical position of this horizontal scanning line.

An internal figure-drawing processing circuit (or an internal processing circuit) 200 reads X and Y addresses between two opposite polygonal sides out of the frame memory 20. The internal figure-drawing processing circuit 200 then calculates an address of each of bit patterns inside a polygon as an internal pattern address based on the read address information in accordance with the above formulas (9) and (10). Namely, in this embodiment, starting and terminal points (XS) and (XE) of X indicative of an outline of the polygon and corresponding to the Y-address indicative of the vertical position, and mapping addresses (MX, MY) provided by deforming the basic pattern are read out of the frame memory 20 in synchronization with a horizontal scanning signal.

As shown by the formula (8), a distance (DXY) in an X-direction is calculated from the starting and terminal point addresses of X read out of the frame memory 20. The end point mapping addresses (MX, MY) of the basic pattern read out of the frame memory 20 are calculated to deform the basic pattern in accordance with a polygonal shape by the digital differential analysis (DDA) using this distance (DXY) in accordance with the formulas (9) and (10).

Data from the terminal point to the starting point every Y-address are then calculated by the digital differential analysis (DDA) using the distance (DXY) calculated in the formula (8) to provide internal pattern data of the polygon. Namely, a differential value (DDT) of these data is calculated as shown by the formula (9). Further, data (T) from the terminal point to the starting point on a Y-axis are calculated by making an interpolating calculation as shown by the formula (10). A value of X in this formula (10) is changed from zero to the distance (DXY).

Similar to the above outline processing circuit 100, the internal drawing processing circuit 200 changes end point addresses (MX, MY) of a basic pattern stored to the frame memory 20 when the basic pattern is deformed.

Data corresponding to the polygon are calculated by the digital differential analysis (DDA) from addresses (MXS(Y), MYS(Y)) and (MXE(Y), MYE (Y)) of the basic pattern every Y-address read out of the end point memory 10 in accordance with the following formulas (15) to (17).

$$DXY = XE(Y) - XS(Y) \quad (15)$$

$$DDMX = \frac{MXE(Y) - MXS(Y)}{DXY} \quad (16)$$

$$DDMY = \frac{MYE(Y) - MYS(Y)}{DXY} \quad (17)$$

Namely, data from terminal point data to starting point data on each of the polygonal sides are calculated by the digital differential analysis (DDA).

Differential values (DDMX) and (DDMY) of these data are calculated as shown by the formulas (16) and (17). Further, data (MX) and (MY) from the terminal point to the starting point on each of the polygonal sides are calculated by making interpolating calculations as shown by the following formulas (18) and (19).

$$MX = MXS(Y) + DDMX*X \quad (18)$$

$$MY = MYS(Y) + DDMY*X \quad (19)$$

A value of X in these formulas (18) and (19) is changed from zero to the distance (DX).

An X-address SX as a screen address for displaying data by the CRT 40 is calculated by XS+X.

Figure 94:
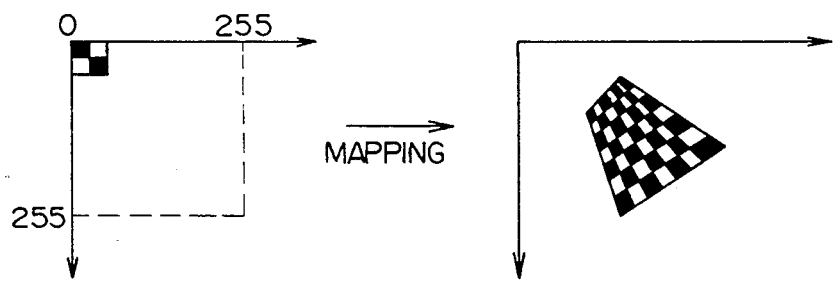
FIG. 94 is a typical view for explaining a repetitive pattern mapping processing.

In the case of the mapping of the repetitive pattern, the mapping is executed by the repetition of the pattern of $2^a$ width with respect to x direction and $2^b$ width with respect to y direction as shown in FIG. 94 according to following formulas (18)', (19)', (18)'' and (19)''.

$$MX_{(lower\ a\ bits)} = MXS(Y) + DDMX*X \quad (18)'$$

$$MY_{(lower\ b\ bits)} = MYS(Y) + DDMY*Y \quad (19)'$$

$$MX_{(upper\ c\ bits)} = MsegL \quad (18)''$$

$$MY_{(upper\ d\ bits)} = MsegH \quad (19)''$$

To display data by the CRT 40, a drawing processing circuit 35 reads matching pattern addresses (MX, MY) provided by deforming the basic pattern of a polygon having a higher priority order every X-address at a Y-address corresponding to a horizontal scanning signal. This polygon having a higher priority order is a polygon having a smaller Z-value indicative of the priority order. The drawing processing circuit 35 designates an address of a mapping memory 30 in accordance with these matching pattern addresses. The drawing processing circuit 35 then reads information corresponding to this designated address by using the mapping memory 30 as a lookup table. This information is displayed by a CRT 40. As a result, as shown in FIGS. 17 and 18, it is possible to deform and display basic patterns shown in FIGS. 15 and 16 in accordance with polygonal shapes shown in FIG. 14. In FIG. 17, the basic pattern shown in FIG. 15 is changed in accordance with polygon 1 shown in FIG. 14. In FIG. 18, the basic pattern shown in FIG. 16 is changed in accordance with polygon 2 shown in FIG. 14.

Figure 95:
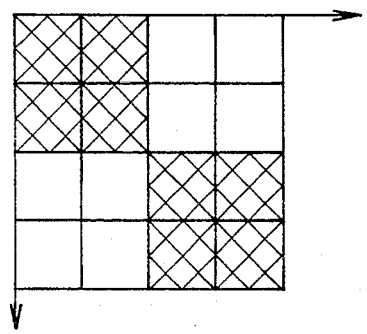
FIG. 95 is a typical view showing further example of the basic pattern stored to the mapping memory.
Figure 96:
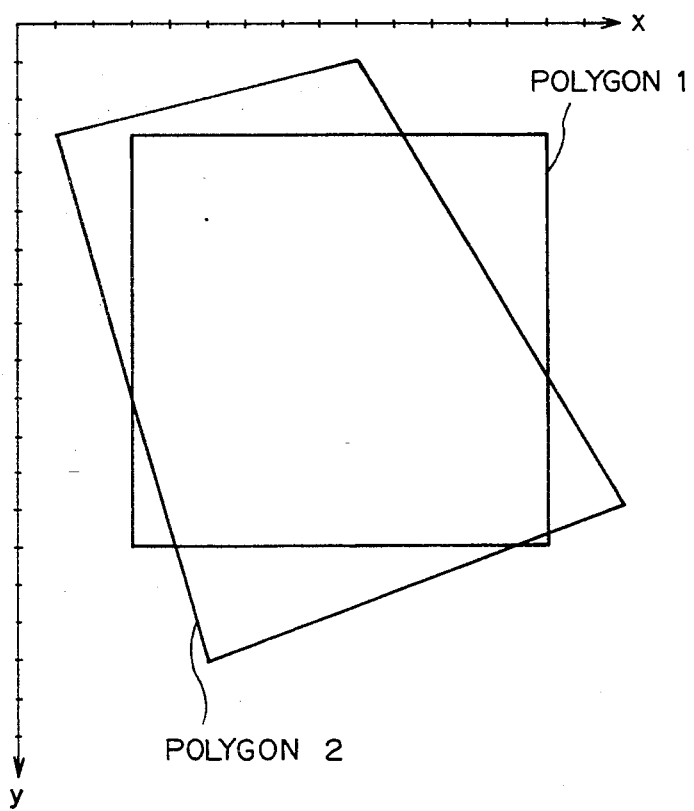
FIG. 96 is a typical view showing outlines of two polygons.
Figure 97:
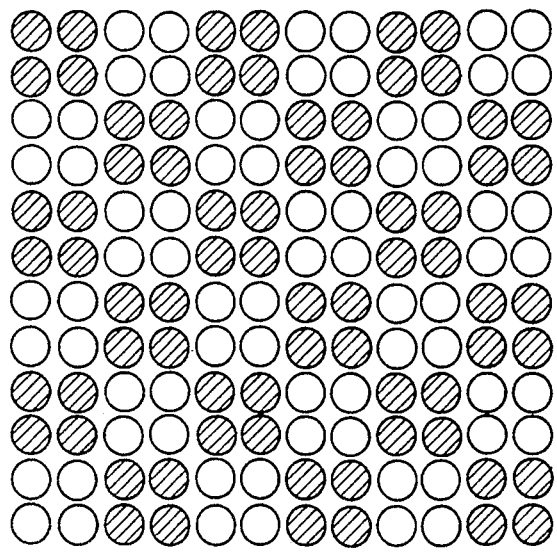
FIG. 97 is a typical view showing a state in which the basic pattern shown in FIG. 95 is deformed in accordance with polygon 1 shown in FIG. 96.
Figure 98:
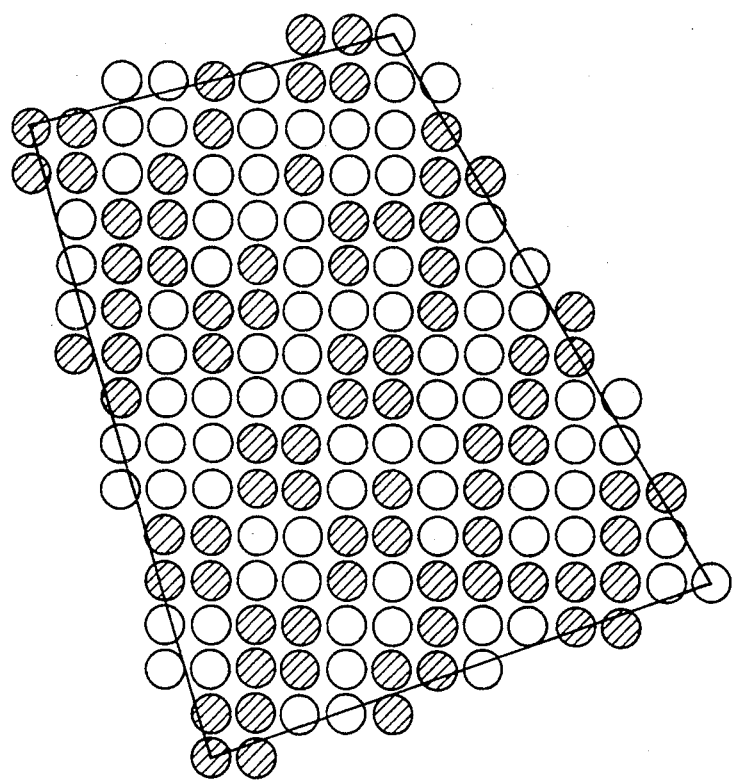
FIG. 98 is a typical view showing a state in which the basic pattern shown in FIG. 95 is deformed in accordance with polygon 2 shown in FIG. 96.

In the case of the execution of the repetitive pattern, as shown in FIGS. 97 and 98, it is possible to display basic patterns shown in FIG. 95 in accordance with polygonal shapes shown in FIG. 96. In FIG. 97, the basic pattern shown in FIG. 95 is changed in accordance with polygon 1 shown in FIG. 96. In FIG. 98, the basic pattern is changed in accordance with polygon 2 shown in FIG. 96.

Concrete examples of the outline processing circuit 100 and the internal processing circuit 200 disposed in the image processor in this embodiment will next be described with reference to FIGS. 6 to 10.

FIG. 6 is a block diagram showing the construction of the outline processing circuit 100. FIG. 7 is a block diagram showing the construction of the internal processing circuit 200. FIGS. 8 and 9 are flow charts showing an operation of the outline processing circuit 100. FIG. 10 is a flow chart showing an operation of the internal processing circuit 200.

An operation of the image processor in this embodiment will next be described with reference to the flow charts shown in FIGS. 8 to 10 and examples of electric circuits shown in FIGS. 6 and 7.

First, the CPU 50 as a controller reads the number (P) of the polygons from an end point memory 10 and further reads the number of polygonal corners to be processed. The number of polygonal corners is stored to a memory for internal processing.

Then, starting points (XS, YS, MXS, MYS) are read out of the end point memory 10 and the number of addresses of the end point memory is incremented. Thus, terminal points (XE, YE, MXE, MYE) are respectively read out of the end point memory 10.

A directional vector is calculated from the read starting points (XS) and (YS) and the read terminal points (XE) and (YE). This directional vector is set to a vector on the left-hand or right-hand side of a polygon.

Data at points (YE) and (YS) are transmitted from the frame memory 10 to a substracter 52 constituting a differential circuit of a polygonal outline processing circuit 51 disposed in the outline processing circuit 100. Thus, a distance (DY) between these points is calculated. This distance (DY) is transmitted to each of a differential arithmetic circuit 53 and a differential arithmetic circuit 72 of a mapping pattern outline processing circuit 71.

Starting point (XS) data and terminal point (XE) data are transmitted from the end point memory 10 to a substracter 54 disposed within the differential arithmetic circuit 53. Substracted results XE−XS from this substracter 54 are transmitted to a divider 55.

This divider 55 calculates (XE−XS)/DY and a divided value (DDX) is transmitted to an adder 57 of an interpolating arithmetic circuit 56. This adder 57 calculates X+DDX and the added value (X+DDX) is written to a register 58 and is further written as an X-address to a frame memory 20 from the register 58. An output of the register 58 is transmitted to one input portion of the adder 57 so that an interpolating calculation is made by this interpolating arithmetic circuit 56.

End point addresses (MXS, MYS) and (MXE, MYE) of a read basic pattern are transmitted from the end point memory 10 to the mapping pattern outline processing circuit 71. Then, (MXE−MXS) and (MYE−MYS) are calculated by a substracter 73 and are transmitted to a divider 74.

DY is also transmitted to the divider 74 from the substracter 52 of the differential circuit. Thus, the divider 74 divides each of (MXE−MXS) and (MYE−MYS) by DY, thereby calculating a differential value.

This differential arithmetic circuit 72 calculates DMX=(MXE−MXS)/DY and DMY=(MYE−MYS)/DY and the calculated results are transmitted to an adder 76 disposed in an interpolating arithmetic circuit 75.

In the interpolating arithmetic circuit 75, the adder 76 adds an output of the differential arithmetic circuit 72 to previous data set in a register 77, thereby calculating MX=MX+DMX and MY=MY+DMY. These added values are transmitted to the register 77 and an output value of this register 77 is written to the frame memory 20 as address data of a mapping pattern. The output of the register 77 is also transmitted to one input portion of the adder 76 so that an interpolating calculation is made by the interpolating arithmetic circuit 75.

As shown in FIGS. 20 to 22, the frame memory 20 stores X-addresses on polygonal sides on the left-hand and right-hand sides, X-addresses of a mapping pattern on the left-hand and right-hand sides thereof, Y-addresses of the mapping pattern on the left-hand and right-hand sides thereof, and a Z-value every Y-address.

As shown in FIGS. 23 and 24, the X-addresses on polygonal sides on the left-hand and right-hand sides, the X-addresses of a mapping pattern on the left-hand and right-hand sides thereof, the Y-addresses of the mapping pattern on the left-hand and right-hand sides thereof, and the Z-value every Y-address corresponding to a scanning line are finally written to the frame memory 20. Further, the number of polygons every Y-address is written to a polygonal counting memory although this number is not shown in FIGS. 23 and 24.

The internal processing circuit 200 will next be described in detail with reference to FIGS. 7 and 10.

The internal processing circuit (or the internal figure-drawing processing circuit) 200 reads an X-address between two opposite polygonal sides and addresses (XS, XE, MXS, MXE) of the mapping pattern every Y-address from the frame memory 20. Namely, in this embodiment, the internal processing circuit 200 reads starting and terminal points (XS) and (XE) of X showing an outline of a polygon corresponding to the Y-address as a vertical position from the frame memory 20 in synchronization with a horizontal scanning signal. Further, the internal processing circuit 200 reads mapping addresses (MXS, MYS) and (MXE, MYE) provided by deforming the basic pattern from the frame memory 20 in synchronization with the horizontal scanning signal. Point data (XE) and (XS) from the frame memory 20 are transmitted to a substracter 80 constituting a differential circuit of the internal processing circuit 200, thereby calculating a distance (DX) between these points (XE) and (XS). The calculated distance (DX) is transmitted to a differential arithmetic circuit 81.

Starting point (MXS, MYS) data and terminal point (MXE, MYS) data at the mapping addresses are transmitted from the frame memory 20 to a substracter 82 disposed within the differential arithmetic circuit 81. Subtracted results (MXE−MXS) and (MYE−MYS) from this subtracter 82 are transmitted to a divider 83.

This divider 83 calculates (MXE−MXS)/DX and (MYE−MYS)/DX. Divided values (DDMX) and (DDMY) are transmitted to a multiplier 86 disposed in an interpolating arithmetic circuit 84. An output of a counter 88 for generating a sequential number from zero to DX is transmitted to one input portion of this multiplier 86. The multiplier 86 calculates DDMX*X and DDMY*Y and calculated results thereof are transmitted to an adder 87. The starting points (MXS, MYS) at the mapping addresses are transmitted from the frame memory 20 to this adder 87. Thus, the starting point data are added to the calculated results of the multiplier 86 so that an interpolating calculation is made. An address arithmetic circuit 85 for internal pattern information is constructed by the multiplier 86 and the adder 87. Interpolated data are transmitted to the drawing processing circuit 35.

The number of X-addresses is increased or incremented by one every time the above calculation at one X-address is made. The above calculation is repeatedly made until the X-address is equal to DX. Further, the number of Y-addresses is incremented every time the above calculation at one Y-address is completely made. When image processings corresponding to all the Y-addresses are completed, the interpolating operation in internal processing is completed.

An X-address SX as a screen address for displaying data by the CRT 40 is calculated by XS+X.

To display data by the CRT 40, the drawing processing circuit 35 reads matching pattern addresses (MX, MY) provided by deforming the basic pattern of a polygon having a higher priority order every X-address at a Y-address corresponding to a horizontal scanning signal. This polygon having a higher priority order is a polygon having a smaller Z-value indicative of the priority order. The drawing processing circuit 35 designates an address of the mapping memory 30 in accordance with these matching pattern addresses. The drawing processing circuit 35 then reads information corresponding to this designated address by using the mapping memory 30 as a lookup table. This information is displayed by the CRT 40.

Figure 14:
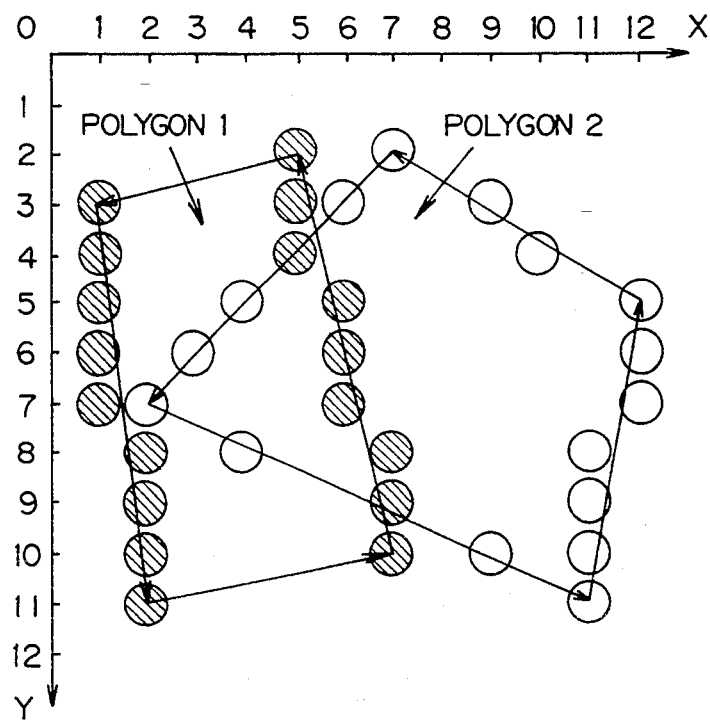
FIG. 14 is a typical view showing a state in which the outline of a polygon is drawn by the outline processing circuit.

As a result, as shown in FIGS. 17 and 18, it is possible to deform and display basic patterns shown in FIGS. 15 and 16 in accordance with polygonal shapes shown in FIG. 14.

Concrete examples of the above constructional portions of the image processor constructed above will next be described.

Figure 11:
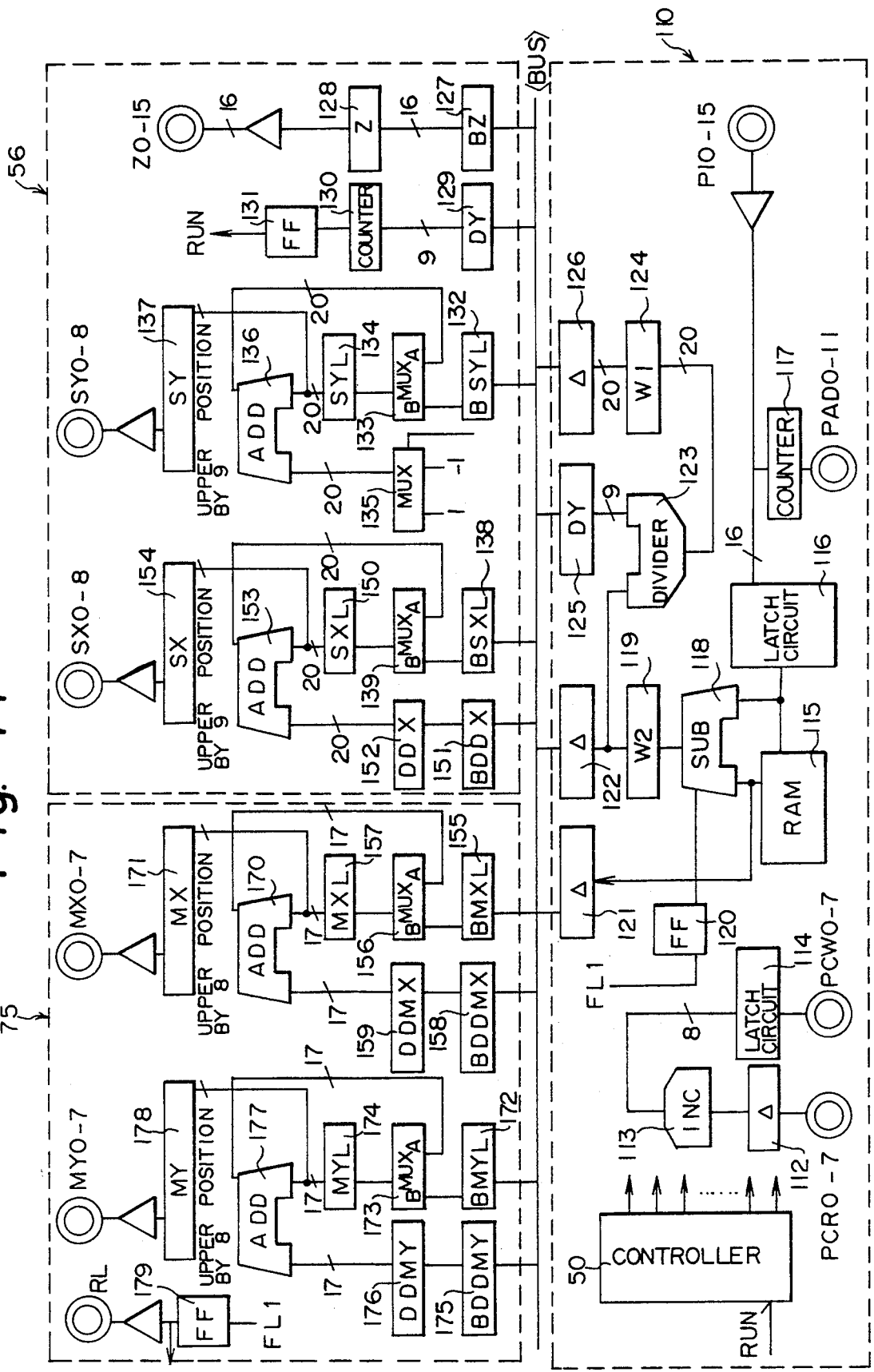
FIG. 11 is a circuit diagram showing a concrete construction of the outline processing circuit used in the present invention.
Figure 13:
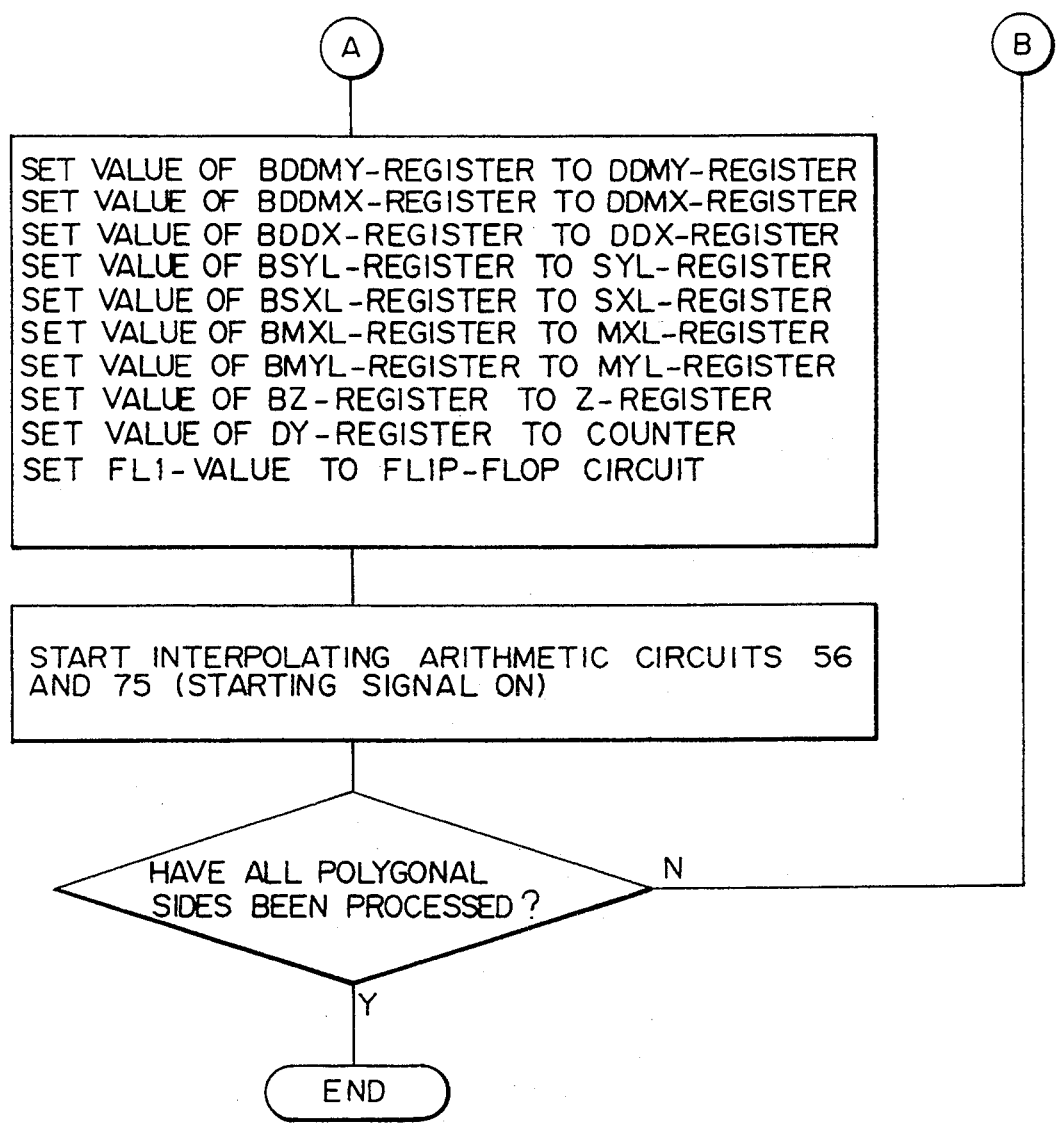
FIG. 13 is a flow chart showing an operation of the outline processing circuit shown in FIG. 11.

FIG. 11 is a circuit diagram showing a concrete example of the outline processing circuit 100. FIGS. 12 and 13 are flow charts showing an operation of the outline processing circuit 100.

In FIG. 11, the operation of the outline processing circuit 100 is controlled by a CPU 50 as a controller. This CPU or controller 50 controls operations of the subtracter or differential circuit 52, the differential arithmetic circuits 53, 72 and the interpolating arithmetic circuits 56, 75 to make an interpolating calculation by the digital differential analysis (DDA) between end points in accordance with the flow charts shown in FIGS. 12 and 13.

The subtracter or differential circuit 52 and the differential arithmetic circuits 53 and 72 are used to calculate each of parameters used in the interpolating calculation in the interpolating arithmetic circuits 56 and 75. The differential circuit 52 and the differential arithmetic circuits 53 and 72 can be constructed by a common electric circuit. Accordingly, in the following description, the differential circuit 52 and the differential arithmetic circuits 53 and 72 will be explained as a parameter arithmetic section 110 as one circuit block.

In FIG. 11, reference numerals 112 and 113 respectively designate an input buffer and an incrementer (or an incremental computer). A counting data value of a polygonal counting memory inputted from the input buffer 112 is incremented by one using the incrementer 113 and is transferred to a latch circuit 114.

The latch circuit 114 receives and transfers incremental data of the incrementer 113 to the polygonal counting memory.

End point data read out of the end point memory 10 are temporarily stored to a latch circuit 116 and are transferred to a RAM 115 for internal processing. The end point data read out of the end point memory 10 and provided at only each of starting points (XS, MXS, MYS) are stored to this RAM 115.

An address of the end point memory 10 is generated by a counter 117.

Reference numerals 118 and 119 respectively designate a subtracter and a register. Y-starting point (YS) read out of the RAM 115 and Y-terminal point (YE) read out of the end point memory 10 are inputted to the subtracter 118. This subtracter 118 subtracts point (YS) from point (YE) and a subtracted value W2 (DY) is temporarily stored to the register 119.

This value (DY) is then stored to a register 125.

The subtracter 118 further inputs X-starting point (XS) read out of the RAM 115, X-terminal point (XE) read out of the end point memory 10, starting points (MXS, MYS) of a mapping pattern, and terminal points (MXE, MYE) read out of the end point memory 10. The subtracter 118 respectively subtracts XS, MXS and MYS from XE, MXE and MYE.

A flip-flop circuit 120 stores a carry generated by processing of YE−YS at screen coordinates. Thus, when a polygon is rotated only in a rightward direction, upward and downward directions are respectively set on the right-hand and left-hand sides of the polygon as shown in FIGS. 24 to 26 and are set to portions of addresses of the frame memory 20.

In FIG. 11, reference numerals 121 and 122 respectively designate three-state buffers.

Further, reference numerals 123 and 124 respectively designate a divider and a register. The divider 123 divides each of (XE−XS), (MXE−MXS) and (MYE−MYS) provided in the subtracting processing of the subtracter 118 by DY. A divided value W1 provided by this divider 123 is temporarily stored to the register 124.

Reference numeral 126 designates a three-state buffer.

As shown by the flow chart in FIG. 12, the above parameter arithmetic section 110 first calculates a screen address X and then calculates addresses MX and MY of the mapping pattern. The respective parameters obtained by these calculations are transmitted to the interpolating arithmetic circuits 56 and 75.

The constructions of the interpolating arithmetic circuits 56 and 75 will next be described.

A BZ-register 127 temporarily stores a Z-value transferred from the parameter arithmetic section 110.

A register 128 stores the Z-value of the BZ-register 127 by receiving a starting signal from the parameter arithmetic section 110 and outputs this Z-value to the frame memory 20.

A register 129 stores a value (DY) as (YE−YS) at the screen coordinates calculated by the parameter arithmetic section 110. A counter 130 stores the value (DY) of the DY-register 129 by receiving the starting signal from the parameter arithmetic section 110. A counting-down operation of this counter 130 is performed every memory cycle. The counter 130 controls operations of the interpolating arithmetic circuits 56 and 75 such that these interpolating arithmetic circuits perform the above processings while no counting value of the counter 130 is equal to zero.

A flip-flop circuit 131 receives the value of a zero flag indicative of the counting value of the counter 130 and outputs this flag value as a RUN signal.

A BSYL-register 132 temporarily stores value YS at the screen coordinates transferred from the parameter arithmetic section 110.

A multiplexer 133 transfers the value YS of the BSYL-register 132 to an SYL-register 134 only when the multiplexer 133 receives a starting signal. The multiplexer 133 transfers an output of an adder 136 to the SYL-register 134 except when the multiplexer 133 receives the starting signal.

The SYL-register 134 calculates a Y-address at the screen coordinates on a polygonal side by updating its register value every memory cycle.

A multiplexer 135 transfers values "1" and "−1" to the adder 136 if the polygonal side is directed downward and upward, respectively.

An SY-register 137 transfers an SY-address to the frame memory 20 by storing an output value of the SYL-register 134 every memory cycle while the RUN signal is in a turning-on state.

A BSXL-register 138 temporarily stores value XS at the screen coordinates transferred from the parameter arithmetic section 110.

A multiplexer 139 transfers the value XS of the BSXL-register 138 to an SXL-register 150 only when the multiplexer 139 receives a starting signal. The multiplexer 139 transfers an output of an adder 153 to the SXL-register 150 except when the multiplexer 139 receives the starting signal.

The SXL-register 150 calculates an X-address at the screen coordinates on the polygonal side by updating its register value every memory cycle.

A BDDX-register 151 temporarily stores a parameter and (XE−XS)/DY transferred from the parameter arithmetic section 110. XE and XS respectively designate terminal and starting points of X at the screen coordinates.

A DDX-register 152 stores an output value of the BDDX-register 151 by receiving a starting signal and transfers this output value to an adder 153.

An SX-register 154 transfers SX-data to the frame memory 20 by storing an output value of the SXL-register 150 every memory cycle while the RUN signal is in a turning-on state.

A BMXL-register 155 temporarily stores starting point MXS at mapping pattern coordinates transferred from the parameter arithmetic section 110.

A multiplexer 156 transfers the value MXS of the BMXL-register 155 to an MXL-register 157 only when the multiplexer 156 receives a starting signal. The multiplexer 156 transfers an output of an adder 170 to the MXL-register 157 except when the multiplexer 156 receives the starting signal.

The MXL-register 157 calculates an X-address at the mapping coordinates on the polygonal side by updating its register value every memory cycle.

A BDDMX-register 158 temporarily stores a parameter and (MXE−MXS)/DY transferred from the parameter arithmetic section 110. MXE and MXS respectively designate terminal and starting points of X at the mapping coordinates.

A DDMX-register 159 stores an output value of the BDDMX-register 158 by receiving a starting signal and transfers this output value to an adder 170.

An MX-register 171 transfers data MX to the frame memory 20 by storing an output value of the MXL-register 157 every memory cycle while the RUN signal is in a turning-on state.

A BMYL-register 172 temporarily stores Y-starting point MYS at the mapping pattern coordinates transferred from the parameter arithmetic section 110.

A multiplexer 173 transfers the value MYS of the BMYL-register 172 to an MYL-register 174 only when the multiplexer 173 receives a starting signal. The multiplexer 173 transfers an output of an adder 177 to the MYL-register 174 except when the multiplexer 173 receives the starting signal.

The MYL-register 174 calculates a Y-address at the mapping coordinates on the polygonal side by updating its register value every memory cycle.

A BDDMY-register 175 temporarily stores a parameter and (MYE−MYS)/DY transferred from the parameter arithmetic section 110. MYE and MYS respectively designate terminal and starting points of Y at the mapping pattern coordinates.

A DDMY-register 176 stores an output value of the BDDMY-register 175 by receiving a starting signal and transfers this output value to an adder 177.

An MY-register 178 transfers data MY to the frame memory 20 by storing an output value of the MYL-register 174 every memory cycle while the RUN signal is in a turning-on state.

A flip-flop circuit 179 stores value FL1 by receiving a starting signal and transfers an RL-signal as one portion of addresses of the frame memory 20.

Figure 27:
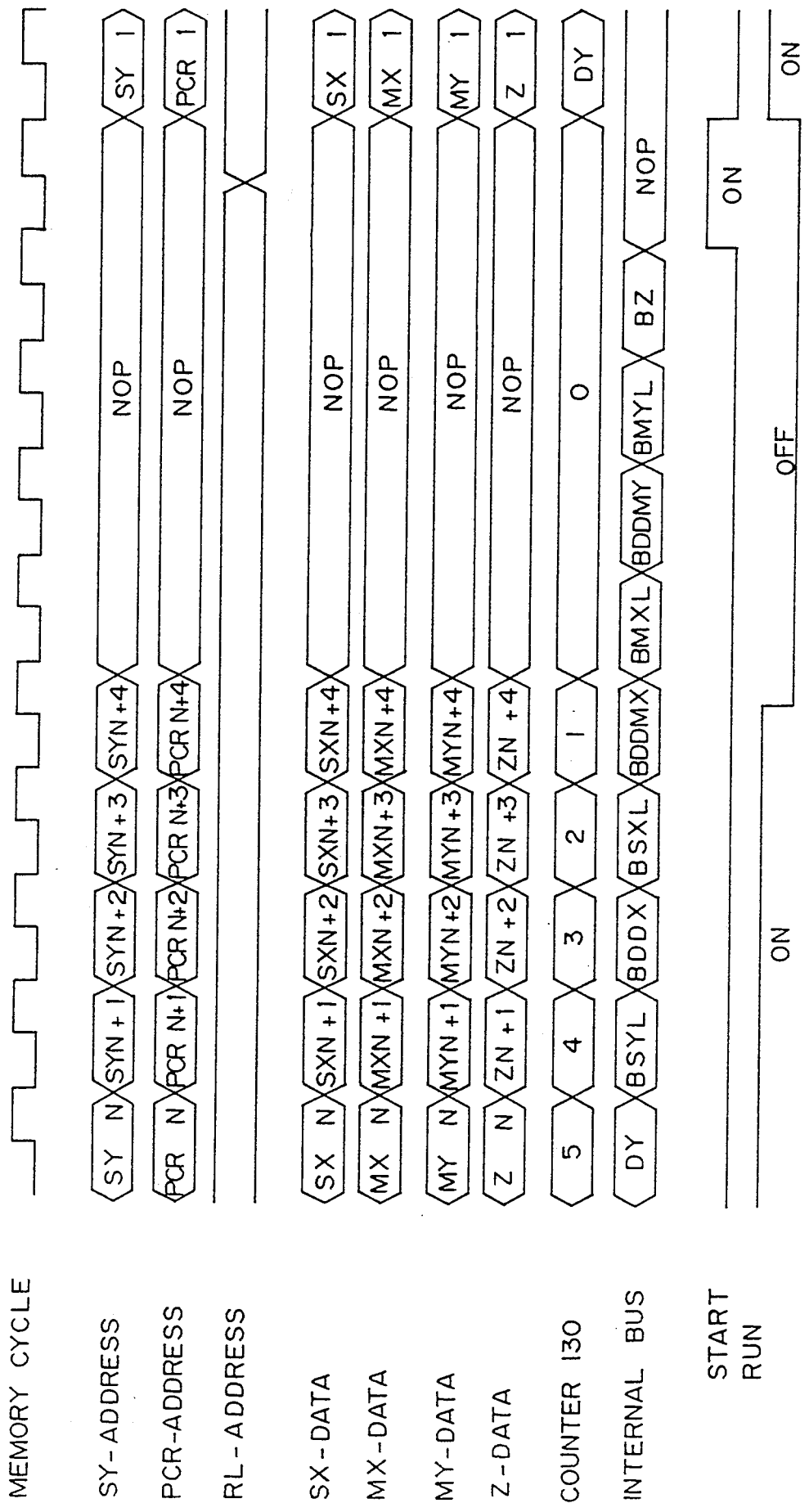
FIG. 27 is timing charts of interpolating arithmetic circuits 56 and 75 used in the present invention.

FIG. 27 is timing charts of the interpolating arithmetic circuits 56 and 75.

A concrete example of the internal processing circuit 200 used in the present invention will be further explained in detail. The internal processing circuit 200 provides pattern information data inside a polygon from a starting point to a terminal point every Y-address based on a polygonal outline and an outline of an internal pattern calculated by the above outline processing circuit 100.

In the image processor, a plurality of polygons are simultaneously displayed in many cases. In particular, when the plurality of polygons are overlapped and displayed, it is important how an overlapping region is filled with a color. Namely, it is necessary to synthesize and output an image signal at the real time without missing a polygon having a higher priority. Therefore, hidden face erasing processing of polygons is performed by using terminal and starting points of X calculated by the outline processing circuit 100 with respect to each of the polygons. With respect to a polygon hidden among polygons having high priorities and undisplayed by the CRT 40, entire image processing is performed at a high speed without processing information data of the internal pattern by the internal processing circuit 200.

A suitable hidden-face erasing processing function used in this embodiment will be first explained.

Figure 31:
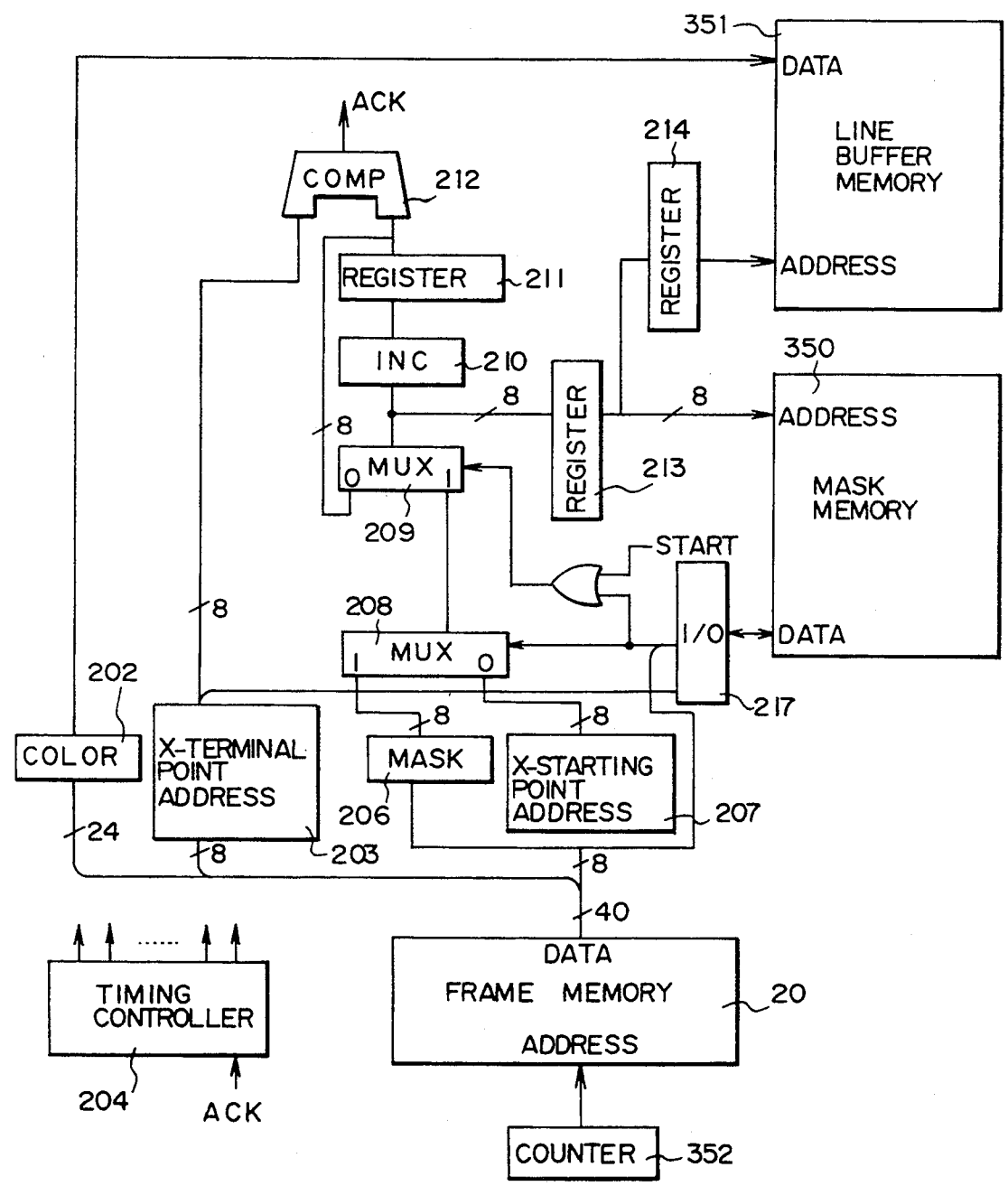
FIG. 31 is a circuit diagram showing one example of a hidden face erasing circuit used in an internal processor.

FIG. 31 is a circuit diagram showing one embodiment of a hidden-face erasing processing section. In this embodiment, a line buffer is used and 256 coordinates are set in an X-direction and $2^{24}$ colors can be displayed as color information. In this embodiment, the hidden face processing of four polygons shown in FIG. 34 will be explained.

In FIG. 31, a color register 202 stores color information of a polygon read out of a frame memory 20.

An X-terminal address register 203 stores an X-terminal point address of the polygon read out of the frame memory 20.

A timing controller 204 controls the timings of respective arithmetic units and registers.

The frame memory 20 stores color information and each of X-starting and X-terminal point addresses of each of polygons calculated by the above outline processing circuit 100. In this embodiment, the frame memory 20 stores the color information and the X-starting and X-terminal point addresses of each of the polygons on one line.

A counter 352 for controlling an operation of the frame memory 20 counts up when drawing processing of one polygon is completed. When the total number of polygons is counted, the counter 352 transmits the value of an ending flag to the timing controller 204.

A mask register 206 stores an X-starting point address of the polygon read out of the frame memory 20.

An X-starting point address register 207 stores an X-starting point address of the polygon read out of the frame memory 20.

The operation of a multiplexer 208 is controlled by a mask bit read out of a mask memory 350.

The operation of a multiplexer 209 is controlled by the mask bit and the timing controller 204.

An incrementer (incremental computer) 210 is used to perform a counting operation from the X-starting point to the X-terminal point.

A register 211 stores a counting value from the X-starting point to the X-terminal point.

A complexer 212 compares the counting value of the register 211 with an address value at the X-terminal point. When the counting value of the register 211 is equal to or greater than the address value at the X-terminal point, the complexer 212 turns signal ACK on and transmits this signal ACK to the timing controller 204.

A register 213 stores an address of a mask memory 350. A register 214 stores an address of a line buffer memory 351.

The line buffer memory 351 stores color information on one line.

The mask memory 350 stores a mask dot showing whether a picture element corresponding to each of addresses is drawn or not. The mask memory 350 also stores an X-terminal point address of a polygon at a drawing point of this picture element.

An I/O buffer 217 functions as a buffer for reading and writing data to the mask memory 350.

Figure 32:
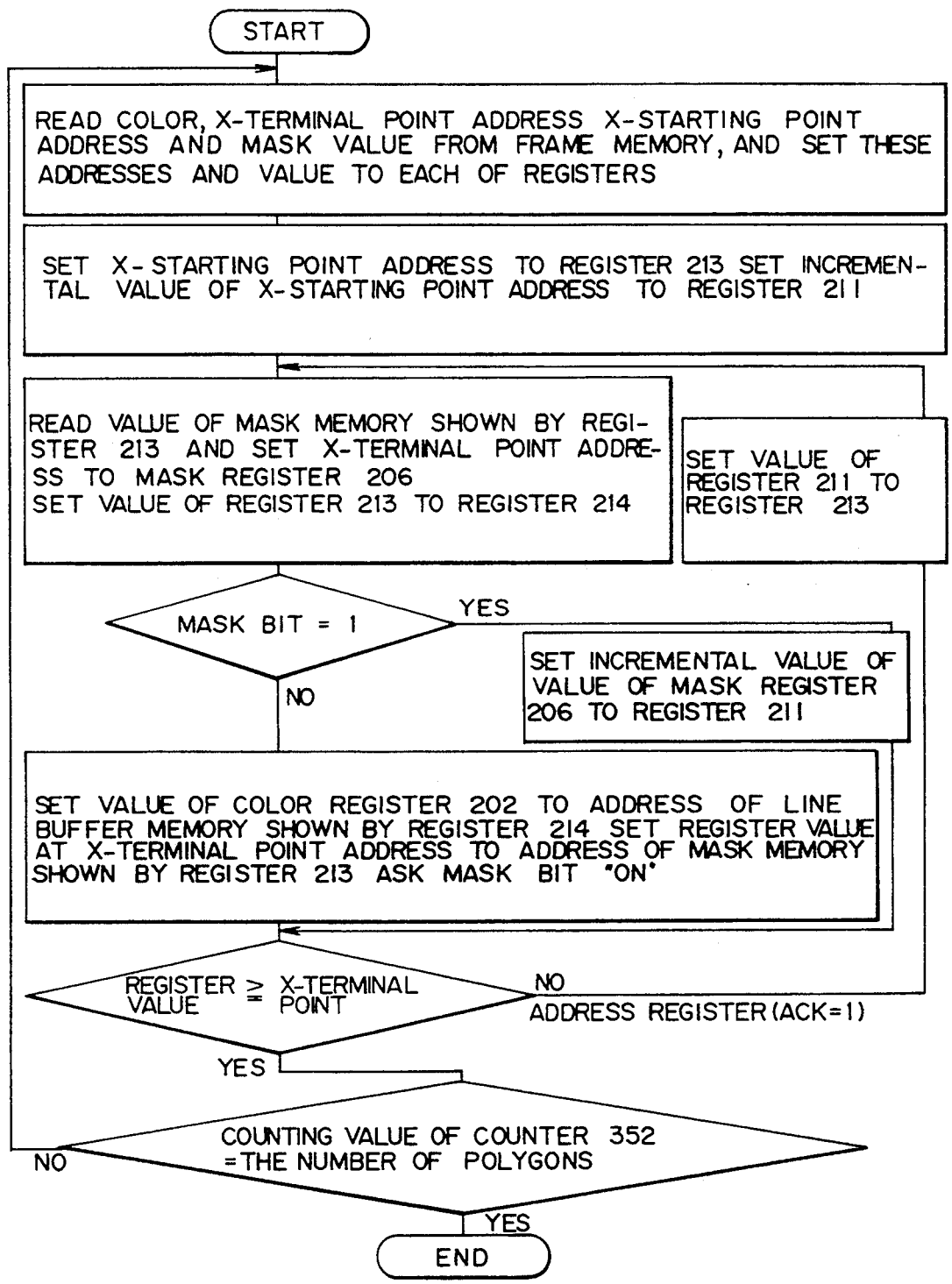
FIG. 32 is a flow chart showing an operation of the hidden face erasing circuit used in the internal processor in the present invention.

FIG. 32 is a flow chart showing an operation of the hidden face erasing circuit shown in FIG. 31.

Figures 33, 34:
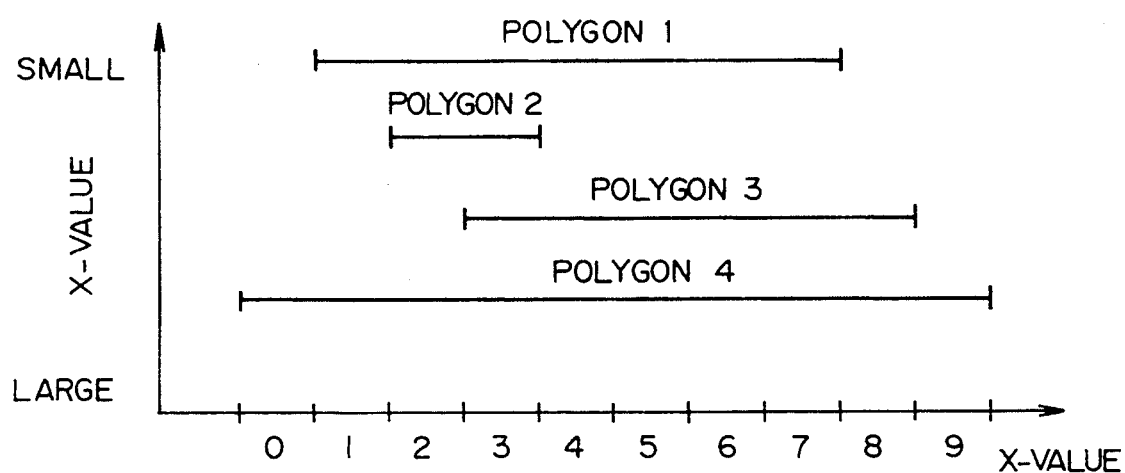
FIG. 33 is a table showing the relation between respective polygons in a Z-direction.
FIG. 34 is a view showing address states of a polygon memory used in the present invention.

The hidden face erasing processing of four polygons as shown in FIG. 33 will next be described.

FIG. 34 shows memory contents calculated by the outline processing circuit 100 and stored to the frame memory 20 in the example shown in FIG. 33.

FIGS. 35 to 39 show memory contents of the mask memory 350 and the line buffer memory 351 processed from the frame memory 20 in FIG. 31. The mask bit and the X-terminal point address constitute the memory contents of the mask memory 350. A color constitutes the memory contents of the line buffer memory 351.

FIG. 35 shows initial states of the mask memory 350 and the line buffer memory 351. The hidden face processing is performed from these initial states as shown in FIGS. 36 to 39.

First, polygon 1 having a highest priority is processed. FIG. 36 shows processed results of polygon 1. All mask bits are zero so that all the mask bits in a region of polygon 1 are set to "1" and an X-terminal point address is set to "7" and value "1" is written as a color.

Subsequently, polygon 2 is processed as follows.

FIG. 37 shows processed results of polygon 2. The mask bit is already set to "1" at X-address 2 at a starting point of polygon 2 so that an X-terminal point address at this X-address 2 is read and value "1" is added to this X-terminal point address. The added value is compared with the X-terminal point address of polygon 2. Since the X-terminal point address of polygon 2 is smaller than the added value, the processing of polygon 2 is completed so that the processed results are similar to those shown in FIG. 36.

The processing of polygon 3 is next processed.

FIG. 38 shows processed results of polygon 3. The mask bit is already set to "1" at X-address 3 at a starting point of polygon 3 so that an X-terminal point address at this X-address 3 is read and value "1" is added to this X-terminal point address. The added value is compared with the X-terminal point address of polygon 3. Since a mask bit is equal to "0", this mask bit is set to "1" and a writing operation is performed with respect to the X-terminal point address of polygon 3 and a color value. The next X-address is greater than the X-terminal point address of polygon 3, thereby completing the hidden face erasing processing.

The processing of polygon 4 is finally processed.

FIG. 39 shows processed results of polygon 4. The mask bit is equal to "0" at X-starting point address 1 of polygon 4 so that this mask bit is set to "1". Further, a writing operation is performed with respect to an X-terminal point address and a color value. Then, it proceeds to the next X-address 2. The mask bit is equal to "1" at the X-address 2. Therefore, an X-terminal point address is read out of the mask memory and it proceeds to X-address 8 provided by adding value "1" to this X-terminal point address. The mask bit at X-address 8 is also equal to "1". Therefore, an X-terminal point address is read out of the mask memory and it proceeds to X-address 9 provided by adding value "1" to this X-terminal point address. The mask bit at X-address 9 is equal to zero so that this mask bit is set to "1". A writing operation is then performed with respect an X-terminal point address and a color value. The next X-address is greater than the X-terminal point address of polygon 4 so that the hidden face erasing processing is completed.

In accordance with an access system used in this embodiment, the number of accesses of a drawing memory is equal to 10 and the number of accesses of the mask memory is equal to 14. Accordingly, the total number of accesses is equal to 24. In contrast to this, in an access system of the mask memory according to an area for all polygons as in the general mask system, 10 accesses of the drawing memory and 25 accesses of the mask memory are required so that 35 accesses are required as a total. Accordingly, in this embodiment, it is possible to greatly reduce the number of accesses of the mask memory so that the hidden face erasing processing can be performed at a high speed.

As mentioned above, in this embodiment, the mask memory has a region for storing an X-terminal point address of a visual polygon. Accordingly, no accesses of the mask memory according to an area for all the polygons as in the general mask system are required. Accordingly, it is possible to perform the hidden face erasing processing at a high speed since a hidden face can be erased by only accesses in accordance with an area very close to the area for the visual polygon.

The above hidden face processing circuit can be used when a basic pattern of the mapping memory 30 is constructed by a polygon having a single color. The operation of the internal processing circuit 200 will next be described when the basic pattern is further complicated.

The internal processing circuit in a second example has a mask memory 350 having a memory region for an X-terminal point address. Drawing processing of all polygons is performed by a mapping memory 30 in an order from a smaller X-address to a larger X-address. In this case, differences (DDMX, DDMY) between starting and terminal point values of X and Y of the mapping memory 30 are respectively calculated with respect to a difference between X-starting and X-terminal points of a polygon. Next, a mask bit is read out of the mask memory 350. Thereafter, if the mask bit is off, no previously processed polygon exists at a point shown by the mask bit. Accordingly, the mask bit is turned on and outline processing is executed. In this outline processing, DDMX x (present processing point − X-starting point) is added to the X-starting point of the mapping memory. Further, DDMY x (present processing point − X-starting point) is added to the Y-starting point of the mapping memory. Namely, internal data are calculated by the digital differential analysis from outline information of the polygon calculated by the outline processing circuit 100. An address of the mapping memory 30 at the above point is calculated and the mapping memory 30 is accessed and output data of this mapping memory are written to a line memory. Further, the mask bit and the X-terminal point value are written to the mask memory. If the mask bit is on, the previously processed polygon exists at the above point. Accordingly, the X-terminal point value is read out of the mask memory and is set at the present address of the mask memory 30. Thus, the present processing point is updated and the above processing is repeatedly performed until the present processing point exceeds the X-terminal point. Thus, an image is processed at a high speed by avoiding useless internal drawing processing.

A concrete example of the internal processing circuit 200 in the second example will be further described with reference to FIG. 40, etc.

Figure 40:
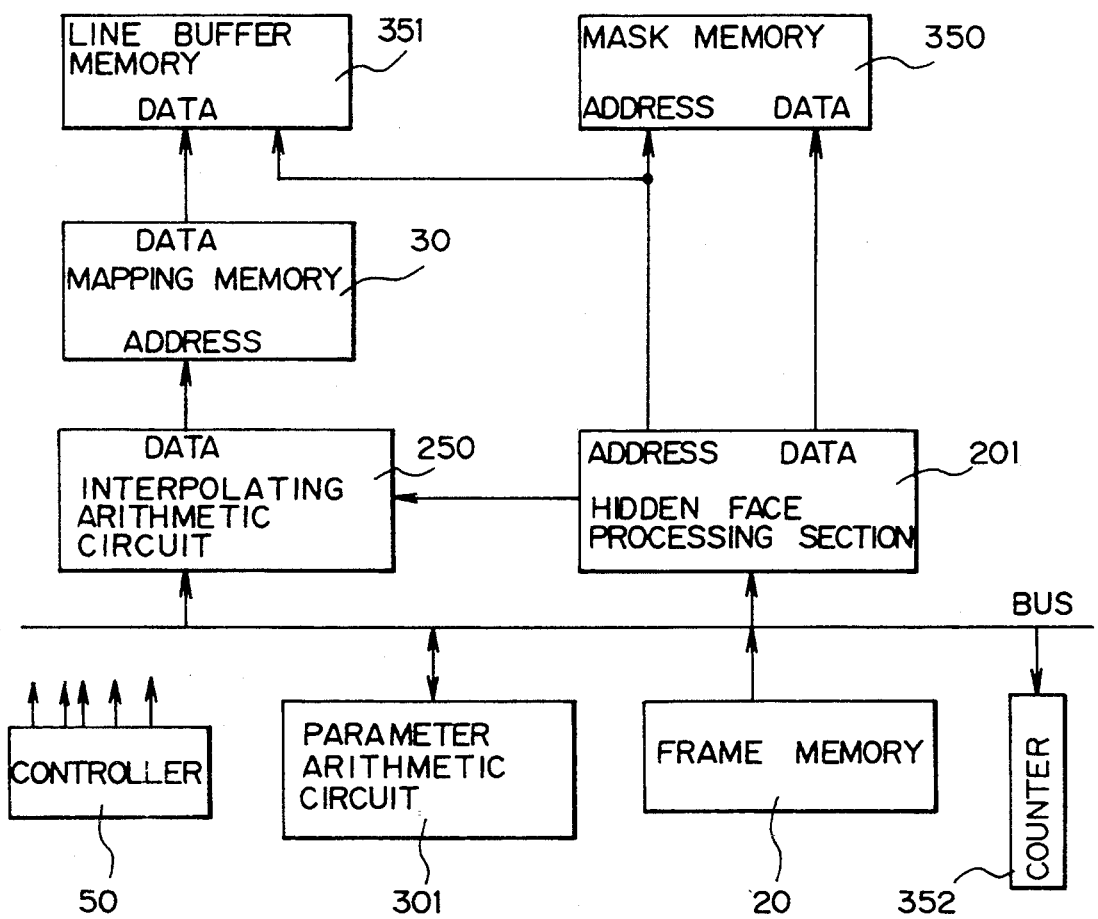
FIG. 40 is a block diagram showing the entire construction of an internal drawing circuit used as a second example in the present invention.

FIG. 40 is a block diagram showing an entire construction of the internal processing circuit 200.

In FIG. 40, a hidden face processing section 201 basically has a circuit structure similar to that shown in FIG. 31. This hidden face processing section 201 outputs only an address for writing color information to a line buffer memory 351 from an X-starting point to an X-terminal point by using a mask memory 350. The hidden face processing section 201 outputs this address by using address values at X-starting and terminal points set by a parameter arithmetic section 301. The hidden face processing section 201 transmits only a difference between this address and the X-starting point to an internal outline processing circuit (or an interpolating arithmetic circuit) 250 for drawing the interior of a polygon.

Figures 54, 55:
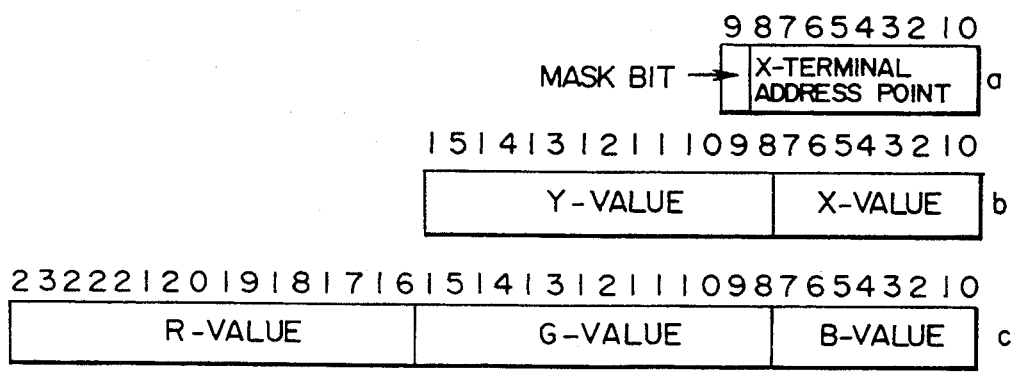
FIG. 54 is a table showing contents of the line buffer memory and addresses of the mapping memory processed from contents of the polygon memory in the internal processing circuit used in the second example, and showing contents of processed results of polygon 3.
FIG. 55 is a typical view showing data formats of a memory used in the present invention.

The mask memory 350 has data as shown by reference numeral a in FIG. 55 at the same address as the line buffer memory 351. The mask bit shows whether or not there is color information at this address. The mask bit is on when there is color information at this address. The mask bit is off when there is no color information at this address. An X-terminal point address of the polygon having the written color information is written to an X-terminal point address of the mask memory 350.

A counter 352 controls an operation of the frame memory 20 at an address thereof.

The frame memory 20 stores X-starting point address (XS) of a polygon calculated by the outline processing circuit 100, X-starting point address (MXS) of a mapping memory 30, Y-starting point address (MYS) of the mapping memory, X-terminal point address (XE) of the polygon, X-terminal point address (MXE) of the mapping memory 30, and Y-terminal point address (MYE) of the mapping memory 30.

The parameter arithmetic section 301 reads the X-starting point address and the X-terminal point address out of the frame memory 20. The parameter arithmetic section 301 also reads the X-starting point address and the X-terminal point address out of the mapping memory 30. Further, the parameter arithmetic section 301 reads the Y-starting point address and the Y-terminal point address out of the mapping memory 30. The parameter arithmetic section 301 calculates and transfers required parameters to the internal outline processing section 250 and the hidden face processing section 201.

This parameter arithmetic section 301 includes the differential circuit (subtracter) 80 and the differential arithmetic circuit (adder) 87 shown in FIG. 7.

The interpolating arithmetic circuit 250 receives a parameter calculated from the parameter arithmetic section 301 and also receives a difference between the present processing point and the X-starting point from the hidden face processing section 201. Thus, the interpolating arithmetic circuit 250 calculates addresses of X and Y of the mapping memory 30 at the present processing point and gets access to the mapping memory 30.

The line buffer memory 351 has a data format as shown by reference numeral c in FIG. 55.

Operations of the above constructional elements are controlled by a controller 50.

The mapping memory 30 is accessed by the internal outline processing section 250 in an address format shown by reference numeral b in FIG. 55. Accessed data of the mapping memory 30 are transferred to the line buffer memory 351.

The internal processing circuit used in this embodiment will next be described in detail with reference to FIG. 41.

Figure 41:
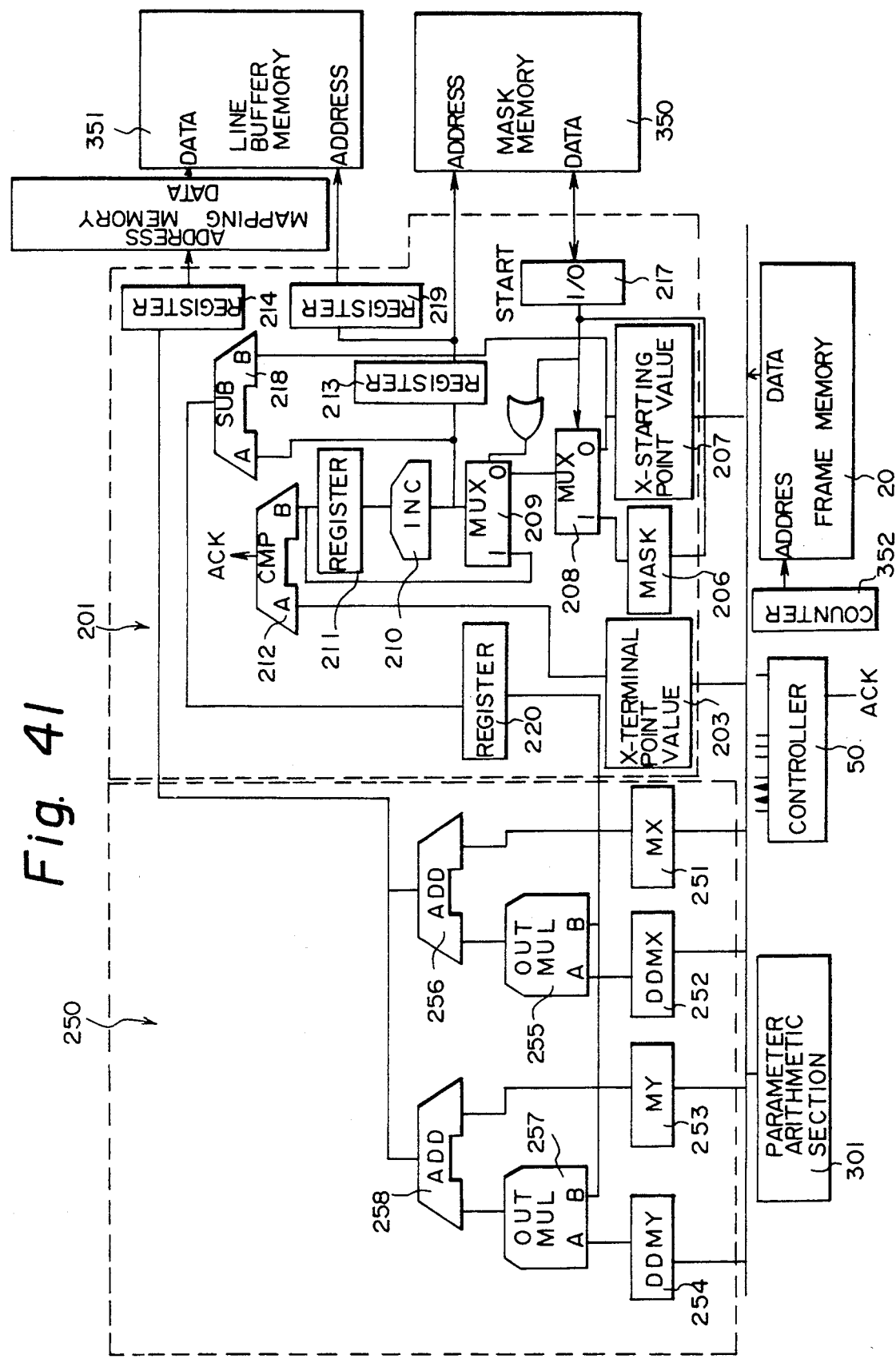
FIG. 41 is a circuit diagram showing the concrete construction of an internal drawing processing circuit used in the second example.

FIG. 41 shows a block diagram of the internal processing circuit 200 used in this embodiment.

Figure 48:
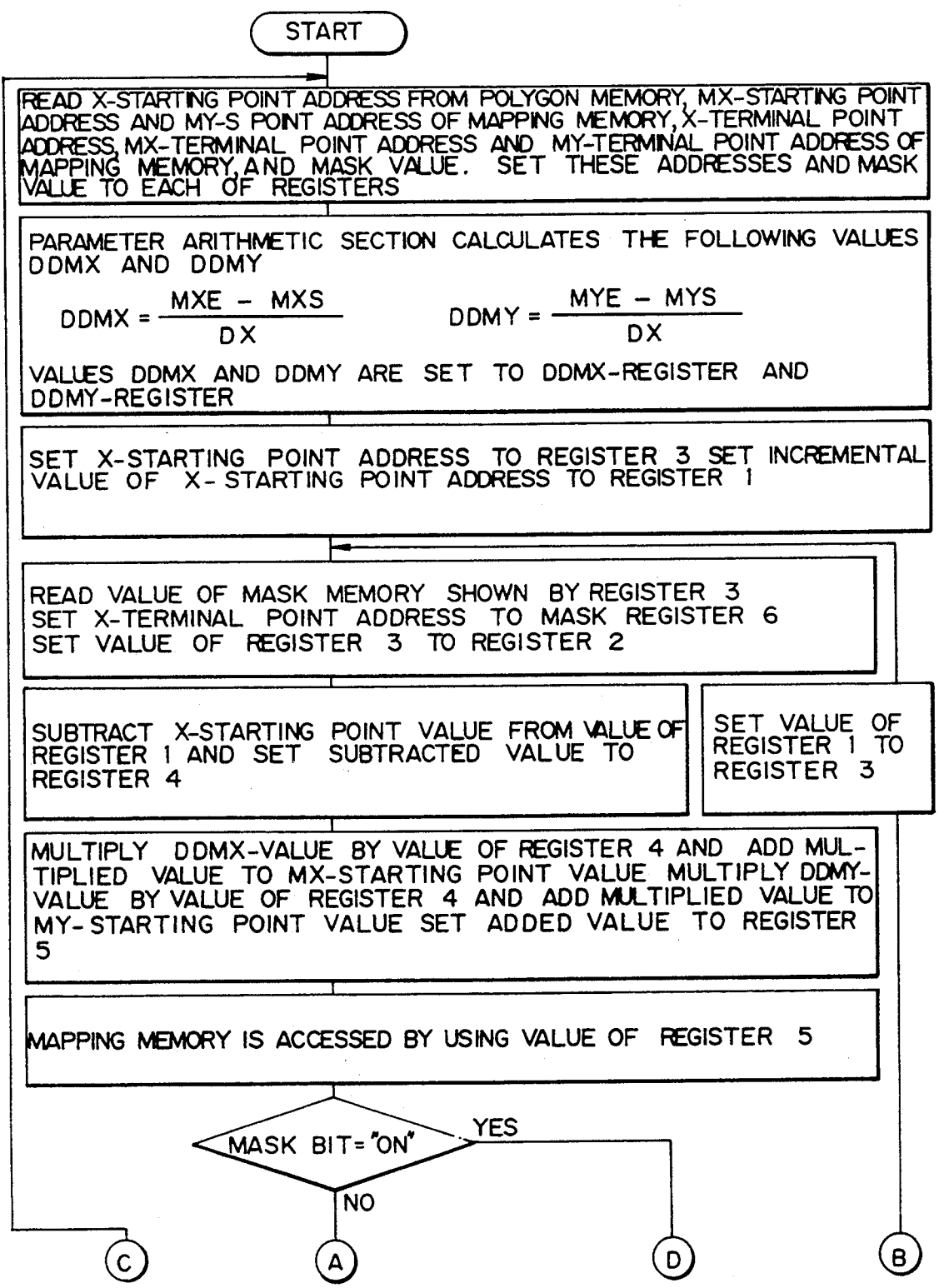
FIG. 48 is a flow chart showing an operation of the internal drawing processing circuit in the second example.
Figure 49:
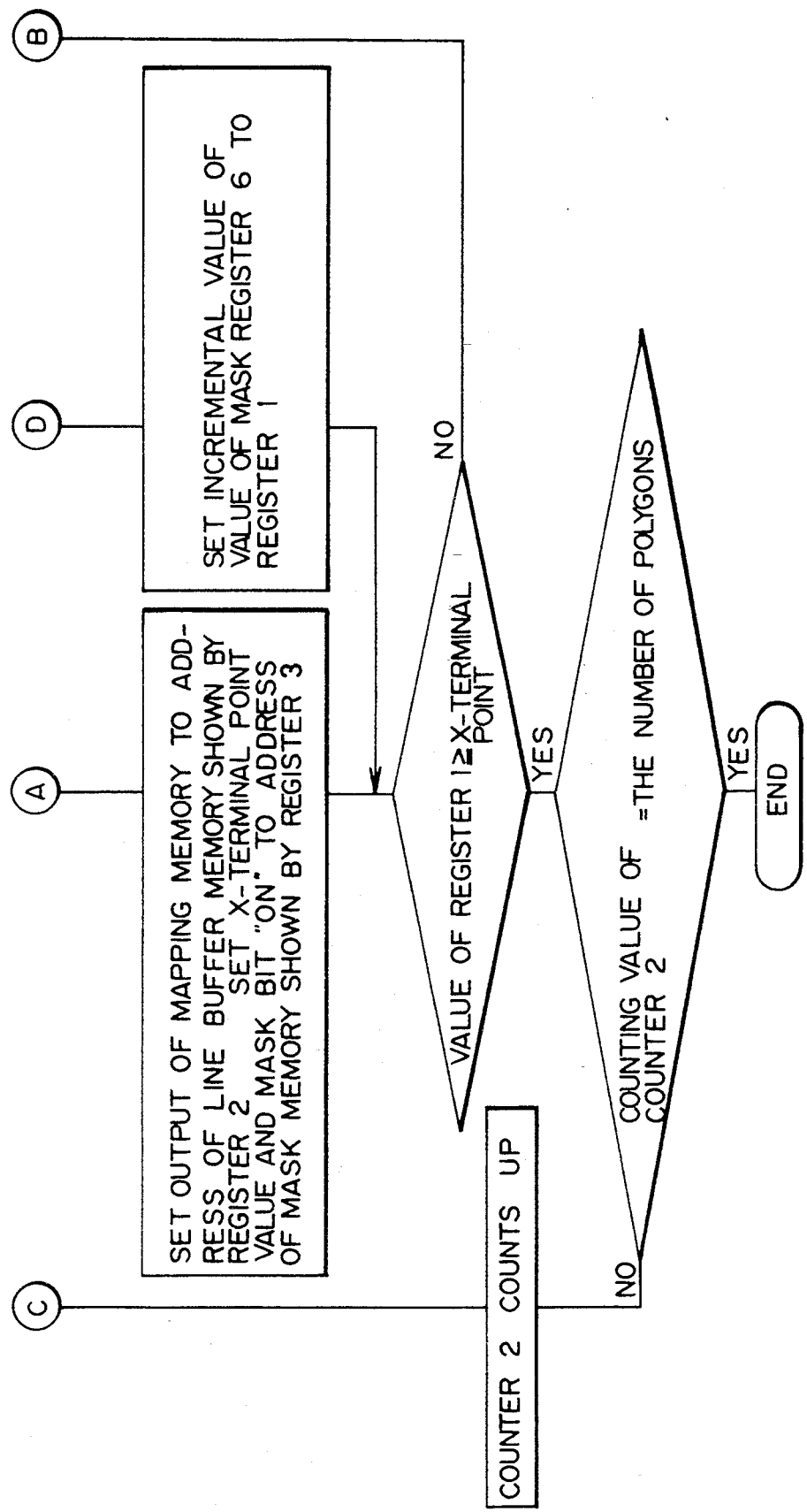
FIG. 49 is a flow chart showing an operation of the internal drawing processing circuit in the second example.

In FIG. 41, a controller 50 controls an entire operation of the internal processing circuit in accordance with operating flows of flow charts shown in FIGS. 48 and 49.

A register 220 stores a difference between the present processing point and an X-starting point transferred from a hidden face processing section 201 to an internal outline processing section 250.

A register 203 stores an X-terminal point address.

A register 206 stores a mask value.

A register 207 stores an X-starting point address.

A multiplexer 208 selects any one of the registers 206 and 207 by a mask bit.

Reference numerals 217, 350 and 351 respectively designate an I/O buffer, a mask memory and a line buffer memory.

A register 219 stores an address of the line buffer memory 351. A register 213 stores an address of the mask memory 350 and this address value is set as the present processing point.

A multiplexer 209 selects an output of any one of a register 211 and the multiplexer 208 by a mask bit or a starting signal.

An incrementer (incremental computer) 210 increments and outputs an output of the multiplexer 209 to the register 211. This register 211 stores an address value at the next processing point.

A comparator 212 compares an X-terminal point value with the next processing point and transfers compared results to the controller 50.

A subtracter 218 subtracts the X-starting point from the present processing point and outputs subtracted results to a register 220.

A register 251 stores an MX-starting point value.

A register 252 stores a DDMX-value calculated by the parameter arithmetic section 301.

A register 253 stores a Y-starting point of the mapping memory.

A register 254 stores a DDMY-value calculated by the parameter arithmetic section 301.

A multiplier 255 multiplies the DDMX-value by an output value of the register 220 and transfers multiplied results to an adder 256.

A multiplier 257 multiplies the DDMY-value by the output value of the register 220 and transfers multiplied results to an adder 258.

The adder 256 adds the X-starting point of the mapping memory 30 to an output of the multiplier 255 and transfers added results to a register 214.

The adder 258 adds the Y-starting point of the mapping memory 30 to an output of the multiplier 257 and transfers added results to the register 214.

The register 214 stores an address of the mapping memory 30.

Figures 42, 43:
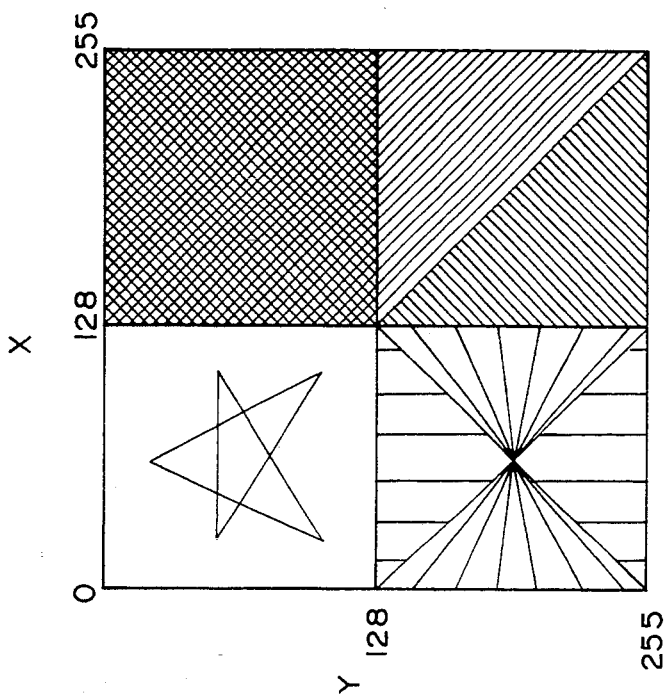
FIG. 42 is a table showing contents of a mask memory used in the second example.
FIG. 43 is a typical view showing one example of a basic pattern stored to a mapping memory.

A mapping pattern shown in FIG. 43 is stored to the mapping memory 30.

Similar to the above case, the outline processing of four polygons as shown in FIG. 42 will next be described.

FIG. 42 shows contents of the frame memory 20 made from the example shown in FIG. 33.

FIGS. 50 to 54 show contents of the mask memory 350 processed from the contents of the frame memory 20 shown in FIG. 42. FIGS. 50 to 54 also show addresses accessed from the internal outline processing section 250 to the mapping memory 30. FIGS. 50 to 54 further shows contents of the line buffer memory 351. A mask bit and an X-terminal point address constitute the contents of the mask memory. Blank portions shown in FIGS. 51 to 54 respectively show initial values of the above memories.

FIG. 50 shows initial states of the above memories.

Polygon 1 having a highest priority is first processed.

FIG. 51 shows processed results of polygon 1. All mask bits are equal to value "0" so that all the mask bits in a region of polygon 1 are set to value "1" and an X-terminal point address is set to value "5". An outline processor X-terminal point 18 and Y-terminal point 14 of the mapping memory from X-starting point 10 and Y-starting point 10 thereof. The outline processor then gets access to the mapping memory 30 and writes an output of the mapping memory 30 to the line buffer memory 351 from an X-starting point address to an X-terminal point address.

FIG. 52 shows processed results of polygon 2. A mask bit is already set to value "1" at 2 at a starting point of polygon 2. Therefore, an X-terminal point address of polygon 2 is read and value "1" is added to this point address. An added value is compared with an X-terminal point address of polygon 2. Since the X-terminal point address of polygon 2 is smaller than the added value, the processing of polygon 2 is completed and no mapping operation is performed.

FIG. 53 shows processed results of polygon 3. The mask bit is already set to value "1" at 3 at a starting point of polygon 3. Therefore, an X-terminal point address of polygon 3 is read and value "1" is added to this point address. An added value is compared with an X-terminal point address of polygon 3. Since the X-terminal point address of polygon 3 is greater than the added value, it proceeds to X-address 6. At X-address 6, the mask bit is equal to value "0" so that this mask bit set to value "1". The hidden face processing section 201 transfers difference "3" between the present processing point and the X-starting point to the outline processing section 250. The outline processing section 250 multiplies this difference "3" by DDMX-value "10" value "30" is added to MX-value "10" value "40" is provided as lower 8 bits of mapping memory address. Further, difference "3" between the present processing point and the X-starting point is multiplied by DDMY-value "10" and multiplied value "30" is added to MY-value "150". Thus, added value "180" is upper 8 bits of the mapping memory address. Then, the mask memory 350 is accessed and an accessed value thereof is written to the line buffer memory 351. Further, the X-terminal point address is written to the mask memory 350. Similar processings are executed with respect to X-addresses 7 and 8.

FIG. 54 shows processed results of polygon 4. The mask bit is equal to value "0" at X-starting point address 1 of polygon 4 so that this mask bit is set to value "1". An X-terminal point address and RGB (red, green and blue) values obtained by the outline processing are written to the line buffer memory 351. Then, it proceeds to the next X-address 2. Since the mask bit at this X-address 2 is equal to value "1", an X-terminal point address is read out of the mask memory and it then proceeds to X-address 6 provided by adding value "1" to this X-terminal point address. The mask bit at X-address 6 is also equal to value "1". Accordingly, an X-terminal point address is read out of the mask memory and it then proceeds to X-address 9 provided by adding value "1" to this point address. The mask bit at X-address 9 is equal to value "0" so that this mask bit is set to value "1". Then, the X-terminal point address and the RGB values provided by the outline processing are written to the line buffer memory. The next X-address is greater than the X-terminal point address of polygon 4 so that the outline processing is completed.

In the general processing system the number of outline processings is equal to 23. In contrast to this, in the present processing system, the number of outline processings is equal to 10. Accordingly, in accordance with the present processing system, it is possible to greatly reduce the number of outline processings so that the outline processing can be performed at a high speed.

Figure 56:
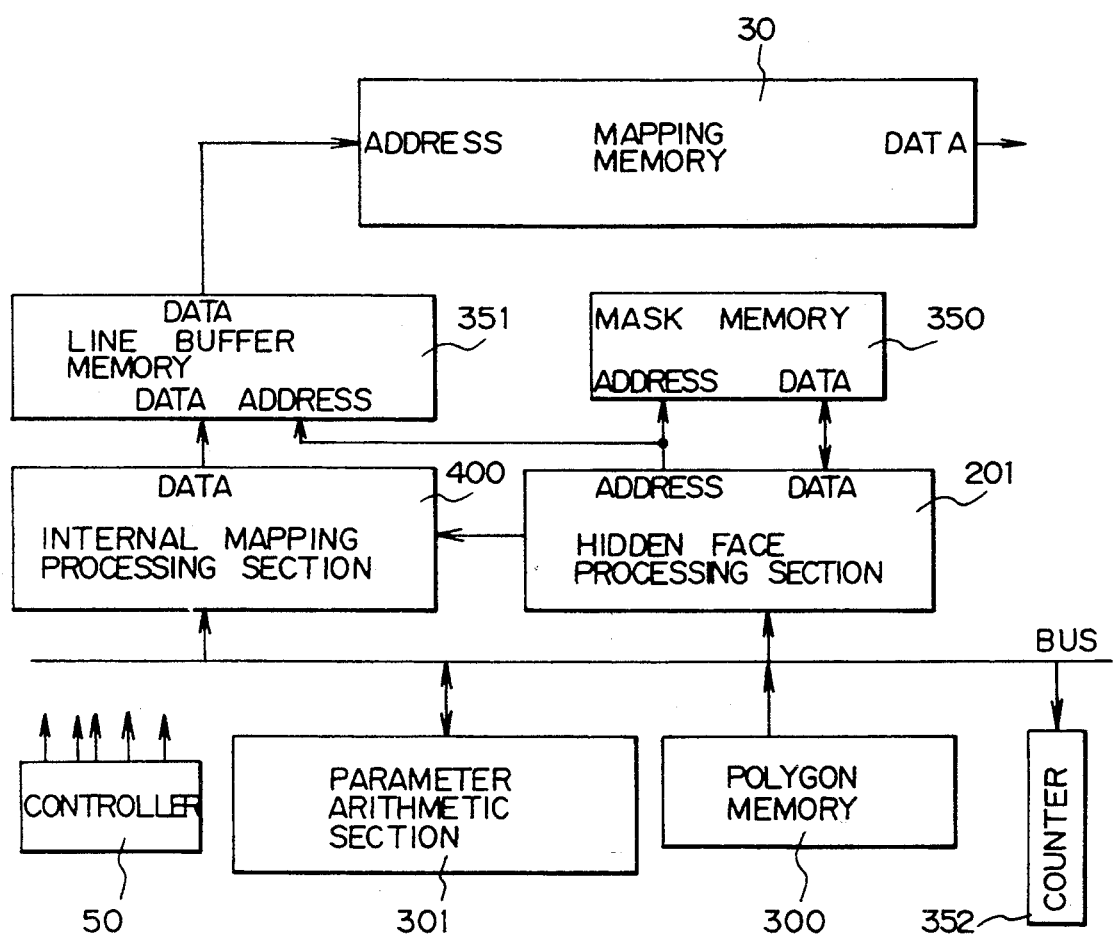
FIG. 56 is a block diagram showing another example of the internal drawing circuit in the present invention.

Similar effects can be obtained in a processing system shown in FIG. 56. In this processing system, a line buffer memory 351 has no color information. Addresses of X and Y are stored to the line buffer memory 351 from the outline processing section 250. At a data-reading time, a mapping memory 30 is accessed as a lookup table and an output of this mapping memory 30 is transferred to a CRT.

In accordance with the present invention, it is not necessary to perform the outline processing in accordance with an area for all polygons. Accordingly, it is possible to perform the outline processing in accordance with an area very close to an area for a visual polygon so that the outline processing can be performed at a high speed.

In the circuit structure shown in FIG. 41, glow shading can be performed by disposing a lookup table for storing a density pattern for shading in the mapping memory 30. This glow shading will next be described briefly.

For example, R (red), G (green), B (blue), 0, 0, and 0 are stored at address I=0 in the lookup table. Further, addresses in the lookup table are changed and allocated until R, G, B, 255, 0, and 0 are stored at address I=255. Further, I-addresses in the lookup table are allocated to addresses of the mapping memory, MXS and MXE. Thus, one kind of brightness is provided at each of end points. Accordingly, when a color block value is provided at an MY-address, addresses of the mapping memory in FIG. 37 are complemented and allocated by the digital differential analysis in synchronization with a horizontal scanning operation. Thus, it is possible to easy perform shading processing using light and darkness and colors.

A third example of the internal drawing processing circuit 200 used in the present invention will next be described with reference to FIG. 57, etc.

This internal drawing processing circuit 200 has a finer shading function.

This internal drawing processing circuit 200 has a mask memory 350 having a memory region for an X-terminal point address. Shading processing is performed from a smaller X-address to a larger X-address with respect to all polygons. At this time, the internal drawing processing circuit 200 calculates respective differences (DDR, DDG, DDB) between starting point values of R, G, B and terminal point values of R, G, B with respect to a difference between X-starting and X-terminal points. Next, a mask bit is read out of the mask memory 350. Thereafter, if the mask bit is off, no previously processed polygon exists at a point shown by this mask bit. Therefore, the mask bit is turned on and DDR x (present processing point — X-starting point) is added to an R-starting point in the shading processing. Namely, internal data are calculated by the digital differential analysis from the outline information of a polygon calculated by the mapping outline processing circuit 100. Then, an address at an R-value is calculated at the above point and addresses at a G-value and a B-value are similarly calculated. These calculated addresses are written to the line buffer memory. Further, the mask bit and the X-terminal point value are written to the mask memory 350.

If the mask bit is on, the previously processed polygon exists at the above point. In this case, the x-terminal point value is read out of the mask memory 350 and is set at the present address of the mask memory 350. Thus, the present processing point is updated and the above processing is repeatedly performed until the present processing point exceeds the X-terminal point. Thus, an image can be processed at a high speed without avoiding useless shading processing in the internal drawing processing.

Figure 57:
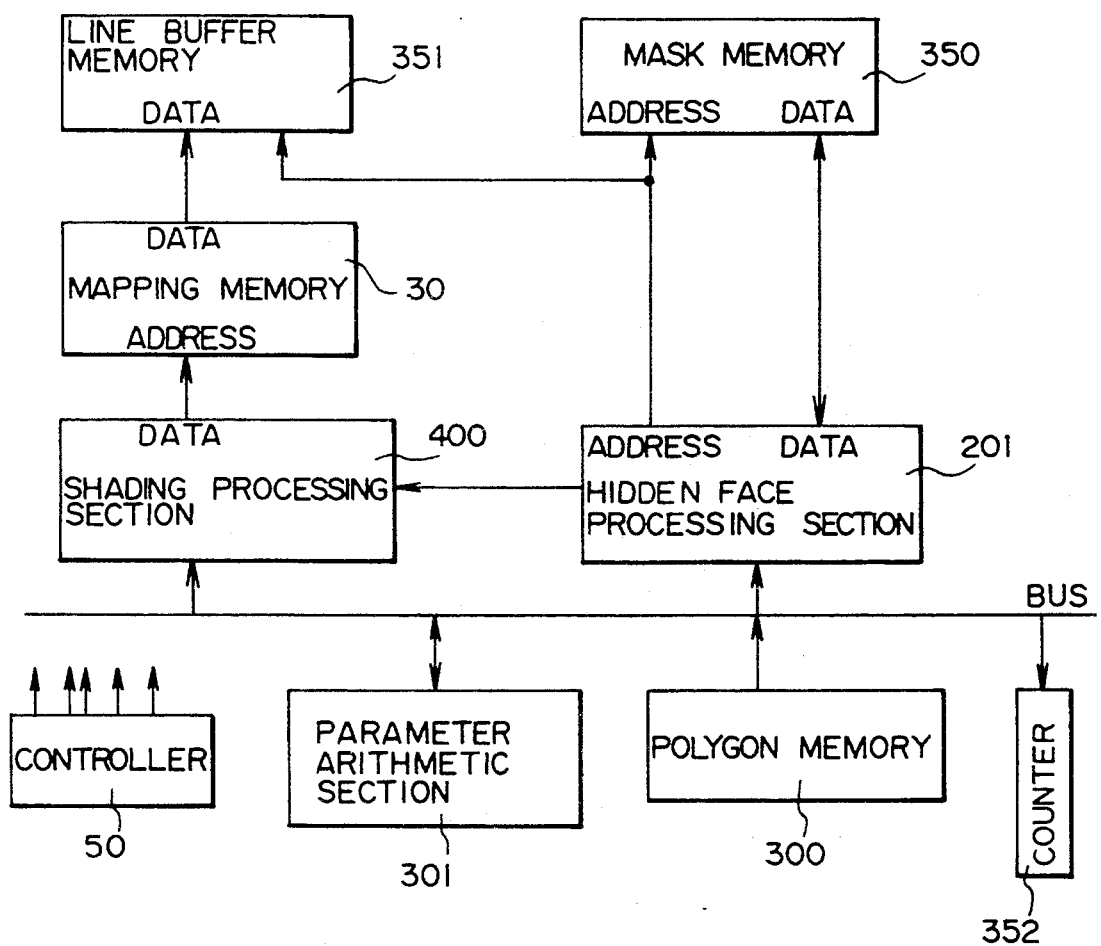
FIG. 57 is a block diagram showing the entire construction of an internal drawing circuit as a third example in the present invention.

FIG. 57 is a block diagram showing the entire construction of a shading processor disposed in the internal drawing processor in the present invention.

This shading processor will next be described with reference to FIG. 57.

In FIG. 57, a hidden face processing section 201 outputs only an address for writing color information to a line buffer memory 351 from an X-starting point to an X-terminal point using a mask memory 350. The hidden face processing section 201 outputs this address by address values at the X-starting point and the X-terminal point set by a parameter arithmetic section 301. The hidden face processing section 201 transmits only a difference between this address and the X-starting point to a shading processing circuit 400 for drawing the interior of a polygon while shading processing is performed.

The mask memory 350 has data as shown by reference numeral a in FIG. 55 at the same address as the line buffer memory 351. A mask bit shows whether or not there is color information at this address. The mask bit is on when there is color information at this address. The mask bit is off when there is no color information at this address. An X-terminal point address of the polygon having the written color information is written to an X-terminal point address of the mask memory 350.

A counter 352 controls an operation of the frame memory 20 at an address thereof.

The frame memory 20 stores an X-starting point address of a polygon calculated by the mapping outline processing circuit 100, an X-starting point address of the mapping memory 30, and a Y-starting point address of the mapping memory 30. The frame memory 20 also stores an X-terminal point address of the polygon, an X-terminal point address of the mapping memory 30, and a Y-terminal point address of the mapping memory 30. The frame memory 20 further stores an R-starting point value, a G-starting point value, a B-starting point value, an R-terminal point value, a G-terminal point value, and a B-terminal point value.

A parameter arithmetic section 301 reads the X-starting point address and the X-terminal point address out of the frame memory 20. The parameter arithmetic section 301 also reads the X-starting point address and the X-terminal point address of the mapping memory 30. The parameter arithmetic section 301 also reads the Y-starting point address and the Y-terminal point address of the mapping memory 30. The parameter arithmetic section 301 also reads the R-starting point value, the G-starting point value, the B-starting point value, the R-terminal point value, the G-terminal point value, and the B-terminal point value of the mapping memory 30. The parameter arithmetic section 301 calculates and transfers required parameters to the shading processing section 400 and the hidden face processing section 201.

The shading processing section 400 receives a parameter calculated by the parameter arithmetic section 301 and also receives a difference between the present processing point and the X-starting point from the hidden face processing section 201. Thus, the shading processing section 400 calculates and transfers R, G and B values at the present processing point to the line buffer memory 351.

The line buffer memory 351 has a data format as shown by reference numeral b in FIG. 55.

A controller 50 controls an entire operation of the above processing system.

The shading processor used in this embodiment will next be described in detail with reference to FIG. 58.

Figure 58:
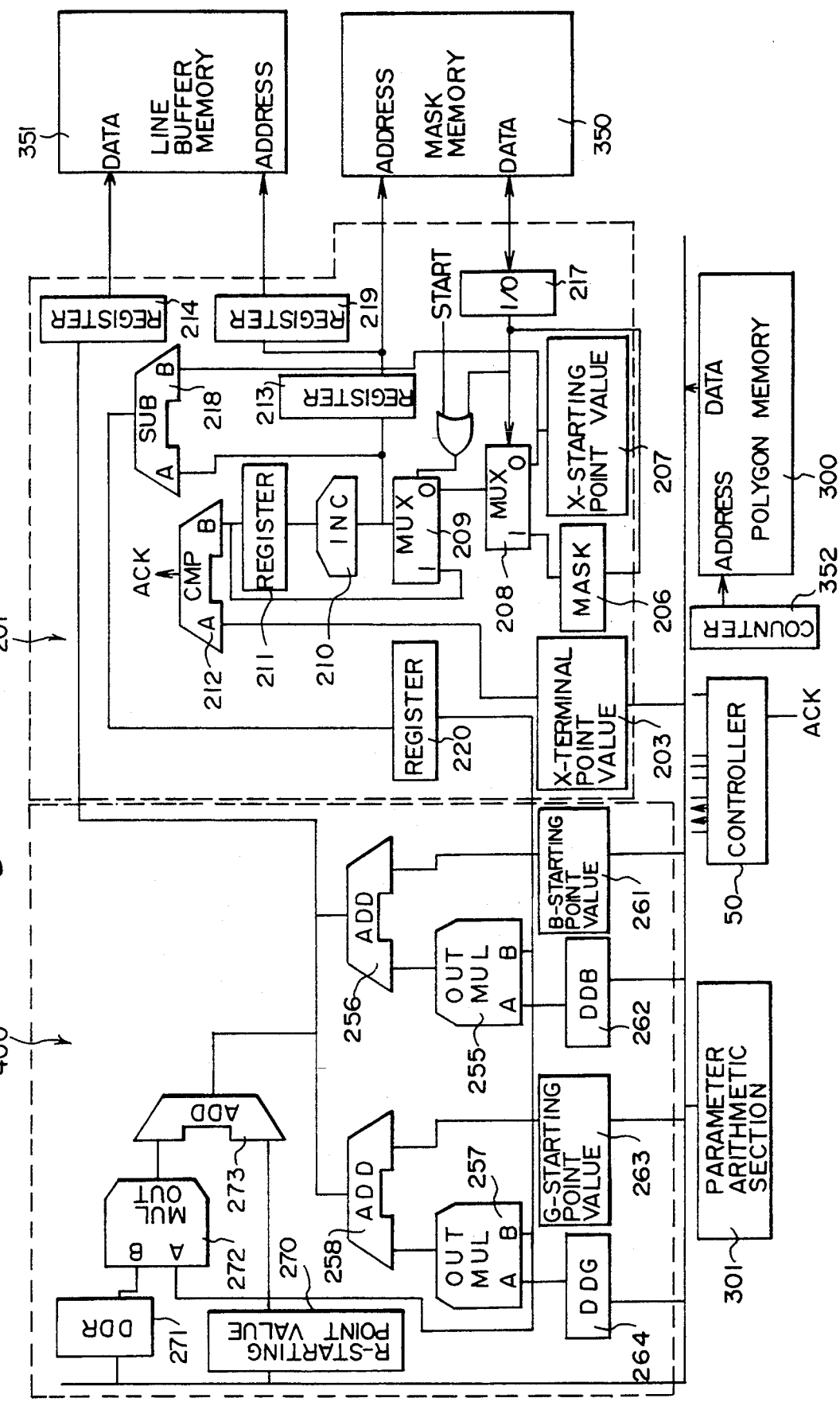
FIG. 58 is a circuit diagram showing a concrete construction of the internal drawing circuit in the third example.

FIG. 58 shows a concrete circuit of the shading processor used in this embodiment.

Figure 59:
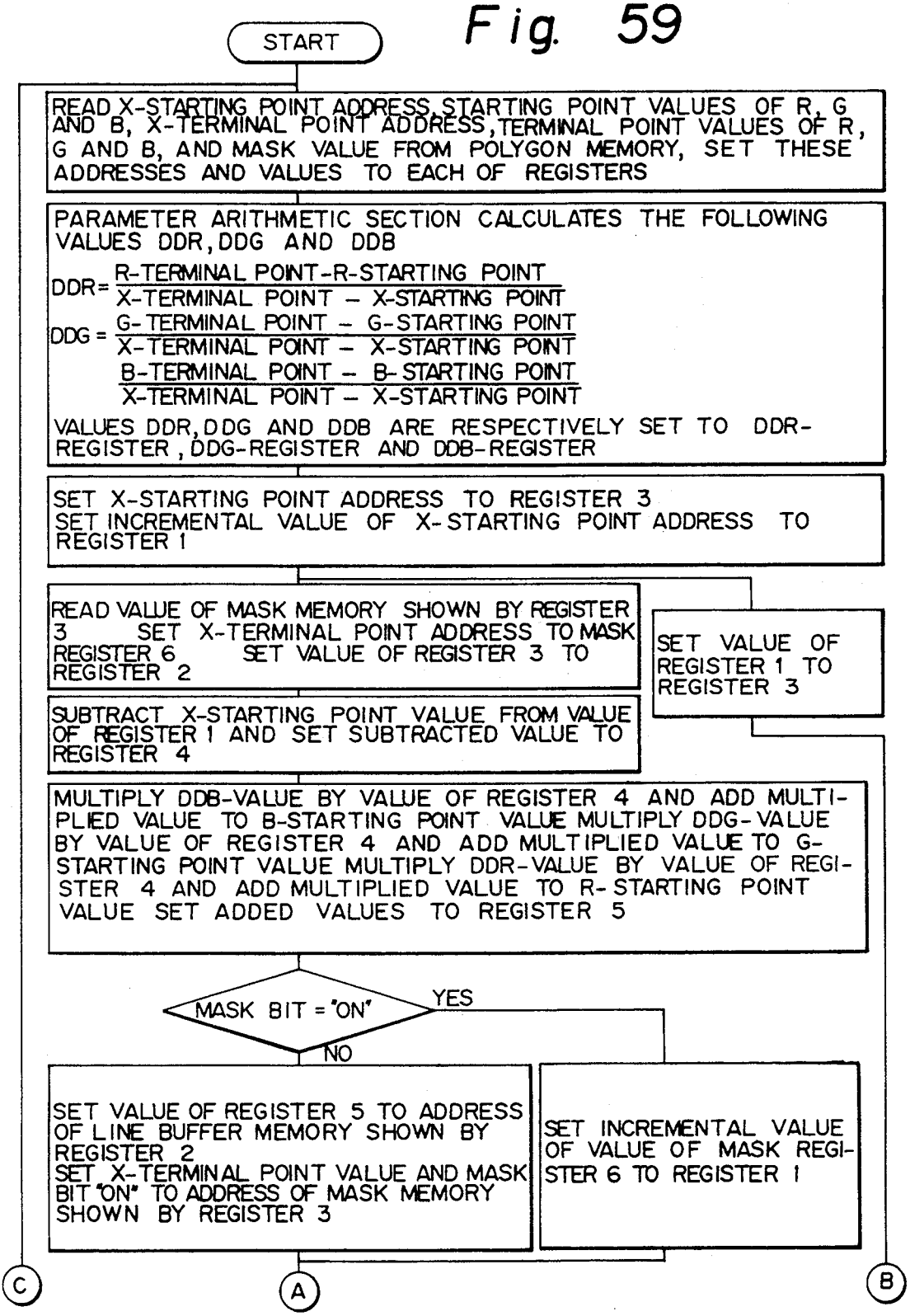
FIG. 59 is a flow chart showing an operation of the internal drawing circuit in the third example.
Figures 60, 61:
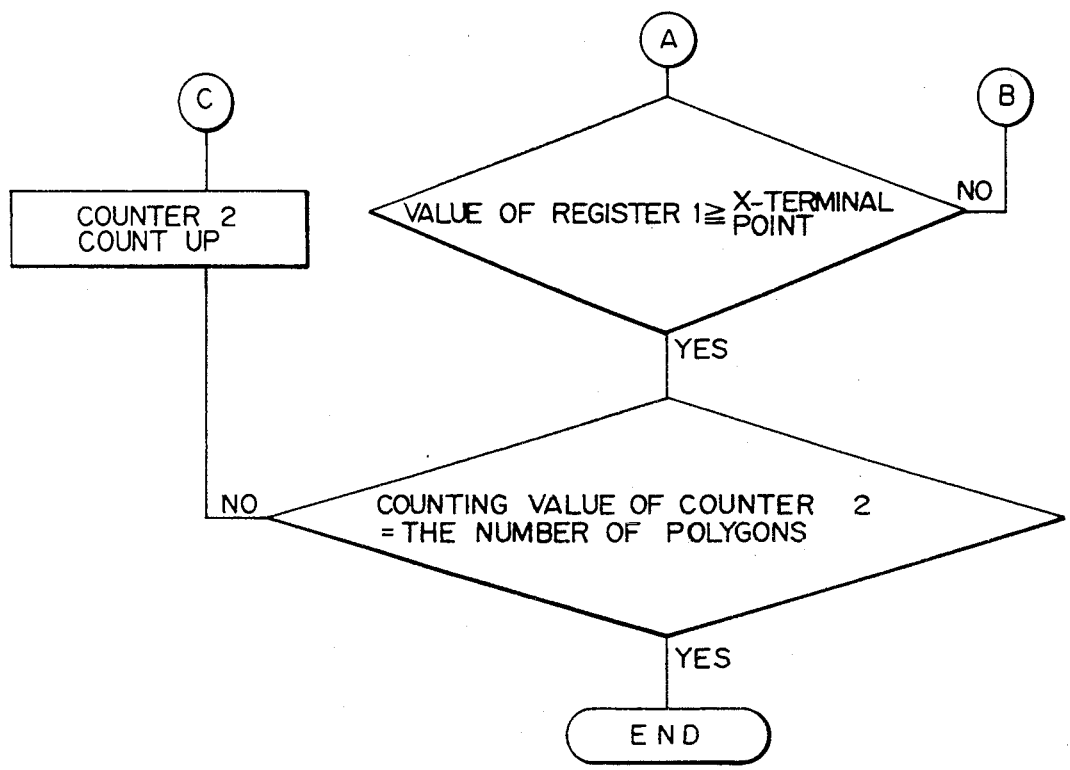
FIG. 60 is a flow chart showing an operation of the internal drawing circuit in the third example.
FIG. 61 is a table showing contents of a polygon memory used in the third example.

In FIG. 58, a controller 50 controls an entire operation of the shading processor in accordance with operating flows of flow charts shown in FIGS. 59 and 60.

Reference numerals 352 and 20 respectively designate a counter and a frame memory.

A register 220 stores a difference between the present processing point and an X-starting point transferred from a hidden face processing section 201 to a shading processing section 400.

A register 203 stores an X-terminal point address.

A register 206 stored a mask value.

A register 207 stores an X-starting point address.

A multiplexer 208 selects any one of the registers 206 and 207 by a mask bit.

Reference numeral 217 designates an I/O buffer.

A register 219 stores an address of a line buffer memory 351. A register 213 stored an address of a mask memory 350 and this address value is set as the present processing point.

A multiplexer 209 selects an output of any one of a register 211 and the multiplexer 208 by a mask bit or a starting signal.

An increment (incremental computer) 210 increments and outputs an output of the multiplexer 209 to the register 211. This register 211 stores an address value at the next processing point.

A comparator 212 compares an X-terminal point value with the next processing point and transfers compared results to the controller 50.

A subtracter 218 subtracts an X-starting point from the present processing point and outputs subtracted results to a register 220.

A register 261 stores a B-starting point value.

A register 262 stores a DDB-value calculated a the parameter arithmetic section 301.

A register 263 stores a G-starting point value.

A register 264 stores a DDG-value calculated by the parameter arithmetic section 301.

A register 270 stores an R-starting point value.

A register 271 stores a DDR-value calculated by the parameter arithmetic section 301.

A multiplier 255 multiplies the DDB-value by an output value of the register 220 and transfers multiplied results to an adder 256.

A multiplier 257 multiplies the DDG-value by the output value of the register 220 and transfers multiplied results to an adder 258.

A multiplier 273 multiplies the DDR-value by the output value of the register 220 and transfers multiplied results to an adder 273.

The adder 256 adds the B-starting point value to an output of the multiplier 255 and transfers added results to a register 214.

The adder 258 adds the G-starting point value to an output of the multiplier 257 and transfers added results to the register 214.

The adder 273 adds the R-starting point value to an output of the multiplier 272 and transfers added results to the register 214.

The register 214 stores data of the line buffer memory 351.

Similar to the above embodiment, the shading processing of four polygons as shown in FIG. 33 will next be described.

FIG. 61 shows contents of the frame memory 20 made by the mapping outline processing circuit 100 from the example shown in FIG. 33. Each of the polygons is processed as shown in FIGS. 62 to 65. FIGS. 62 to 65 respectively show results of the mask memory processed with respect to polygons 1 to 4.

FIG. 66 shows contents of the mask memory 350 and the line buffer memory 351 processed from the frame memory 20 in FIG. 62. A mask bit and an X-terminal point address constitute the contents of the mask memory 350. RGB values constitute the contents of the line buffer memory 351.

FIG. 66 shows initial states of the mask memory and the line buffer memory.

FIG/ 67 shows processed results of polygon 1. In this case, since all mask bits are equal to value "0", all the mask bits in a region of polygon 1 are set to value "1" and an X-terminal point address is set to value "5". With respect to RGB values, the shading processing is performed from RGB-starting point values 5, 0, 1 to RGB-terminal point values 1, 0, 5 and the RGB values are written to respective addresses from an X-starting point to an X-terminal point.

FIG. 68 shows processed results of polygon 2. A mask bit is already set to value "1" at X-address 2 at a starting point of polygon 2. Therefore, an X-terminal point address of polygon 2 is read and value "1" is added to this X-terminal point address. An added value is compared with an X-terminal point address of polygon 2. Since the X-terminal point address of polygon 2 is smaller than the added value, the processing of polygon 2 is completed and no shading processing is executed.

FIG. 69 shows processed results of polygon 3. The mask bit is already set to value "1" at X-address 3 at a starting point of polygon 3. Therefore, an X-terminal point address of polygon 3 is read and value "1" is added to this X-terminal point address. An added value is compared with an X-terminal point address of polygon 3. Since the X-terminal point address of polygon 3 is greater than the added value, it proceeds to X-address 6. The mask bit at X-address 6 is equal to value "0" so that this mask bit is set to value "1". The hidden face processing section 201 transfers difference "3" between the present processing point and the X-starting point to the shading processing section 400. The shading processing section 400 multiplies this difference "3" by DDG-value "1" and multiplied value "3" is added to G-starting point value "1". Thus, added G-value "4", R-value "0" and B-value "0" are written to the line buffer memory. Further, the X-terminal point address is written to the mask memory 350. Similar processings are executed with respect to addresses 7 and 8.

FIG. 70 shows processed results of polygon 4. The mask bit is equal to value "0" at X-starting point address 1 of polygon 4 so that this mask bit is set to value "1". An X-terminal point address and RGB (red, green and blue) values obtained by the shading processing are written to the mask memory and the line buffer memory. Then, it proceeds to the next X-address 2. Since the mask bit at this X-address 2 is equal to value "1", the X-terminal point address is read out of the mask memory and it then proceeds to X-address 6 provided by adding value "1" to this X-terminal point address. The mask bit at X-address 6 is also equal to value "1". Accordingly, an X-terminal point address is read out of the mask memory and it then proceeds to X-address 9 provided by adding value "1" to this X-terminal point address. The mask bit at X-address 9 is equal to value "0" so that this mask bit is set to value "1". Then, the X-terminal point address and the RGB values provided in the shading processing are written to the mask memory and the line buffer memory. The next X-address is greater than the X-terminal point address of polygon 4 so that the shading processing is completed.

In the general shading processing system, the number of shading processings is equal to 23. In contrast to this, in the present shading processing system, the number of shading processings is equal to 10. Accordingly, in accordance with the present processing system, it is possible to greatly reduce the number of shading processings so that a hidden face can be erased at a high speed.

In accordance with the present invention, it is not necessary to perform the shading processing in accordance with an area for all polygons. Accordingly, it is possible to perform the shading processing in accordance with an area very close to an area for a visual polygon so that the hidden face erasing processing can be performed at a high speed.

As mentioned above, in the image processor, a plurality of polygons are simultaneously displayed in many cases. In particular, when the plurality of polygons are overlapped and displayed, it is important how an overlapping region of the polygons is filled with a color. Therefore, for example, hidden face erasing processing of the polygons is performed by the hidden face erasing processing circuit as shown in FIG. 31.

However, in this hidden face erasing processing circuit, an upper limit of the number of polygons for the hidden face erasing processing is determined in advance. The hidden face erasing processing is performed by the upper limit of the number of polygons by transmitting data from the frame memory 20 to the hidden face erasing processing circuit. Therefore, for example, when the number of processing units is limited to 128, undisplayed polygons are really processed as shown in FIG. 1 so that it is impossible to display polygons 129 and 130 to be displayed later.

In the image processor in this embodiment, a polygon to be displayed or undisplayed is judged on the basis of outline data of each of polygons stored to the frame memory 20. With respect to only the displayed polygon, data are stored to a unit section for performing the hidden face processing so that there is no limit of the number of polygons caused by undisplayed polygons.

The image processor in this embodiment will next be described with reference to FIG. 71, etc.

Figure 71:
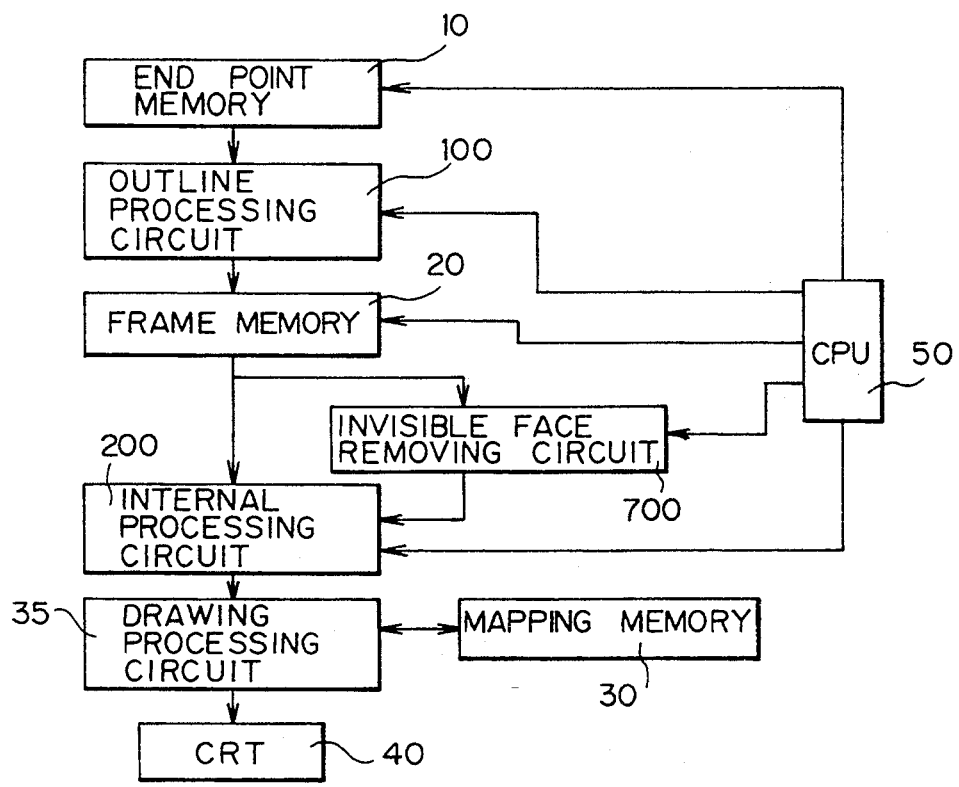
FIG. 71 is a block diagram showing the entire construction of an image processor provided with an invisible face removing circuit in the present invention.

FIG. 71 is a block diagram showing an entire construction of the image processor in this embodiment.

Similar to the above case, an end point memory 10 stores a polygonal shape, a polygonal position, the priority of a polygon, end point information indicative of a mapping pattern region of a selected basic pattern, etc. The end point memory 10 outputs end point (X, Y) constituting each of polygons, end point (MX, MY) of the basic pattern, a Z-value indicative of the polygonal priority, etc. to an outline processing circuit 100.

Similar to the above case, the outline processing circuit 100 calculates X-addresses (XS, XE) on the left-hand and right-hand sides of a polygonal outline every Y-address by the digital differential analysis (DDA) based on the end point (X, Y) read out of the end point memory 10. These calculated X-addresses are written to the frame memory 20.

Outline data corresponding to the polygonal outline are also calculated by the digital differential analysis based on the end point addresses (MX, MY) of the basic pattern. The outline data are written to the frame memory 20.

Similar to the above case, the frame memory 20 has formats as shown in FIGS. 23 and 24. Thus, the frame memory 20 stores X-coordinates of a polygonal figure on the left-hand and right-hand sides thereof in the order of a smaller Z-value of the polygon every horizontal scanning line of a CRT 40. The frame memory 20 also stores X and Y coordinates of a mapping memory 30 on the left-hand and right-hand sides thereof corresponding to the polygonal figure.

The outline data of each of polygons, the Z-value and a mapping address of the basic pattern written to the frame memory 20 are transmitted to an internal processing circuit 200. Internal processing of each of the polygons is performed on the basis of these data. In this embodiment, an invisible face removing circuit 700 judges whether or not a polygon is displayed on the basis of outline data (XS, XE) of each of the polygons. An operation of the invisible face removing circuit 700 is controlled such that only the displayed polygon is processed by the internal processing circuit 200.

The outline data (XS, XE) of the polygonal figure are inputted from the frame memory 20 to the invisible face removing circuit 700 in the order of a smaller Z-value. The outline data (XS, XE) of a polygon having a smallest Z-value are first read out of the frame memory 20 and are set into an internal register disposed in the invisible face removing circuit 700. The invisible face removing circuit 700 gives commands to the internal processing circuit 200 such that this polygon is processed by the internal processing circuit 200. Internal processing of the polygon is performed by the internal processing circuit 200 in accordance with these commands. Thus, the number of units for processing polygons is counted up by one.

Subsequently, outline data (XS, XE) of a polygon having the next smaller Z-value are read out of the frame memory 20. These data (XS, XE) are compared with data (XS, XE) set in the invisible face removing circuit 700 to judge whether this polygon is a polygon to be displayed or undisplayed. Namely, it is judged whether or not the address XS of the inputted polygon is smaller than the set address XS. When the address XS of the inputted polygon is smaller than the set address XS, this polygon is a polygon to be displayed so that the address XS of this polygon is set in the internal register. In contrast to this, when the address XS of the inputted polygon is greater than the set address XS, this address XS of the inputted polygon is located inside the previous polygonal address XS and is already set in the internal register. Accordingly, the set address XS is maintained as it is.

Further, it is judged whether or not the address XE of the inputted polygon is greater than the set address XE. When the address XE of the inputted polygon is greater than the set address XE, this address XE of the inputted polygon is set at an address XE of the internal register. In contrast to this, when the address XE of the inputted polygon is smaller than the set address XE, the address XE of the inputted polygon is located inside an address XE of the previous polygon so that the set address XE is maintained as it is.

When the addresses XS and XE of the inputted polygon are located within ranges of the addresses XS and XE of the previous polygon, the address XS of the inputted polygon is greater than the set address XS and the address XE of the inputted polygon is smaller than the set address XE. In this case, no inputted polygon is displayed and the internal processing circuit 200 indicates that no internal processing of this polygon is performed. In a case except for this conditional case, the inputted polygon is a polygon to be displayed so that the number of processing units is counted up by one. Thus, similar processings are performed with respect to all polygons written to the frame memory 20 and the internal processing of only a displayed polygon is performed by the internal processing circuit 200.

Similar to the above case, the internal processing circuit 200 calculates an X-address every Y-address of each of only polygons selected and displayed by the invisible face removing circuit 700, and calculates mapping addresses (MX, MY) of the basic pattern by the digital differential analysis (DDA). A drawing processing circuit 35 displays each of the polygons by the CRT 40 in a hidden face processing state based on the calculated addresses (MX, MY) using the mapping memory 30 as a lookup table.

Figure 72:
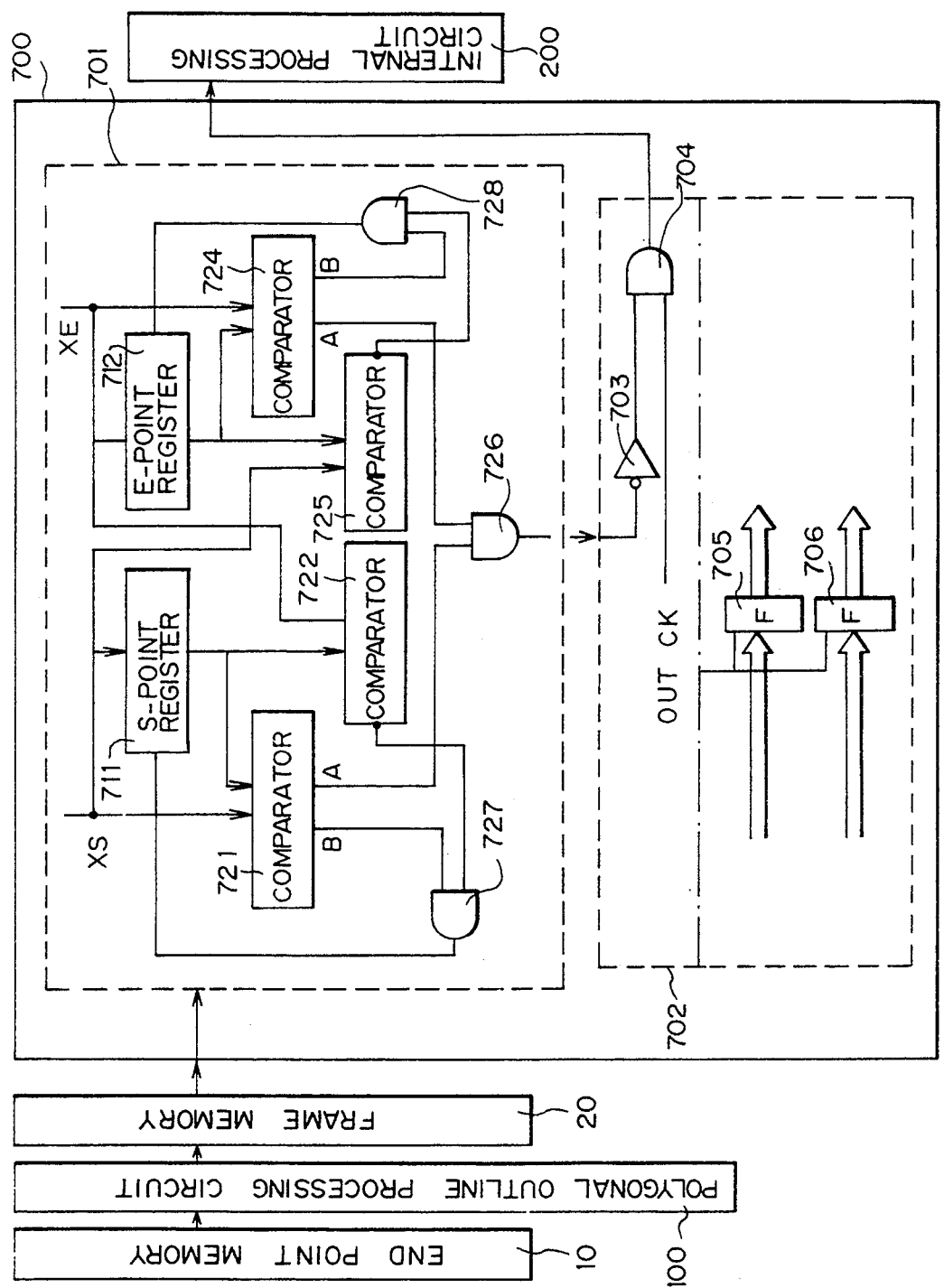
FIG. 72 is a block diagram showing one example of the invisible face removing circuit.

An example of the invisible face removing circuit 700 will next be described with reference to FIG. 72. In this example, the invisible face removing circuit 700 is constructed by an invisible face judging section 701 and an invisible face removing section 702.

An address XS of a polygon having a smallest Z-value read out of a frame memory 20 is set in an S-point register 711 for indicating a starting (S) point.

An address XE of the polygon having the smallest Z-value is then set in an E-point register 712 for indicating an end (E) point.

The address XS is compared by a comparator 721 with an address value set in the S-point register 711. When the address XS is greater than the set address value, output A of the comparator 721 shows value "1" and this output value "1" is transmitted to an AND circuit 726. In contrast to this, when the address XS is smaller than the set address value, output B of the comparator 721 shows value "1" and this output value "1" is transmitted to an AND circuit 727. An output of a comparator 722 is also transmitted to the AND circuit 727. The comparator 722 compares an address XE with an address value set in the S-point register 711. When the address XE is greater than the set address value, the comparator 722 outputs value "1".

The address XE is also compared by a comparator 724 with an address value set in the E-point register 712. When the address XE is smaller than the set address value, output A of the comparator 724 shows value "1" and this output value "1" is transmitted to the AND circuit 726. In contrast to this, when the address XE is greater than the set address value, output B of the comparator 724 shows value "1" and this output value "1" is transmitted to an AND circuit 728. An output of a comparator 725 is also transmitted to the AND circuit 728. The comparator 725 compares the address XS with an address value set in the E-point register 712. When the address XS is smaller than the set address value, the comparator 725 outputs value "1".

Figure 73:
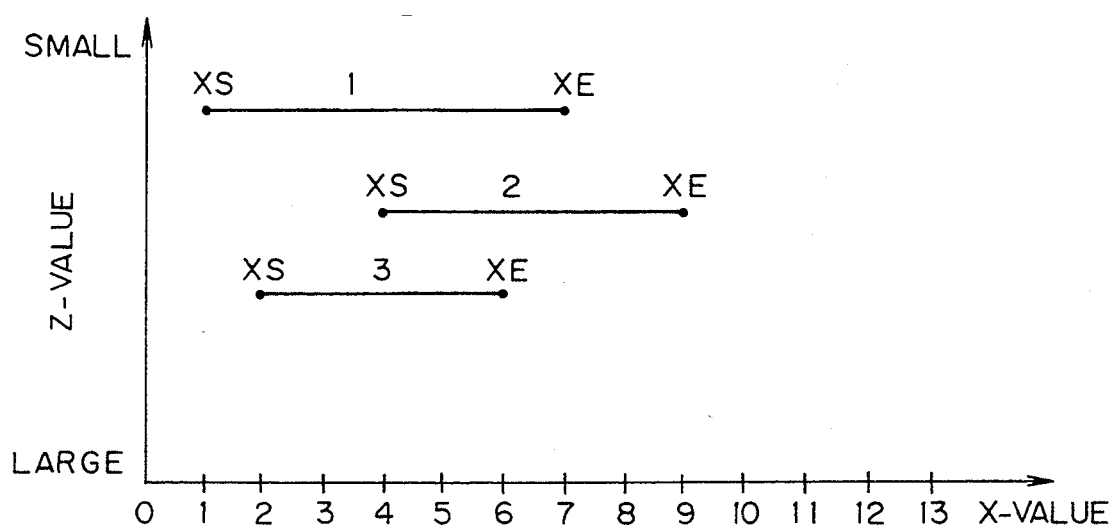
FIG. 73 is a view for explaining the removal of an invisible face and showing the relation between respective polygons in a Z-direction.

Three polygons as shown in FIG. 73 are processed as follows.

An address XS(1) of a polygon having a smallest Z-value is set in the S-point register 711. An address XE(7) of this polygon is set in the E-point register 712. Since the polygon 1 has the smallest Z-value, value "0" is set in the S-point register 711 and the E-point register 712. Accordingly, the AND circuit 726 outputs value "0" as a polygon to be displayed. This value "0" is inverted to value "1" by an inverter 703. An AND circuit 704 transmits this value "1" as a displayed polygon to an internal processing circuit 200.

Addresses XS(4) and XE(9) of polygon 2 having the next smallest Z-value are read out of the frame memory 20. The comparator 721 compares this address XS(4) with value "1" set in the S-point register 711. Since the address XS(4) is greater than the set value, output A of the comparator 721 shows value "1" and this output value is transmitted to the AND circuit 726.

The comparator 722 compares address XE(9) with value "1" set in the S-point register 711. Since the address XE(9) is greater than the set value, the comparator 722 outputs value "1" to the AND circuit 727.

Another input of the AND circuit 727 is constructed by output B of the comparator 721 and shows value "0". Accordingly, an output of the AND circuit 727 shows value "0". Therefore, the value "1" of the S-point register 711 is not rewritten, but is maintained as it is.

The comparator 724 compares address XE(9) of polygon 2 with value "7" set in the E-point register 712. Since the address XE(9) of polygon 2 is greater than the set value "7", output B of the comparator 724 shows value "1" and output A of the comparator 724 shows value "0".

Accordingly, values "1" and "0" are inputted to the AND circuit 726 so that value "0" is outputted from this AND circuit 726. Thus, polygon 2 is set to a polygon to be displayed by the invisible face removing section 702. Therefore, data about polygon 2 are transmitted from the invisible face removing circuit 702 to the internal processing circuit 200 without removing polygon 2.

The comparator 725 compares address XS(4) of polygon 2 with an address value set in the E-point register 712. In this case, since the set value of the E-point register 712 is greater than the address value XS(4), the comparator 725 transmits output value "1" to the AND circuit 728. Value "1" is transmitted from each of the comparators 724 and 725 to the AND circuit 728. Accordingly, the AND circuit 728 outputs value "1" to the E-point register 712. Thus, the set value of the E-point register 712 is rewritten to address XE(9) of polygon 2, i.e., value "9".

Subsequently, addresses XS(2) and XE(6) of polygon 3 having a smallest Z-value are read out of the frame memory 20. The comparator 721 compares this address XS(2) with value "1" set in the S-point register 711. Since the address XS(2) is greater than the set value "1", output A of the comparator 721 shows value "1" and this output value "1" is transmitted to the AND circuit 726.

The comparator 722 compares address XE(6) with value "1" set in the S-point register 711. Since the address XE(6) is greater than the set value "1", the comparator 722 outputs value "1" to the AND circuit 727.

Another input of the AND circuit 727 is constructed by output B of the comparator 721 and shows value "0". Accordingly, an output of the AND circuit 727 shows value "0". Therefore, the value "1" of the S-point register 711 is not rewritten, but is maintained as it is.

The comparator 724 compares address XE(6) of polygon 3 with value "9" set in the E-point register 712. Since the set value of the E-point register 712 is greater than the address XE(6) of polygon 3, output B of the comparator 724 shows value "0" and output A of the comparator 724 shows value "1".

Accordingly, values "1" and "1" are inputted to the AND circuit 726 so that value "1" is outputted from this AND circuit 726. Thus, polygon 3 is set to a polygon to be undisplayed by the invisible face removing section 702. Therefore, processing of polygon 3 using the internal processing circuit 200 is inhibited. Further, a flag indicative of an invisible face is set in flip-flop circuits 705 and 706.

The comparator 725 compares address XS(2) of polygon 3 with an address value set in the E-point register 712. In this case, since the set value of the E-point register 712 is greater than the address XS(2), the comparator 725 transmits output value "1" to the AND circuit 728. Values "0" and "1" are respectively transmitted from the comparators 724 and 725 to the AND circuit 728. Accordingly, the AND circuit 728 outputs value "0" to the E-point register 712. Therefore, no set value of the E-point register 712 is rewritten.

Thus, the invisible face removing circuit 700 judges whether a polygon is displayed or undisplayed. Data processing of the polygonal interior is performed by the internal processing circuit 200 with respect to only the displayed polygon.

Figure 74:
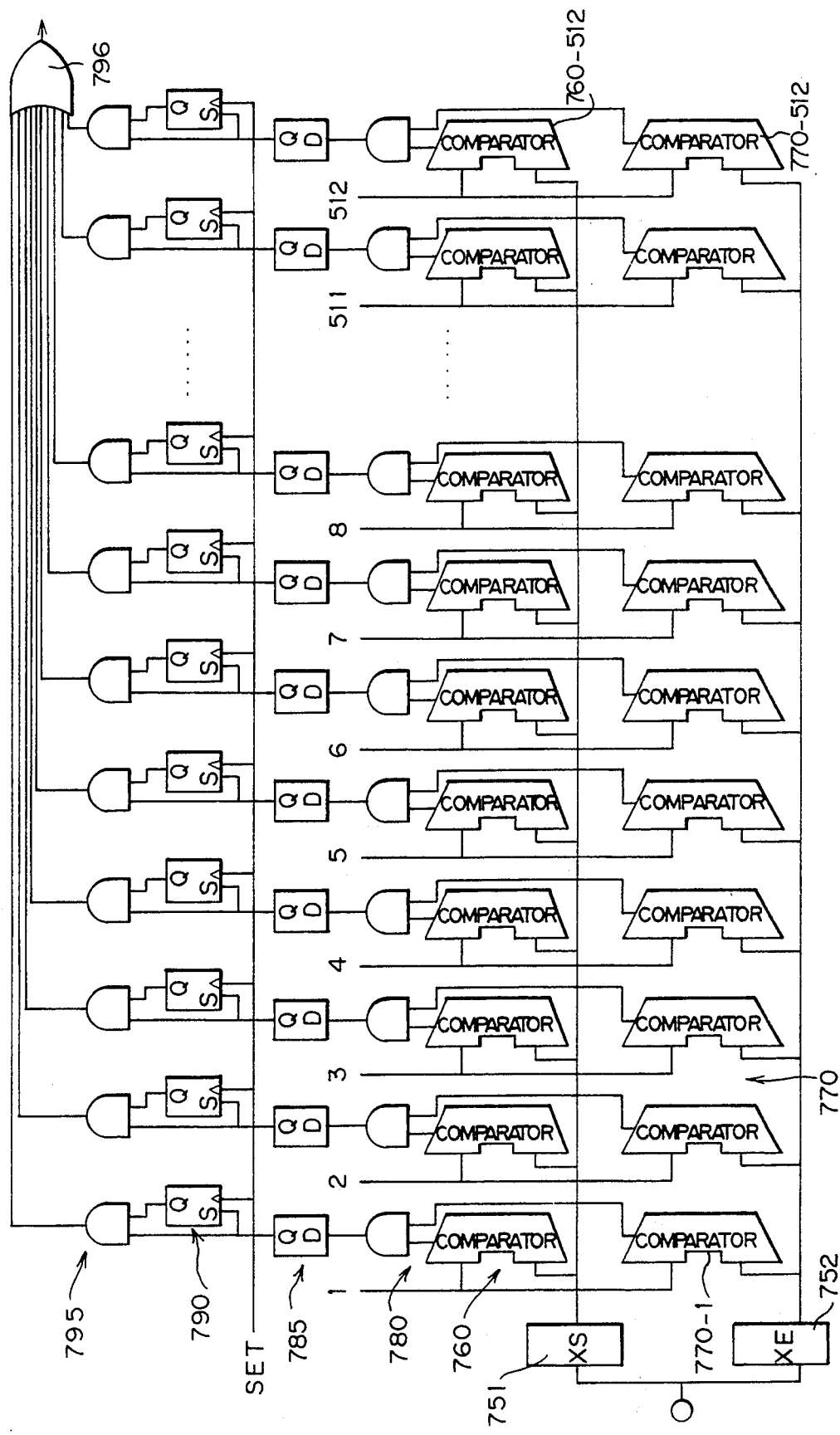
FIG. 74 is a block diagram showing another example of the invisible face removing circuit.

Another example of this invisible face removing circuit 700 will next be described with reference to FIG. 74.

In this example, the invisible face removing circuit 700 has a group of comparators 760 and 770 according to the number of drawing picture elements such as 512 picture elements. The comparators 760-1 to 760-512 compare address XS with each of address values on the X-axis. The comparators 770-1 to 770-512 compare address XE with each of address values on the X-axis. The comparators 760-1 to 760-512 and the comparators 770-1 to 770-512 respectively constitute comparator pairs so that 512 comparator pairs are formed. The comparator group 760 compares the address XS inputted to a register 751 with an address value on the X-axis. When the address XS is smaller than the address value on the X-axis, the comparator group 760 outputs value "1" to an AND circuit 780. The comparator group 770 compares the address XE inputted to a register 752 with an address value on the X-axis. When the address XE is greater than the address value on the X-axis, the comparator group 770 outputs value "1" to the AND circuit 780. An output of the AND circuit 780 is inputted to a flip-flop circuit 785. A Q-output of this flip-flip circuit 785 is inputted to an AND circuit 795. A flip-flop circuit 780 is triggered in the case of a displayed polygon and outputs a Q-output to the AND circuit 795 as another input. The Q-output of the flip-flop circuit 785 is inputted to an S-terminal of the flip-flop circuit 790.

An output of this AND circuit 795 is inputted to an OR circuit 796. This OR circuit 796 outputs value "1" in the case of a displayed polygon and outputs value "0" in the case of an undisplayed polygon. Namely, with respect to polygons written to the frame memory 20, addresses (XS, XE) of a polygon having a small Z-value are sequentially inputted to the OR circuit 796. The flip-flop circuit 785 corresponding to a displayed portion on the X-axis is set every time the addresses (XS, XE) of a processed polygon are inputted to the OR circuit 796. As a result, all outputs of AND circuits 795 show value "0" when all the addresses (XS, XE) of the inputted polygon are included within those provided in set flip-flop circuits 785. Accordingly, an output of the OR circuit 796 shows value "0" so that this polygon is judged as an undisplayed polygon. Thus, the OR circuit 796 gives commands for inhibiting the processing of this polygon to the internal processing circuit 200.

In contrast to this, when there is at least one flip-flop circuit 785 unset with respect to the addresses (XS, XE) of the inputted polygon, the OR circuit 796 outputs value "1" so that this polygon is judged as a displayed polygon. Thus, the OR circuit 796 gives commands for processing this polygon to the internal processing circuit 200.

Another example of the invisible face removing circuit 700 will be further described with reference to FIGS. 75 to 82.

Figure 75:
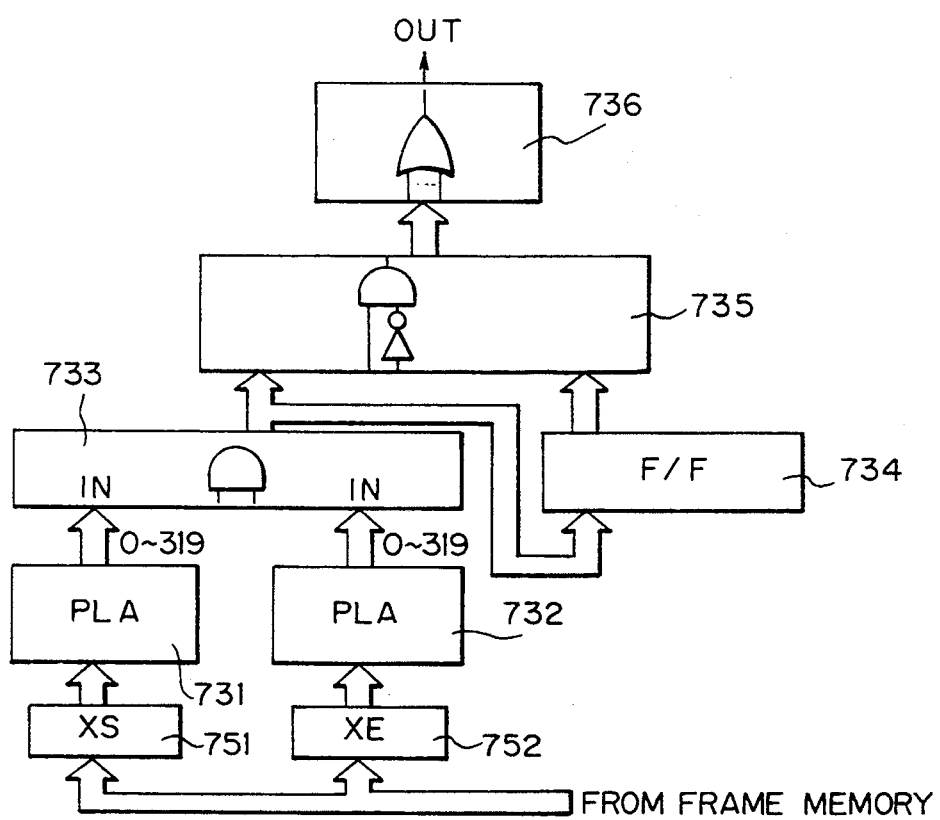
FIG. 75 is a block diagram showing another example of the invisible face removing circuit.

The construction of this invisible face removing circuit 700 will be first described with reference to FIG. 75.

Addresses (XS, XE) of each of polygons read from the frame memory 20 are respectively set by an XS-register 751 and an XE-register 752. Parallel data two-valued with respect to the inputted address XS of the XS-register 751 are inputted to a programmable logic array (PLA) 731. Further, parallel data two-valued with respect to the inputted address XE of the XE-register 752 are inputted to a programmable logic array (PLA) 732.

Figure 76:
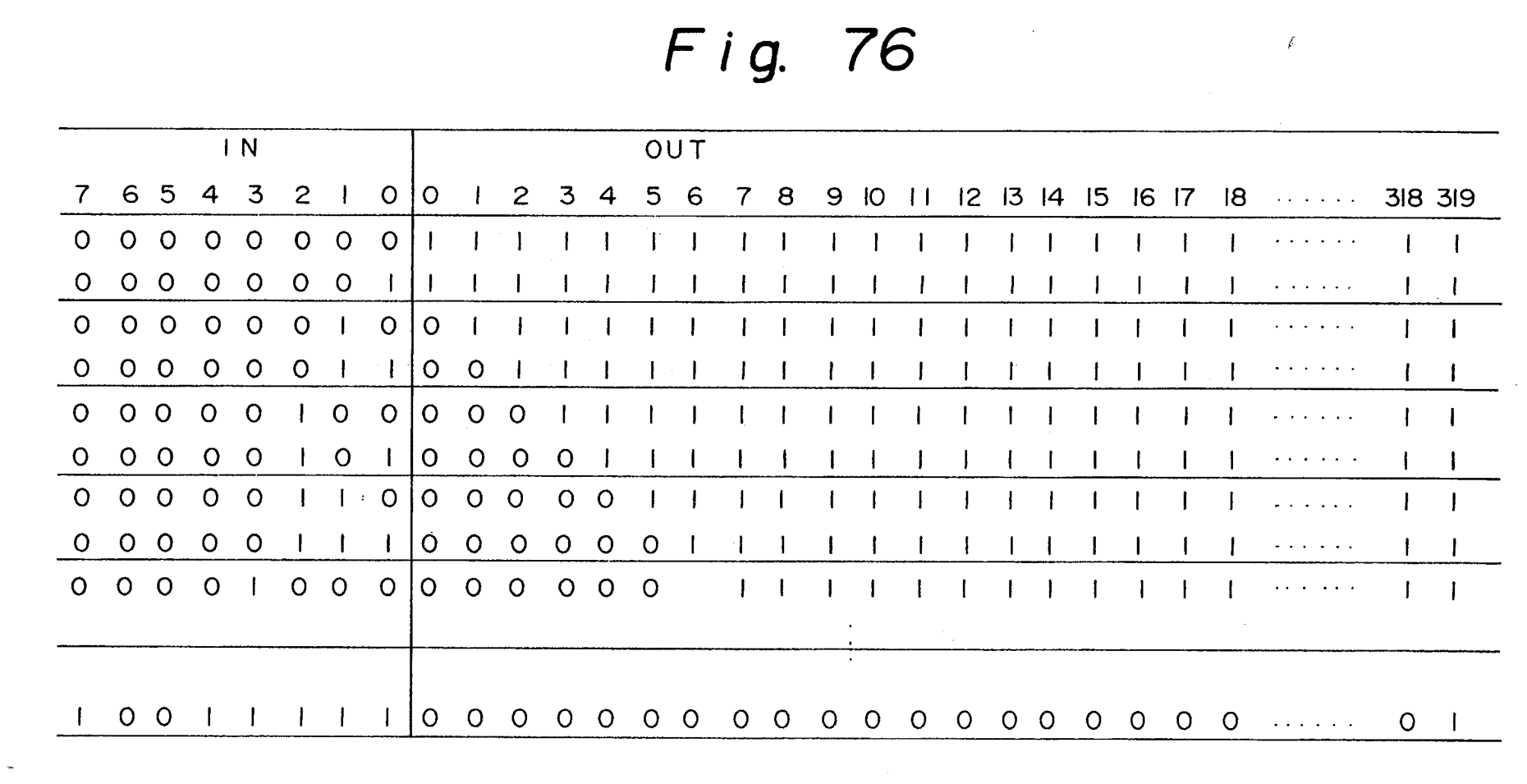

A logical expression based on a truth table shown in FIG. 76 is written to the programmable logic array 731. A logical expression based on a truth table shown in FIG. 77 is written to the programmable logic array 732.

Outputs of the programmable logic arrays 731 and 732 are transmitted to an AND circuit 733 for performing an AND operation thereof. An output of this AND circuit 733 is transmitted to each of an inverter-AND circuit 735 and a flip-flop (F/F) circuit 734. An output of the AND circuit 733 for pre-processing is written to the flip-flop (F/F) circuit 734.

The inverter-AND circuit 735 performs an AND operation with respect to an inverted output provided by inverting an output of the flip-flop circuit 734 and an output of the AND circuit 733. Outputs of this inverter-AND circuit 735 are transmitted to an OR circuit 736.

The OR circuit 736 performs a logical OR operation with respect to the outputs of the inverter-AND circuit 735. In the case of a displayed polygon, at least one of the outputs of the inverter-AND circuit 735 shows value "1". Accordingly, the OR circuit 736 gives commands as the displayed polygon to the internal processing circuit 200 when the OR circuit 736 outputs value "1".

In the case of an invisible polygon, all the outputs of the inverter-AND circuit 735 show value "0". Accordingly, the processing of the internal processing circuit 200 as the invisible polygon is inhibited when the OR circuit 736 outputs value "0".

An operation of the invisible face removing circuit 700 in this embodiment will next be described with reference to a flow chart shown in FIG. 82 and FIGS. 78 to 81.

Figure 78:
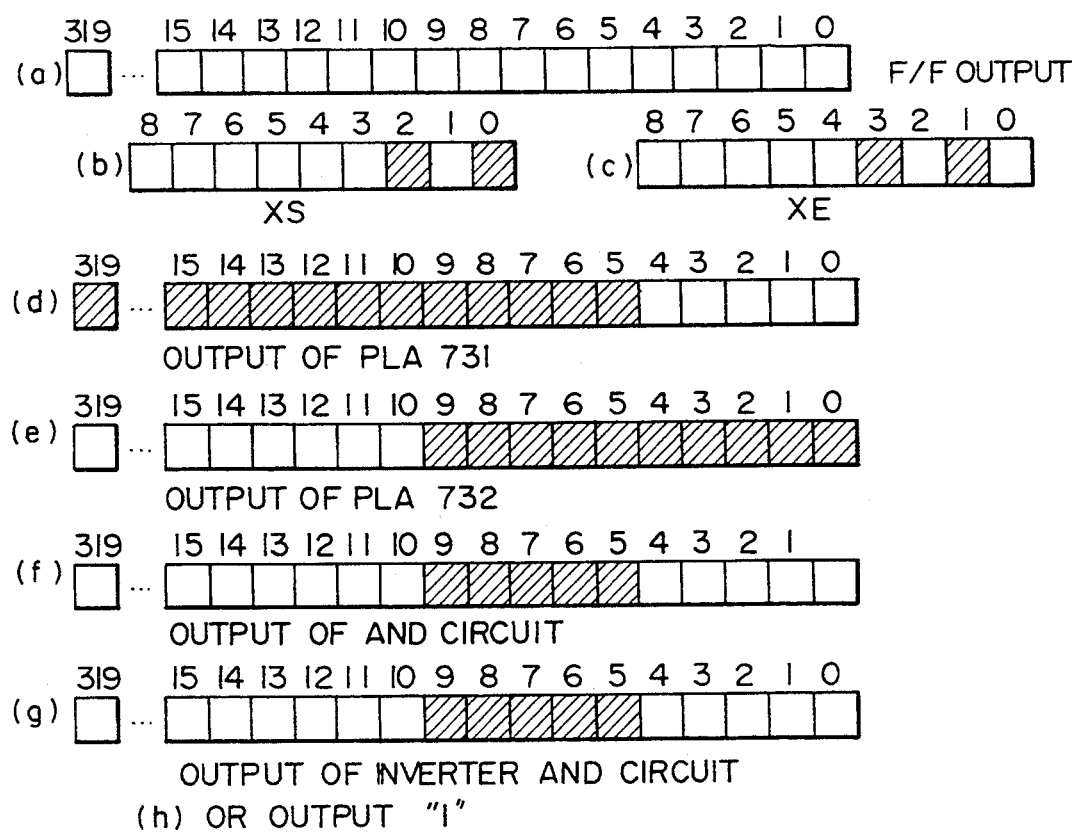
FIG. 78 is a typical view showing concrete examples of data outputted from respective constructional circuit elements of the invisible face removing circuit shown in FIG. 75.
Figure 79:
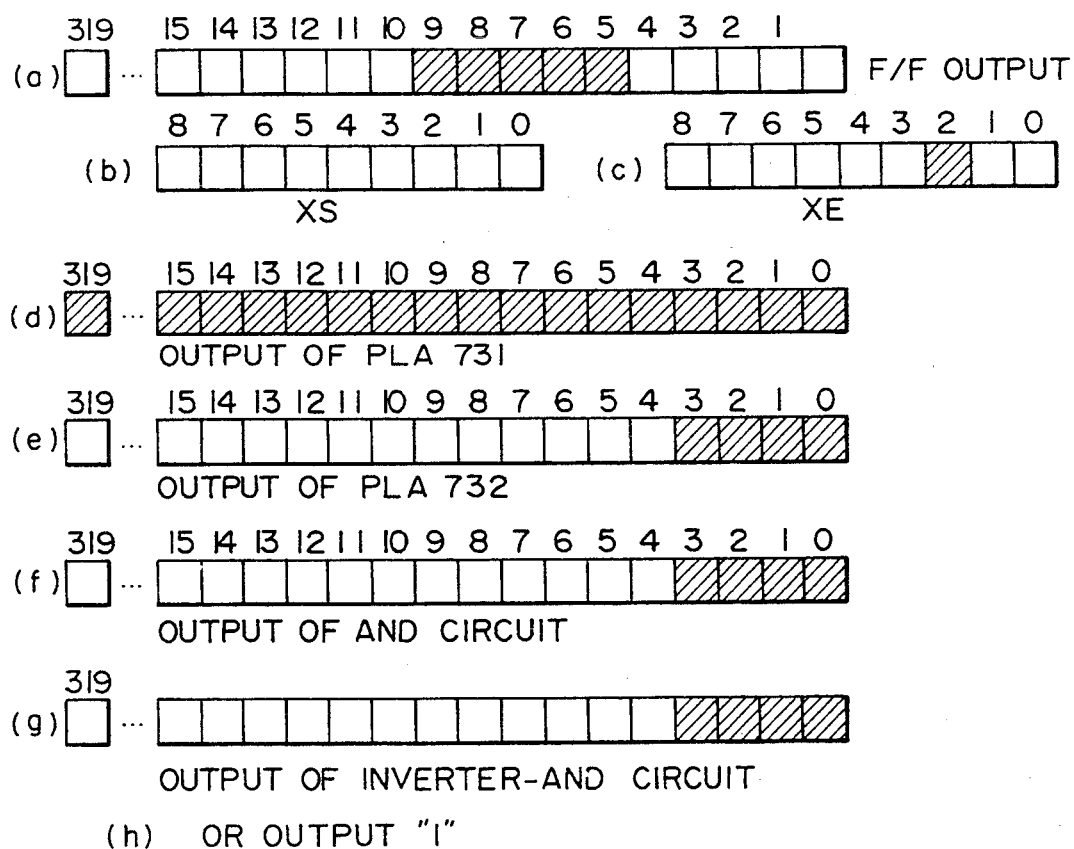
FIG. 79 is a typical view showing concrete examples of data outputted from the respective constructional circuit elements of the invisible face removing circuit shown in FIG. 75.
Figure 80:
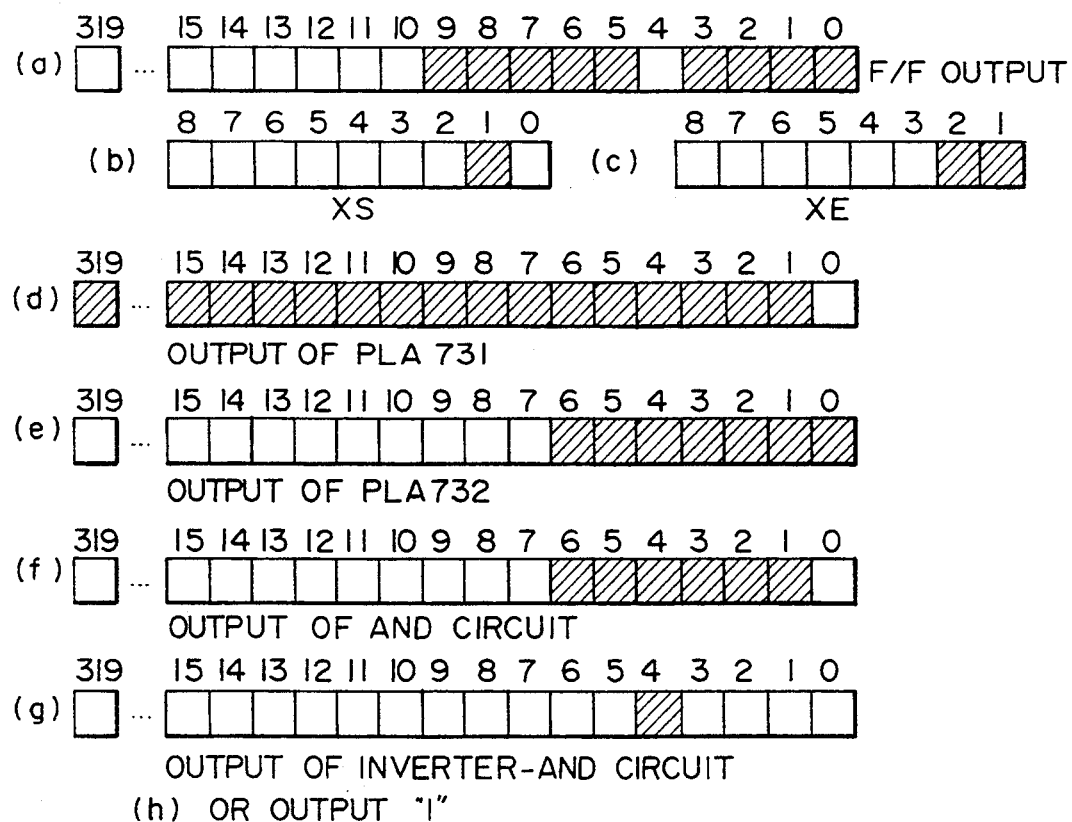
FIG. 80 is a typical view showing concrete examples of data outputted from the respective constructional circuit elements of the invisible face removing circuit shown in FIG. 75.

As shown in FIG. 78, addresses (XS, XE) as (5, 10) of polygon 1 having a smallest Z-value are respectively inputted to the XS-register 751 and the XE-register 752.

Namely, as shown in FIGS. 78(b) and (c), binary data 5 and 10 are respectively stored to the XS-register 751 and the XE-register 752.

The flip-flop circuit 734 is initialized.

As shown in FIG. 78(b), data of the programmable logic array 731 based on the binary data of the XS-register 751 are outputted to the AND circuit 733.

As shown in FIG. 78(e), data of the programmable logic array 732 based on the binary data of the XE-register 752 are outputted to the AND circuit 733.

The AND circuit 733 performs an AND operation between the output data of the programmable logic arrays 731 and 732 and outputs data as shown in FIG. 78(f).

The inverter-AND circuit 735 performs an AND operation with respect to an inverted output of the flip-flop circuit 734 and the output data of the AND circuit 733. Thus, the inverter-AND circuit 735 outputs data as shown in FIG. 78(g).

Accordingly, as shown in FIG. 78(h), an output of the OR circuit 736 shows value "1" and this output value "1" is transmitted to the internal processing circuit 200 as a displayed polygon.

Subsequently, addresses (XS, XE) as (0, 4) of polygon 2 having a small Z-value are respectively inputted to the XS-register 751 and the XE-register 752.

Namely, as shown in FIGS. 79(b) and (c), binary data 0 and 4 are respectively stored to the XS-register 751 and the XE-register 752.

The output of the AND circuit 733 with respect to polygon 1 is stored to the flip-flop circuit 734.

As shown in FIG. 79(b), data of the programmable logic array 731 based on output data of the XS-register 751 are outputted to the AND circuit 733.

As shown in FIG. 79(e), data of the programmable logic array 732 based on output data of the XE-register 752 are outputted to the AND circuit 733.

The AND circuit 733 performs the AND operation between the output data of the programmable logic arrays 731 and 732 and outputs data as shown in FIG. 79(f).

The inverter-AND circuit 735 performs the AND operation with respect to an inverted output of the flip-flop circuit 734 and the output data of the AND circuit 733. Thus, the inverter-AND circuit 735 outputs data as shown in FIG. 79(g).

Accordingly, as shown in FIG. 79(h), an output of the OR circuit 736 shows value "1" and this output value "1" is transmitted to the internal processing circuit 200 as a displayed polygon.

Subsequently, addresses (XS, XE) as (2, 7) of polygon 3 having a small Z-value are respectively inputted to the XS-register 751 and the XE-register 752.

Namely, as shown in FIGS. 80(b) and (c), binary data 2 and 7 are respectively stored to the XS-register 751 and the XE-register 752.

The outputs of the AND circuit 733 with respect to polygons 1 and 2 are stored to the flip-flop circuit 734.

As shown in FIG. 80(b), data of the programmable logic array 731 based on output data of the XS-register 751 are outputted to the AND circuit 733.

As shown in FIG. 80(e), data of the programmable logic array 732 based on output data of the XE-register 752 are outputted to the AND circuit 733.

The AND circuit 733 performs the AND operation between the output data of the programmable logic arrays 731 and 732 and outputs data as shown in FIG. 80(f).

The inverter-AND circuit 735 performs the AND operation with respect to an inverted output of the flip-flop circuit 734 and the output data of the AND circuit 733. Thus, the inverter-AND circuit 735 outputs data as shown in FIG. 80(g).

Accordingly, as shown in FIG. 80(h), an output of the OR circuit 736 shows value "1" and this output value "1" is transmitted to the internal processing circuit 200 as a displayed polygon.

Figure 81:
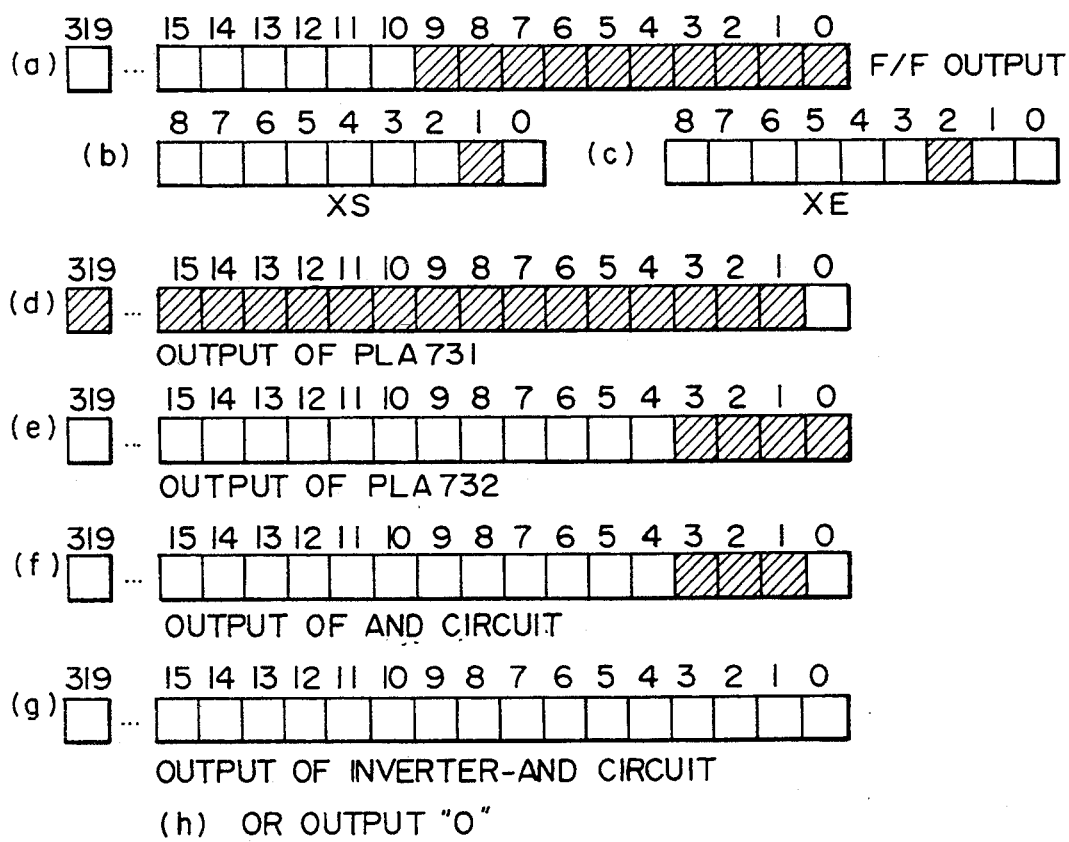
FIG. 81 is a typical view showing concrete examples of data outputted from the respective constructional circuit elements of the invisible face removing circuit shown in FIG. 75.
Figure 82:
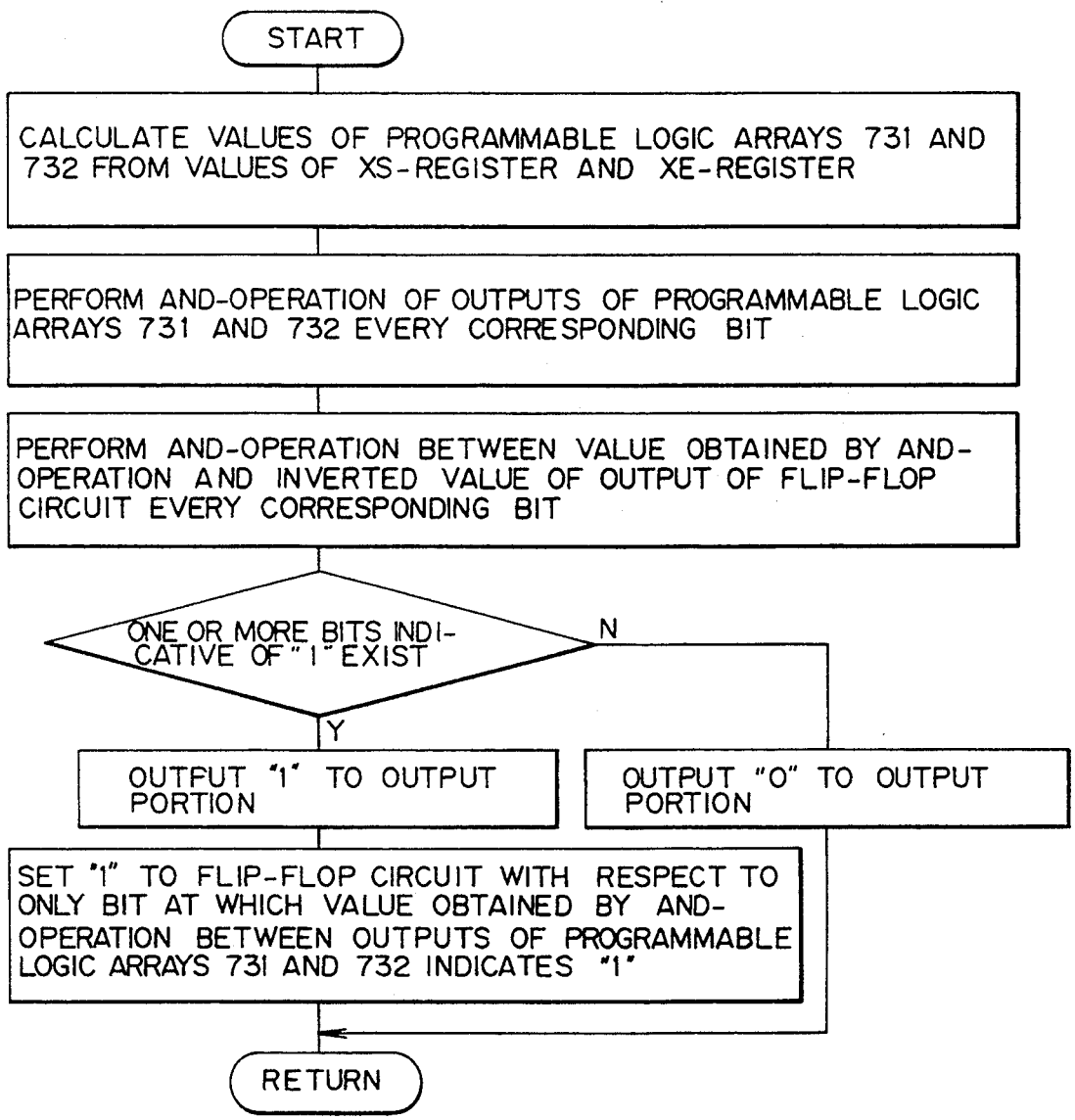
FIG. 82 is a flow chart showing an operation of the invisible face removing circuit shown in FIG. 75.

Finally, as shown in FIG. 81, addresses (XS, XE) as (2, 4) of polygon 4 are respectively inputted to the XS-register 751 and the XE-register 752.

Namely, as shown in FIGS. 81(b) and (c), binary data 2 and 4 are respectively stored to the XS-register 751 and the XE-register 752.

The outputs of the AND circuit 733 with respect to polygons 1, 2 and 3 are stored to the flip-flop circuit 734.

As shown in FIG. 81 (b), data of the programmable logic array 731 based on output data of the XS-register 751 are outputted to the AND circuit 733.

As shown in FIG. 81 (e), data of the programmable logic array 732 based on output data of the XE-register 752 are outputted to the AND circuit 733.

The AND circuit 733 performs the AND operation between the output data of the programmable logic arrays 731 and 732 and outputs data as shown in FIG. 81 (f).

The inverter-AND circuit 735 performs the AND operation with respect to an inverted output of the flip-flop circuit 734 and the output data of the AND circuit 733. Thus, the inverter-AND circuit 735 outputs data as shown in FIG. 81 (g).

Accordingly, as shown in FIG. 81 (h), an output of the OR circuit 736 shows value "0" and this output value "0" is transmitted to the internal processing circuit 200 as an invisible polygon such that the processing of the internal processing circuit 200 is inhibited.

A fourth example of the internal processor having the above invisible face removing circuit 700 will next be described with reference to FIGS. 83 to 94.

In the above first to third examples, image information on one horizontal scanning line are stored to the line buffer memory 351 and are displayed by the CRT 40 through this line buffer memory 351. However, in this fourth example, an image is directly drawn by the CRT 40 from the internal processing circuit 200 by omitting the line buffer memory 351.

Figure 83:
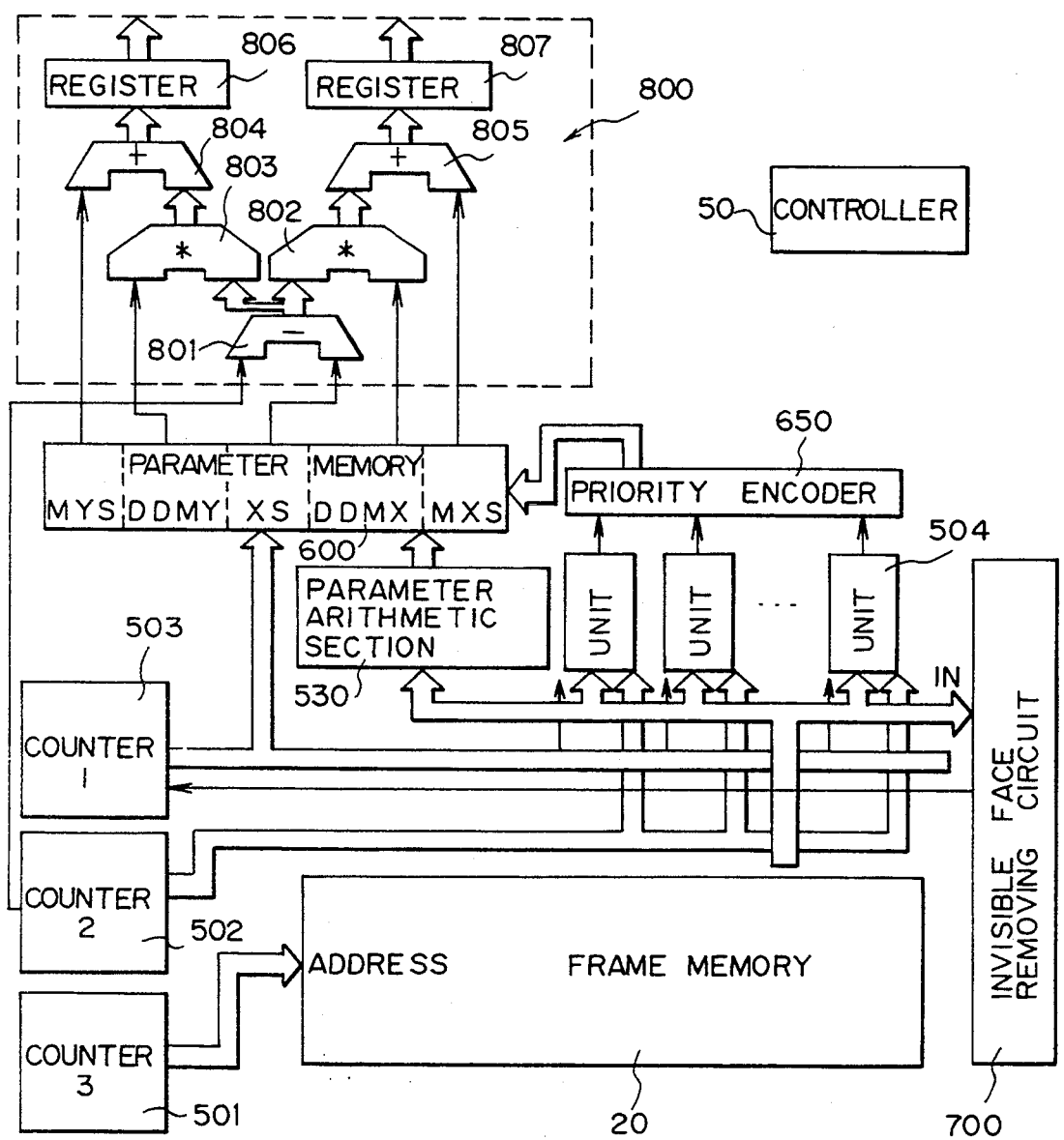
FIG. 83 is a block diagram showing the entire construction of an internal processing circuit used as a fourth example in the present invention.

FIG. 83 is a block diagram showing the entire construction of an internal drawing processor in this fourth example.

Figure 86:
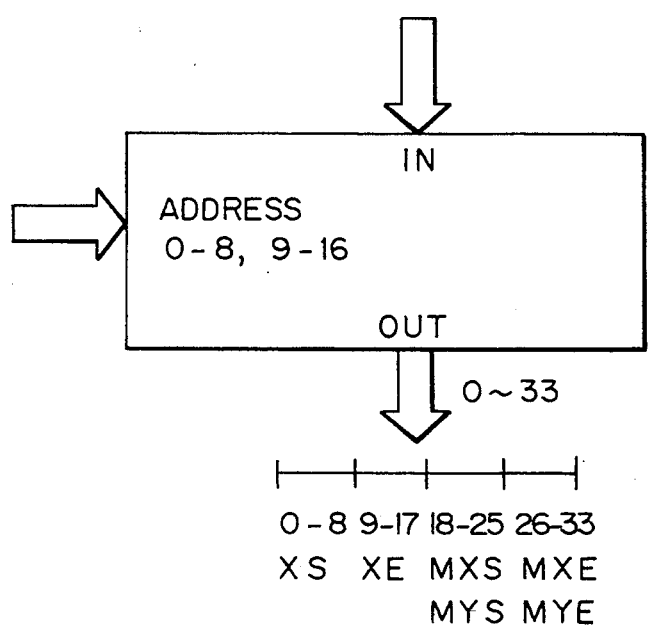
FIG. 86 is a typical view showing the construction of a frame memory disposed in the internal drawing processing circuit used in the fourth example.

Similar to the above case, an invisible face removing circuit 700 judges a polygon to be displayed or undisplayed from X-addresses (XS, XE) at starting and terminal points of a polygonal figure read out of a frame memory 20. In the case of the displayed polygon, a counter 503 counts up and parameters are set in a unit section 504 and a parameter arithmetic section 530. In contrast to this, in the case of the undisplayed polygon, no parameters are set in the unit section 504 and the parameter arithmetic section 530. The frame memory 20 is constructed as shown in FIG. 86 and stores addresses XS, XE, MXS, MYS, MXE and MYE in the order of a smaller Z-value.

In the unit section 504, a unit number corresponds to a sequential number of a Z-value. Each of unit sections 504 has X-addresses (XS, XE) at starting and terminal points of the figure of a polygon having the sequential number of a Z-value corresponding to the unit number of each of units. Each of the unit sections 504 receives a horizontal dot address of a CRT 40 from a counter 502. Information as to whether or not this horizontal dot address is included in the starting point address (XS) and the terminal point address (XE) is transferred from each of the unit sections 504 to a priority encoder 650.

An address of a unit having a highest priority with respect to electric signals transferred from the respective unit sections is transferred from the priority encoder 650 to a parameter memory 600. A logical expression shown by truth values in FIG. 88 is written to the priority encoder 650.

The parameter arithmetic section 530 receives X-addresses (XS, XE) at starting and terminal points of a polygonal figure from the frame memory 20. Further, the parameter arithmetic section 530 receives X and Y addresses (MXS, MXE) and (MYS, MYE) at starting and terminal points of a mapping memory 30. The parameter arithmetic section 530 then reforms these addresses into parameters required for an address complementing processing section 800 and transfers the reformed parameters to the parameter memory 600.

Figure 84:
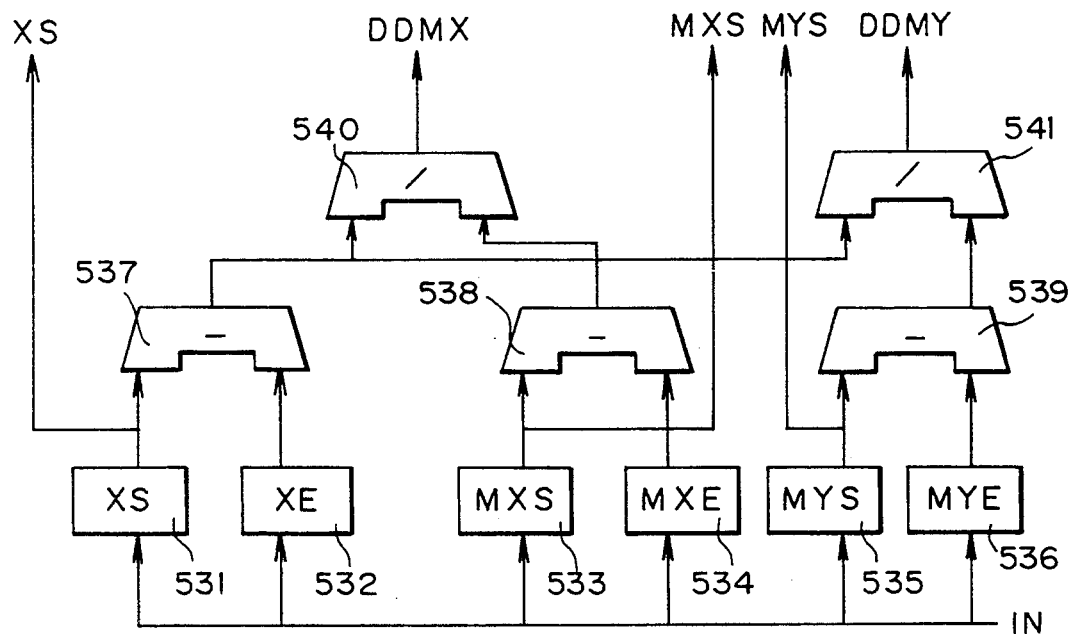
FIG. 84 is a block diagram showing a parameter calculating section disposed in an internal drawing processing circuit used in the fourth example.
Figure 85:
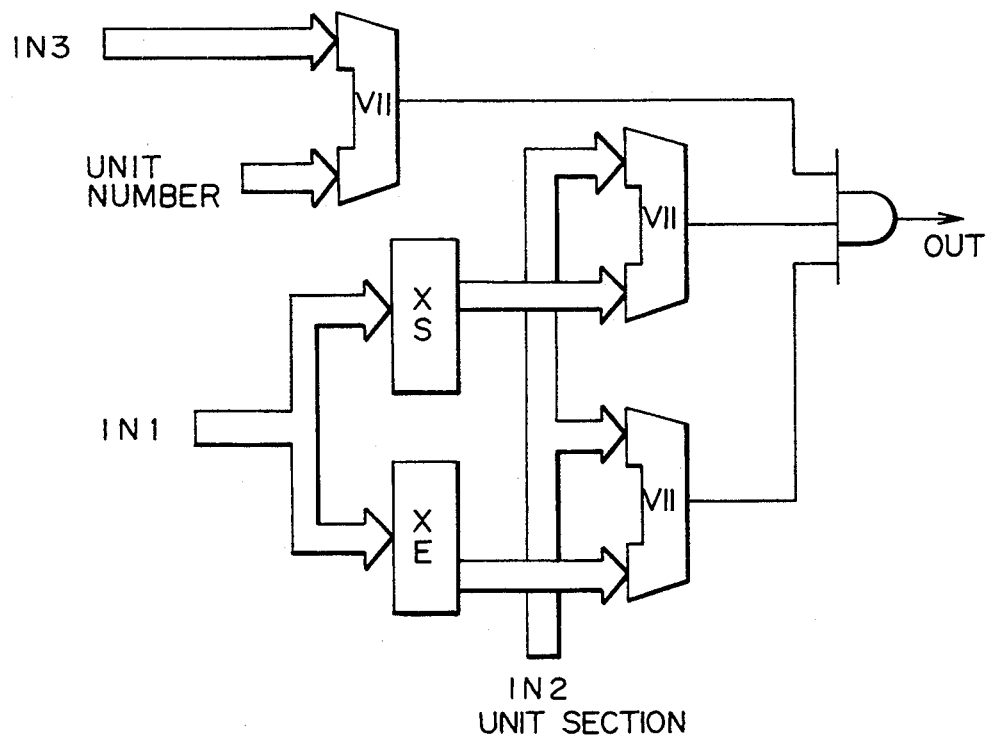
FIG. 85 is a block diagram showing a unit section disposed in the internal drawing processing circuit used in the fourth example.

For example, this parameter arithmetic section 530 is constructed as shown in FIG. 84.

The parameter arithmetic section 530 reads an X-address between two opposite polygonal sides every Y-address and reads addresses (XS, XE, MXS, MXE) of a mapping pattern from the frame memory 20. Namely, in this embodiment, the X-starting point (XS) and the X-terminal point (XE) showing a polygonal outline corresponding to the Y-address as a vertical position, and mapping addresses (MXS, MYS) and (MXE, MYE) provided by deforming a basic pattern are read out of the frame memory 20 in synchronization with a horizontal scanning signal. Then, addresses XS and XE are respectively written to registers 531 and 532. Further, addresses MXS and MXE are respectively written to registers 533 and 534. Further, addresses MYS and MYE are respectively written to registers 535 and 536.

Addresses XS and XE are respectively inputted to a subtracter 537 through registers 531 and 532. A distance DX between these addresses XS and XE is calculated by the subtracter 537 and is transmitted to dividers 540 and 541.

Addresses MXS and MXE are respectively inputted to a subtracter 538 through registers 533 and 534. Subtracted results MXE−MXS of this subtracter 538 are inputted to the divider 540.

Addresses MYS and MYE are respectively inputted to a subtracter 539 through registers 535 and 536. Subtracted results MYE−MYS of this subtracter 539 are inputted to the divider 541.

Figure 87:
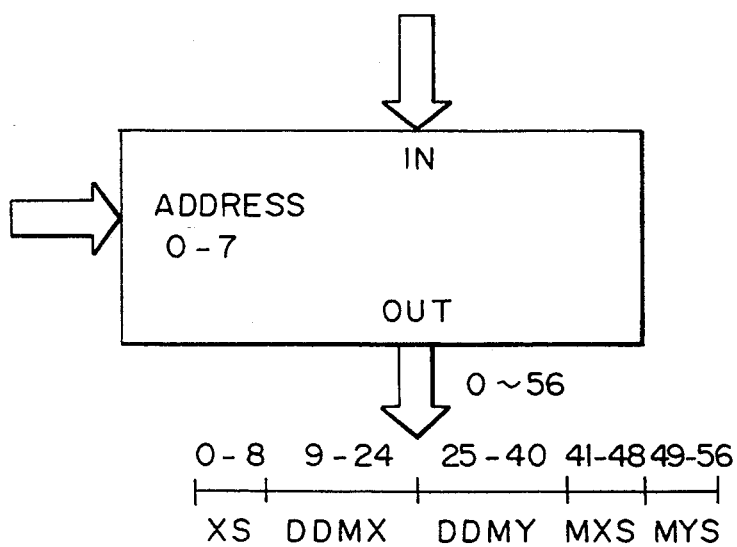
FIG. 87 is a typical view showing the construction of a parameter memory disposed in the internal drawing processing circuit used in the fourth example.

The dividers 540 and 541 respectively calculate (MXE−MXS)/DX and (MYE−MYS)/DX. The divided values DDMX and DDMY and addresses MXS, MYS and XS are written to the parameter memory 600. The parameter memory 600 is constructed as shown in FIG. 87 and stores values XS, DDMX, DDMY, MXS, MYS calculated by the parameter arithmetic section 530 in the order of a smaller Z-value.

The counter 503 counts up by one by receiving an electric signal for setting parameters from the invisible face removing circuit 700. The counter 503 selects a unit section for setting the parameters and indicates an address of the parameter memory 600.

The counter 502 generates and transfers a horizontal dot address of the CRT 40 to all the unit sections 504 and the address complementing processing section 800.

A counter 501 accesses to polygon data of the frame memory 20 by one horizontal line in the order of a smaller Z-value.

The address complementing processing section 800 inputs data XS, DDMX, DDMY, MXS and MYS from the parameter memory 600 and also inputs an X-address value at the present processing point from the counter 502. A subtracter 801 subtracts address XS from the X-address value at the present processing point and outputs this subtracted value to multipliers 802 and 803. DDMX is transmitted from the parameter memory 600 to one input portion of this multiplier 802. The multiplier 802 calculates DDMX* (X-address value at the present processing point −XS). These multiplied results are transmitted to an adder 805. MXS is transmitted from the parameter memory 600 to the adder 805 so that data MXS at an X-starting point are added to the multiplied results of the multiplier 802, thereby making an interpolating calculation. These interpolated data are written to a register 807 and are then transmitted to the CRT 40 through this register 807.

DDMY is transmitted from the parameter memory 600 to one input portion of the multiplier 803. The multiplier 803 calculates DDMY* (X-address value at the present processing point−XS). These multiplied results are transmitted to an adder 804. MYS is transmitted from the parameter memory 600 to the adder 804 so that data MYS at a Y-starting point are added to the multiplied results of the multiplier 803, thereby making an interpolating calculation. These interpolated data are written to a register 806 and are then transmitted to the CRT 40 through this register 806.

An X-address SX as a screen address for displaying data by the CRT 40 is calculated by XS +X.

Operations of the above constructional circuits are controlled by a controller 50 as a whole in accordance with flow charts show in FIGS. 89 to 93.

Figure 89:
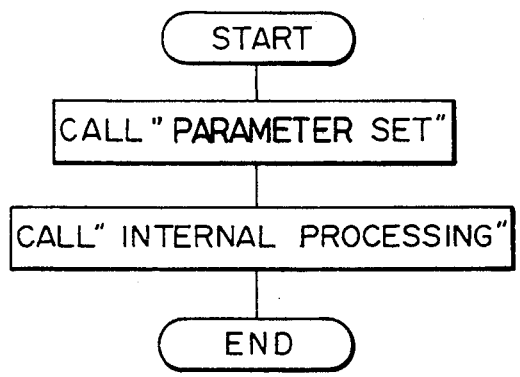
FIG. 89 is a flow chart showing an entire operation of the internal drawing processing circuit used in the fourth example.
Figure 90:
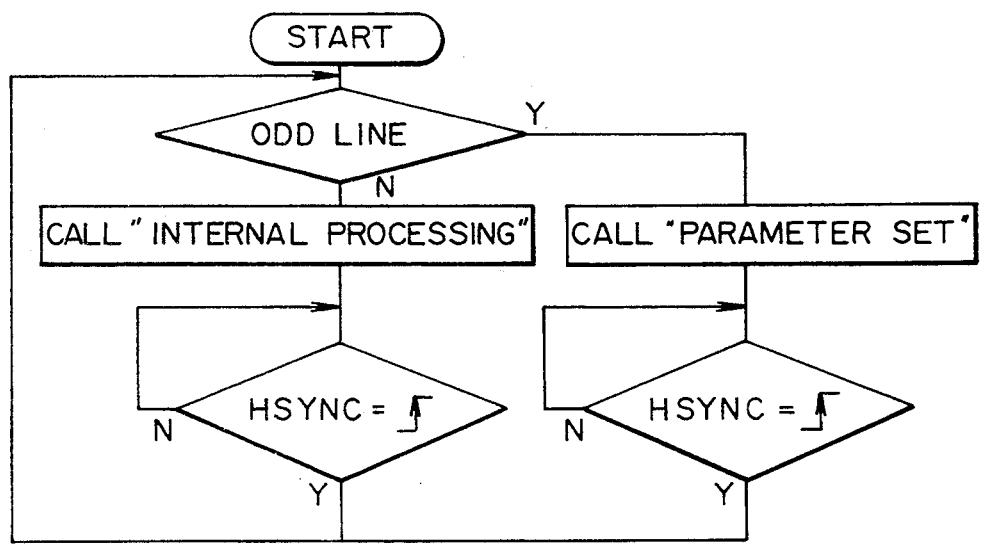
FIG. 90 is a flow chart showing a processing operation of the internal drawing processing circuit used in the fourth example with respect to an odd line.
Figure 91:
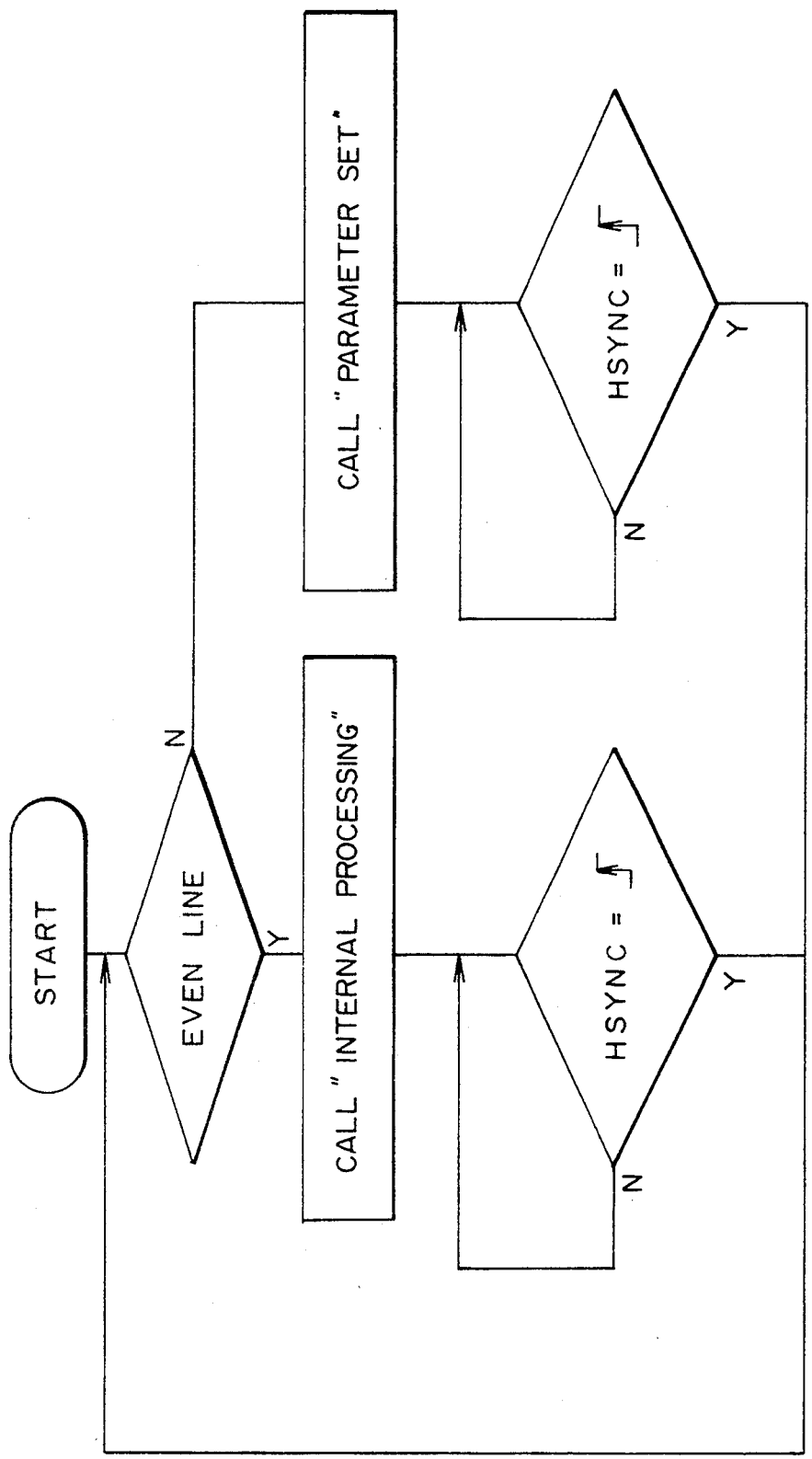
FIG. 91 is a flow chart showing a processing operation of the internal drawing processing circuit used in the fourth example with respect to an even line.

FIG. 89 shows an entire flow chart of the internal drawing processing circuit. Parameters are set for the period of a horizontal retrace line and mapping processing is performed for a displaying period. As shown in FIGS. 90 and 91, when no parameters can be set for the period of a horizontal retrace line, two internal drawing processors equal to each other are arranged and perform an internal drawing operation while odd and even horizontal lines are switched. Thus, the internal drawing processors are used to set all the parameters while the drawing operation is performed on one horizontal line. FIG. 90 shows the internal drawing processing on the odd horizontal line. FIG. 91 shows the internal drawing processing on the even horizontal line.

Figure 92:
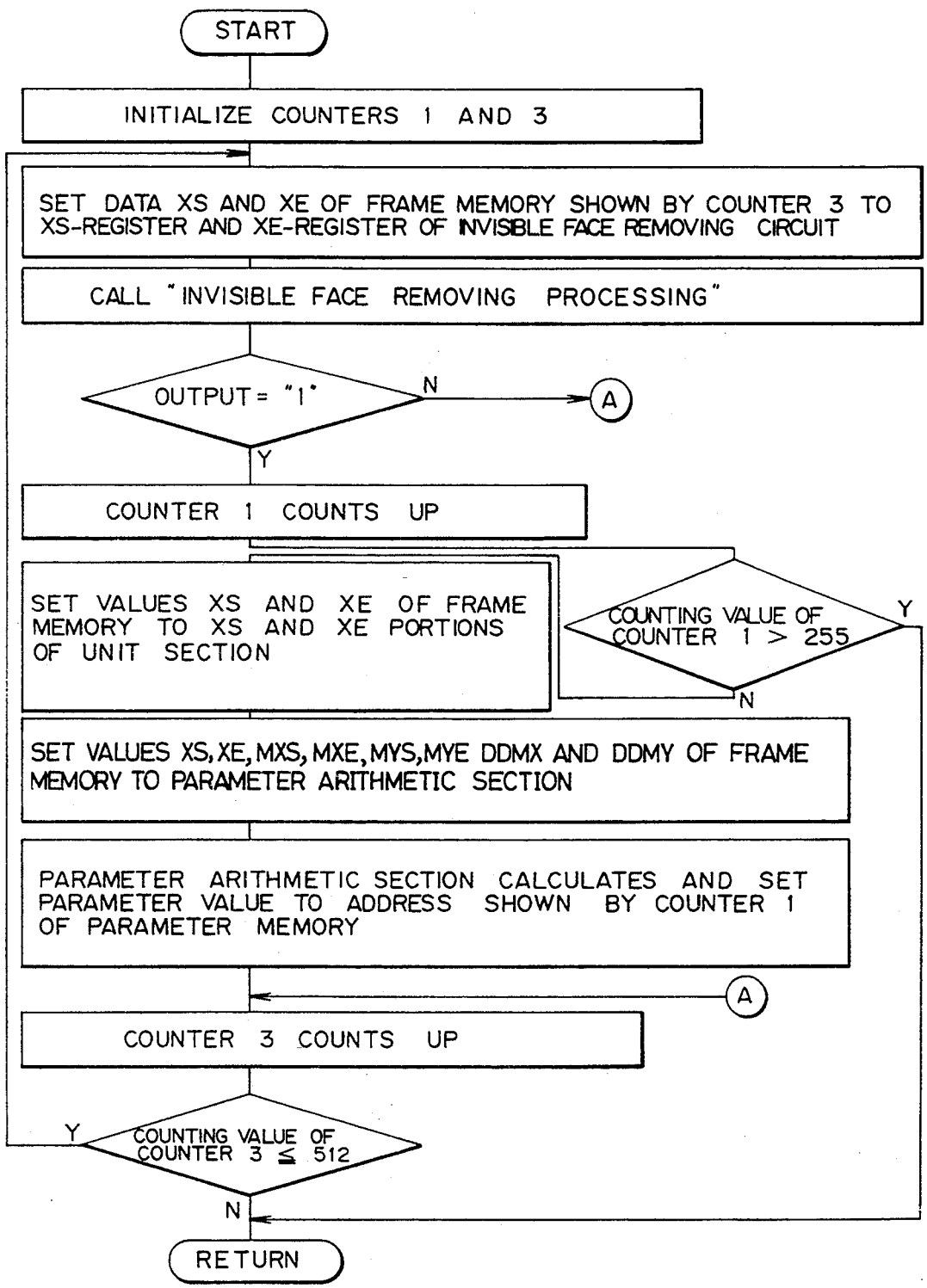
FIG. 92 is a flow chart showing a parameter setting operation of the internal drawing processing circuit used in the fourth example.
Figure 93:
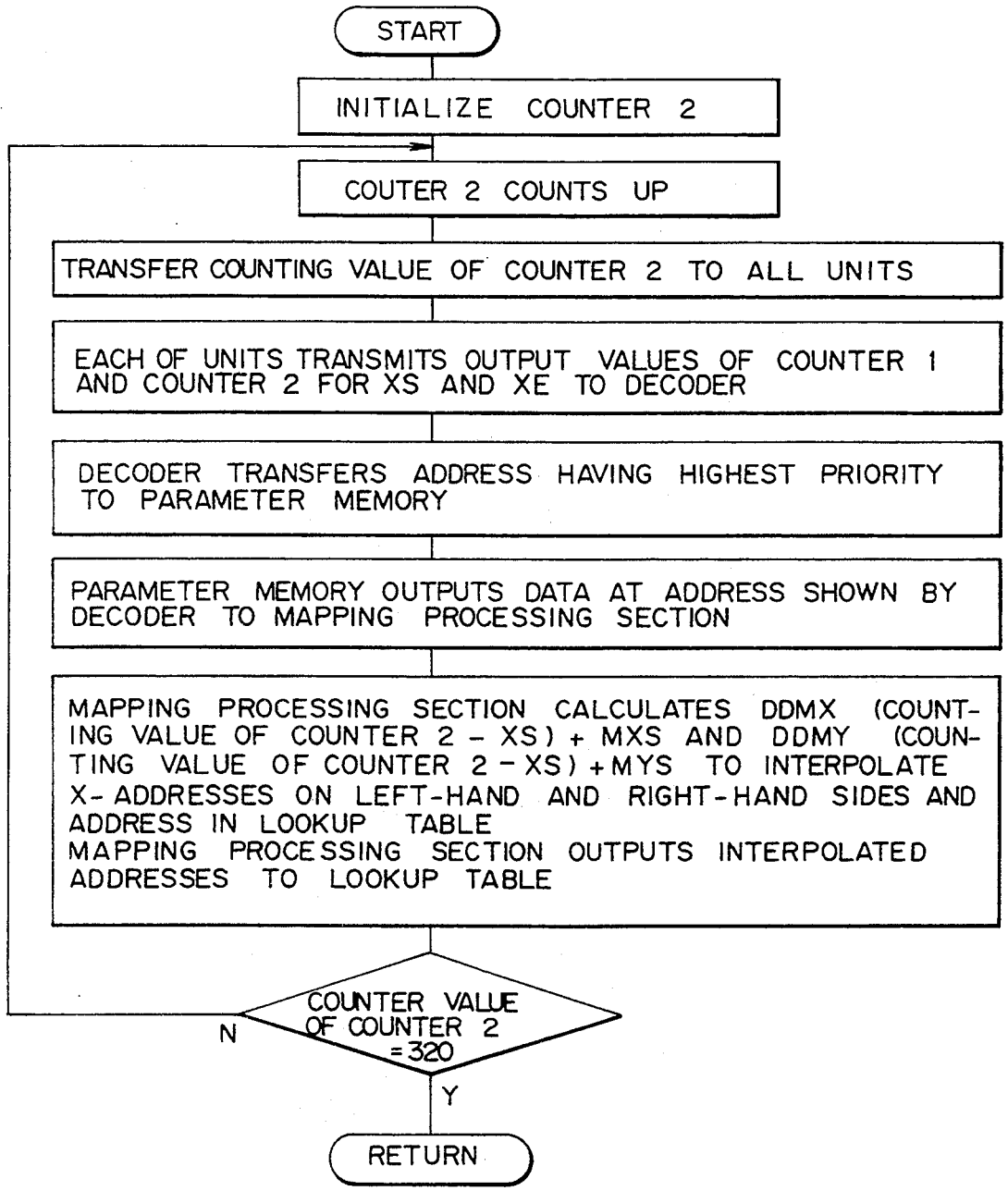
FIG. 93 is a flow chart showing a mapping processing operation of the internal drawing processing circuit used in the fourth example.

FIG. 92 is a flow chart for setting parameters.

As shown in this flow chart, only a polygon processed to remove an invisible face and having at least one displayed dot is inputted to the unit sections 504 and the parameter arithmetic section 530 with respect to 512 polygons stored to the frame memory 20 in the order of a smaller Z-value. The parameter arithmetic section 530 calculates and stores parameters to the parameter memory 600 shown by the counter 503. The drawing processing is completed when such a polygon is completely inputted to all the unit sections 504 such as 255 unit sections with respect to all the polygons of the frame memory 20.

In FIG. 1, value 5 is set as an X-address XL at a starting point of the figure of polygon 1. Value 10 is set as an X-address XR at a terminal point of this polygonal figure. An output of a first programmable logic array (PLA) is provided at the X-address XL. An output of a second programmable logic array (PLA) is provided at the X-address XR. An output of an AND circuit is provided by performing an AND operation with respect to these two outputs. No polygons 129 and 130 are displayed if the number of units is limited to 128 in the general image processor. However, in the present processing system, if information of polygons 1 to 130 are stored to an edge memory, no polygons 5 and 7 to 128 are counted even when the number of units is limited to 128. Accordingly, polygons 129 and 130 can be displayed.

An example of the internal processor performing the mapping of the repetitive pattern will next be described.

Figure 99:
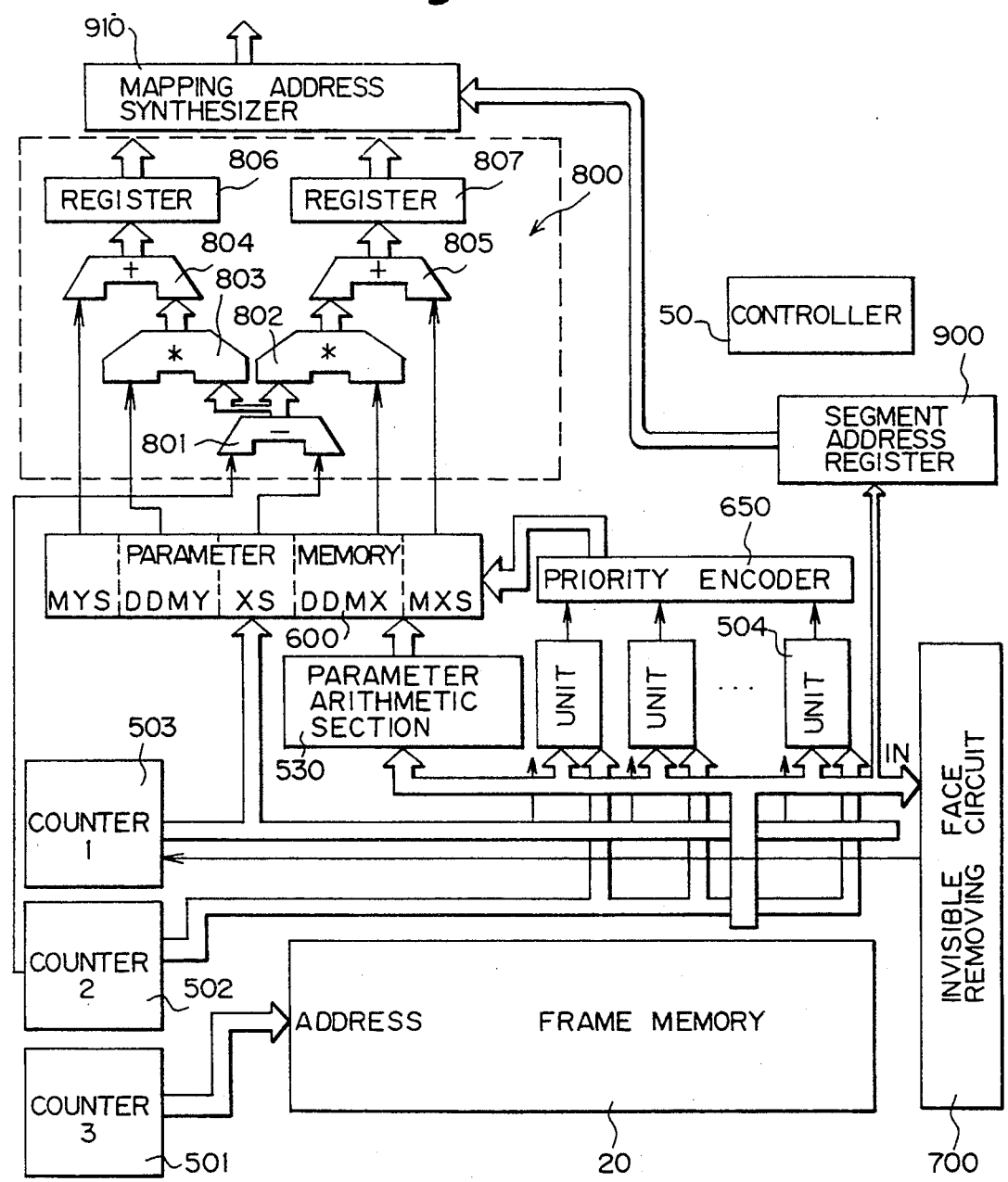
FIG. 99 is a block diagram showing the entire construction of an internal processing circuit used as a fifth example in the present invention.

FIG. 99 is a block diagram showing the entire construction of an internal drawing processor in this example.

A frame memory 20 is constructed as shown in FIG. 104 and stores screen X addresses of left-hand and right-hand intersection points and X and Y addresses of left-hand and right-hand intersection points of the mapping memory 30 corresponding to polygonal figure in the order of a smaller Z-value.

In the unit section 504, a unit number corresponds to a sequential number of a Z-number. Each of unit sections 504 has X-addresses of right-hand and left-hand sides of the figure of a polygon having the sequential number of a Z-value corresponding to the unit number of each of units. Each of the unit sections 504 receives a horizontal dot address of a CRT 40 from a counter 502. Information as to whether or not this horizontal dot address is included in the X-addresses of the right-hand and the left-hand sides is transferred from each of the unit sections 504 to a priority encoder 650.

An address of a unit having a highest priority with respect to electric signals transferred from the respective unit sections is transferred from the priority encoder 650 to a parameter memory 600.

The parameter arithmetic section 530 receives X-addresses of right-hand and left-hand sides of polygonal figure and X-addresses of X-addresses of right-hand and left-hand sides of the mapping memory 30 from the frame memory 20. The parameter arithmetic section 530 then reforms these addresses into parameters required for an address complementing processing section 800 and transfers the reformed parameters to the parameter memory 600.

The counter 503 counts up to select a unit section for setting the parameters and indicate an address of the parameter memory 600.

The counter 502 generates and transfers a horizontal dot address of the CRT 40 to all the unit sections 504 and the address complementing processing section 800.

The counter 501 accesses to a polygon of the frame memory 20 in the order of a smaller Z-value.

The parameter memory 600 stores values of XL, DIX and IL calculated in the parameter arithmetic section 530 in the order of a smaller Z-value.

The mapping address complementing processing section 800 interpolates addresses of the mapping memory 30 of horizontal line address designated by the counter 502 from the X-addresses of right-hand and left-hand sides of the polygonal figure and addresses of right-hand and left-hand sides of mapping memory 30.

A segment address register 900 stores upper bits of the addresses of pattern of the mapping memory 30.

A mapping address synthesizer 910 synthesizes a corrected mapping address from the values of the segment address register 900 and the value of mapping address according to a designated mode as shown in FIG. 100 in the case that the polygon to be displayed is a tile mapping polygon, that is a mapping by repititive pattern.

Figure 101:
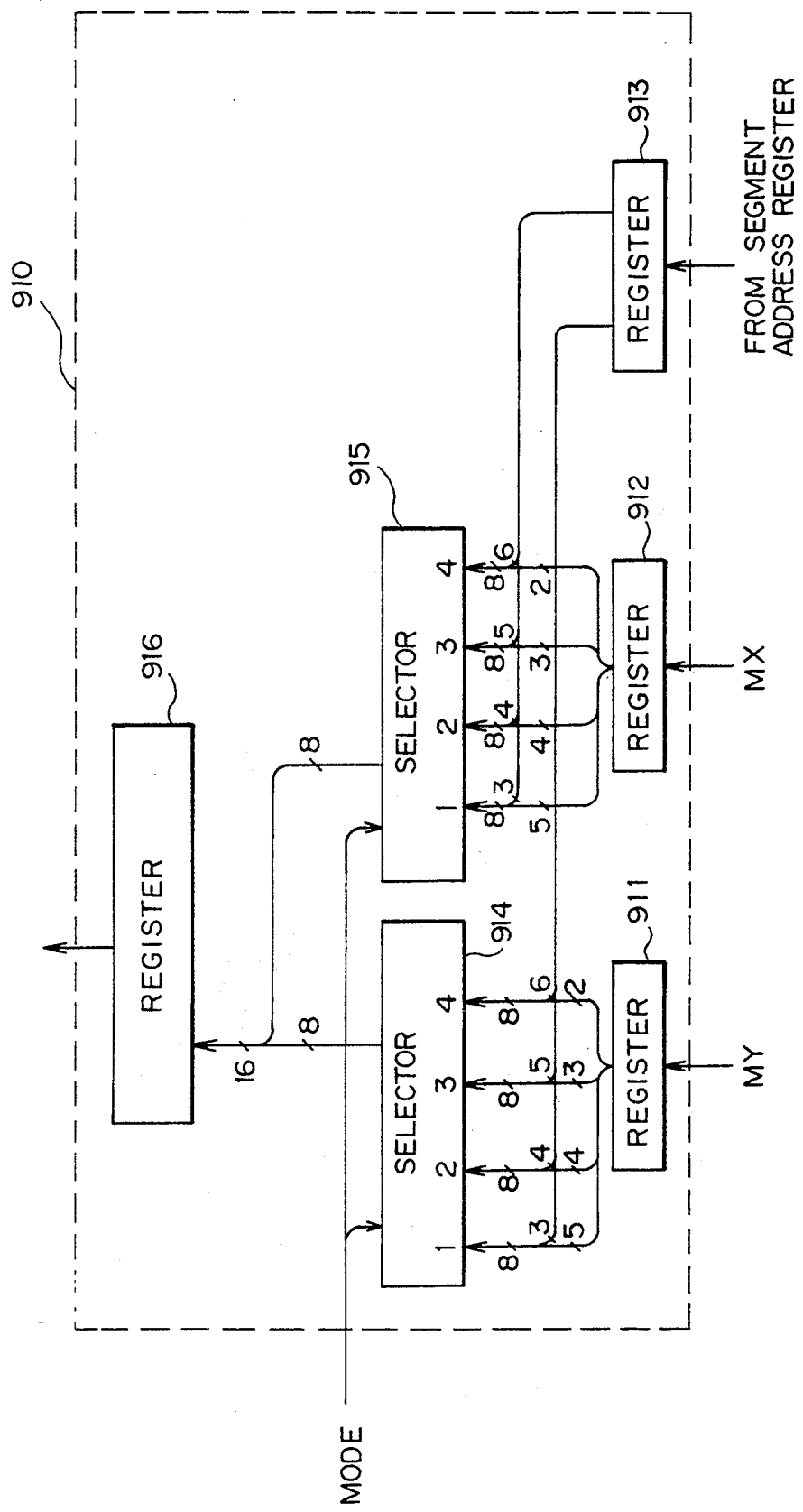
FIG. 101 is a block diagram showing a mapping address synthesizer in FIG. 99.

FIG. 101 is a block diagram showing the entire construction of the mapping address synthesizer 910.

A register 911 stores upper eight bits of the address of the mapping memory 30 sent from the mapping address complementing processing section 800.

A register 912 stores lower eight bits of the address of the mapping memory 30 sent from the mapping address complementing processing section 800.

A register 913 stores a segment value of the address of the mapping memory 30 sent from the segment address register 900.

A selector 914 selects one set of 8 bit data synthesized from the values of the registers 911 and 913 according to the mode as shown in FIG. 100 and sends the selected set of 8 bits data to an upper portion of a register 916.

A selector 915 selects one set of 8 bit data synthesized from the values of the registers 912 and 913 according to the mode as shown in FIG. 100 and sends the selected set of 8 bits data to a lower portion of the register 916.

The register 916 combines two set of 8 bit data from the selectors 914 and 915 and stores it as an address of the mapping memory 30.

Operations of the above constructional circuits are controlled by a controller 50 as a whole in accordance with flow charts shown in FIGS. 89, 90, 91, 102 and 103.

FIG. 89 shows an entire flow chart of the internal drawing processing circuit of this example. Parameters are set for the period of a horizontal retrace line and mapping processing is performed for a displaying period. As shown in FIGS. 90 and 91, when no parameters can be set for the period of a horizontal retrace line, two internal drawing processors equal to each other are arranged and perform an internal drawing operation while odd and even horizontal lines are switched.

Figure 102:
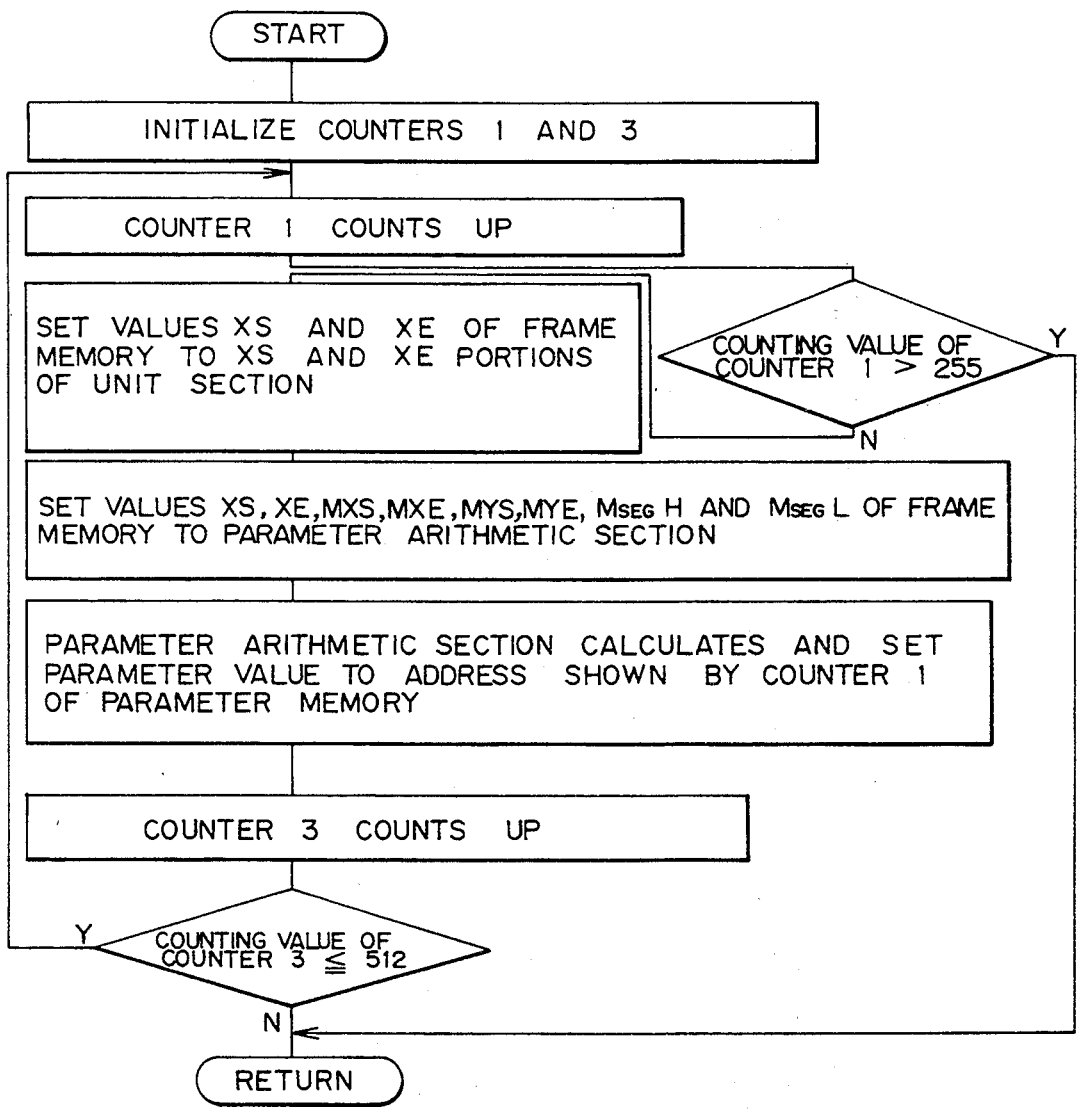
FIG. 102 is a flow chart showing a parameter setting operation of the internal drawing processing circuit used in the fifth example.

FIG. 102 is a flow chart for setting parameters.

As shown in this flow chart, a polygon is inputted to the unit section 504 and the parameter arithmetic section 530 with respect to 512 polygons stored to the frame memory 20 in the order of a smaller Z-value. The parameter arithmetic section 530 calculates and stores parameters to the parameter memory 600 shown by the counter 503. The processing is completed when a polygon is completely inputted to all the unit sections 504 such as 255 unit sections with respect to all the polygons of the frame memory 20.

Figure 103:
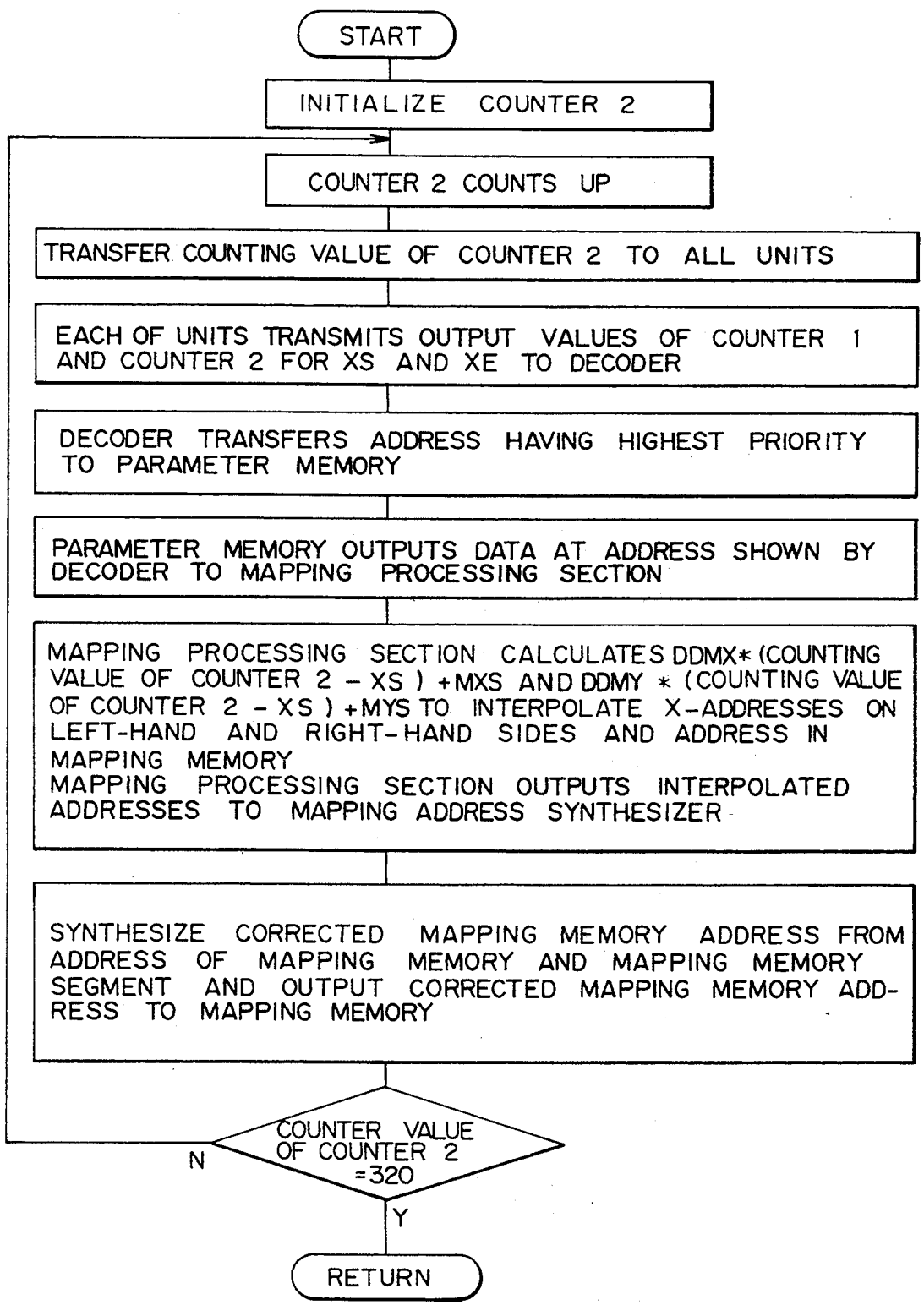
FIG. 103 is a flow chart showing a mapping processing operation of the internal drawing processing circuit used in the fifth example.

FIG. 103 is a flow chart for a mapping processing operation in this embodiment.

As mentioned above, in accordance with the present invention, X and Y addresses of an outline of a figure are calculated on the basis of information from an end point memory. Internal image data can be calculated from information between these two calculated address points. Accordingly, the number of accesses with respect to the end point memory can be greatly reduced so that mapping processing can be performed at a high speed.

Further, in accordance with the present invention, only a displayed polygon is selected by an invisible face removing means based on information from the end point memory. Accordingly, image processing is performed without any restriction of an undisplayed polygon. Therefore, the polygon can be processed even when polygonal information exceeding allowable polygonal information set by performance of the image processor are stored to a memory.

Many widely different embodiments of the present invention may be constructed without departing from the spirit and scope of the present invention. It should be understood that the present invention is not limited to the specific embodiments described in the specification, except as defined in the appended claims.

What is claimed is:

1. An image processor comprising:
   an end point memory for storing two end point information of a polygon and respective end point information of internal pattern information;
   outline processing means for performing outline processings of address information of an outline of the polygon and the internal pattern information corresponding to the polygon on the basis of the two end point information and the respective end point information of the internal pattern information from said end point memory;
   internal figure-drawing processing means for calculating an address between two opposite polygonal sides calculated by said outline processing means on the basis of the outline address information, said internal figure-drawing processing means calculating an address of the internal pattern information corresponding to the polygonal outline; and
   display means for displaying image information;
   the image processor being constructed such that an image is displayed by deforming an internal pattern shown by the internal pattern information based on contour point information of a supplied figure.

2. An image processor as claimed in claim 1, wherein said internal pattern information comprises brightness information data and the internal pattern is additionally shaped in accordance with a polygonal shape.

3. An image processor as claimed in claim 1, wherein said internal pattern information comprises color information data of red, green and blue and the polygonal interior is filled with a color by changing the color in accordance with a polygonal shape.

4. An image processor as claimed in claim 1, wherein said outline processing means has a polygonal outline processing section for performing the outline processing of the outline of the polygon and an internal pattern outline processing section for performing the outline processing of the internal pattern information of the polygon.

5. An image processor as claimed in claim 4, wherein said polygonal outline processing section comprises:
   a differential circuit for substracting a starting point address from a terminal point address thereof on each of polygonal sides to provide a first subtracted value;

a differential arithmetic circuit for subtracting the starting point address thereof to provide a second subtracted value, said differential arithmetic circuit dividing the second subtracted value by said first subtracted value; and an interpolating arithmetic circuit for adding said divided value of the differential arithmetic circuit to an initial value; and said internal pattern outline processing section comprises:

differential arithmetic circuit for subtracting a starting point address from a terminal point address with respect to the internal pattern information at end points on each of the polygonal sides to provide a third subtracted value, said differential arithmetic circuit dividing the third subtracted value by the first subtracted value calculated by said polygonal outline processing section; and an interpolating arithmetic circuit for adding said divided value of the differential arithmetic circuit to an initial value of the internal pattern information.

6. An image processor as claimed in claim 1, wherein said internal figure-drawing processing means comprises:

a differential circuit for subtracting a starting point address from a terminal point address thereof on each of polygonal sides to provide a first differential value;

a differential arithmetic circuit for subtracting a starting point address from a terminal point address with respect to the internal pattern information at end points on each of the polygonal sides to provide a second differential value;

the differential arithmetic circuit dividing the second differential value by the first differential value calculated by said differential circuit; and an interpolating arithmetic circuit for adding said divided value of the differential arithmetic circuit to an initial value of the internal pattern information.

7. An image processor as claimed in claim 1, wherein said internal figure-drawing processing means includes:

a segment address register for storing a portion of an address of a pattern of a mapping memory; and mapping address synthesizing means for synthesizing a mapping address from said portion of the address of the pattern of the mapping memory sent from the segment address register.

8. An image processor comprising:

a mapping memory for storing a basic pattern;

an end point memory for storing two end point information of a polygon and respective end point information of internal pattern information;

outline processing means for performing outline processings of address information of an outline of the polygon and mapping pattern information corresponding to the polygon on the basis of predetermined addresses of the two end point information from said end point memory and respective end point information of the mapping pattern information;

internal figure-drawing processing means for calculating an address between two opposite polygonal sides calculated by said outline processing means on the basis of the outline address information, said internal figure-drawing processing means calculating an address of the mapping pattern information corresponding to the polygonal outline; and display means for displaying image information;

the image processor being constructed such that an image signal is outputted by deforming the basic pattern of the mapping memory based on contour point information of a supplied figure.

9. An image processor as claimed in claim 8, wherein said internal figure-drawing processing means includes:

a segment address register for storing a portion of an address of the basic pattern of the mapping memory; and mapping address synthesizing means for synthesizing a mapping address from said portion of the address of the pattern of the mapping memory sent from the segment address register.

10. An image processor comprising:

an end point memory for storing two end point information of a polygon and data indicative of a priority of the polygon;

outline processing means for calculating address information of an outline of the polygon based on a predetermined address of the two end point information from said end point memory;

invisible face removing means for inputting an address between two opposite polygonal sides calculated by said outline processing means in the order of a higher priority;

said invisible face removing means judging and selecting a visible or invisible polygon based on the address between two opposite polygonal sides of the outline of the polygon;

internal figure-drawing processing means for calculating polygonal internal information corresponding to the polygonal outline based on said outline address information; and display means for displaying image information;

the image processor being constructed such that the polygonal internal information are calculated by said internal figure-drawing processing means to output an image signal with respect to only a polygon judged as the visible polygon by said invisible face removing means.

11. An image processor as claimed in claim 10, wherein said invisible face removing means comprises:

memory means for storing a starting point address and a terminal point address as the address between two opposite polygonal sides calculated by the outline processing means;

first comparing means for comparing a starting point address of an inputted polygon with the starting point address stored in said memory means;

second comparing means for comparing a terminal point address of the inputted polygon with the terminal point address stored in said memory means;

means for rewriting the starting point address stored in said memory means to be the starting point address of the inputted polygon when the starting point address of said inputted polygon is smaller than the starting point address stored in said memory means; and means for rewriting the terminal point address stored in said memory means to be the terminal point address of the inputted polygon when the terminal point address of said inputted polygon is greater than the terminal point address stored in said memory means; and the inputted polygon is judged as the invisible polygon when the starting point address of said inputted polygon is greater than the starting point address stored in the memory means and the terminal point address of said inputted polygon is smaller than the terminal point address stored in the memory means.

12. An image processor as claimed in claim 10, wherein said internal figure-drawing processing means includes:
- a segment address register for storing a portion of an address of a pattern of a mapping memory; and
- mapping address synthesizing means for synthesizing a mapping address from said portion of the address of the pattern of the mapping memory sent from the segment address register.

13. An image processor comprising:
- an end point memory for storing two end point information of a polygon and data indicative of a priority of the polygon;
- outline processing means for calculating address information of an outline of the polygon crossing each of a plurality of horizontal scanning lines based on a predetermined address of the two end point information from said end point memory;
- memory means for storing an address between two opposite polygonal sides calculated by said outline processing means together with the priority;
- invisible face removing means for inputting the address between the two opposite polygonal sides from the memory means in the order of a higher priority;
- said invisible face removing means judged and selecting a visible or invisible polygon based on the address between two opposite polygon sides of the polygonal outline;
- internal figure-drawing processing means for calculating polygonal internal information corresponding to the polygonal outline based on said outline address information; and
- display means for displaying image information;

the image processor being constructed such that the polygonal internal information are calculated said internal figure-drawing processing means to output an image signal with respect to only a polygon judged as the visible polygon by said invisible face removing means.

14. An image processor as claimed in claim 13, wherein said invisible face removing means comprises:
- memory means for storing a starting point address and a terminal point address of an inputted polygon;
- a first logic circuit for indicating a region from a first directional position to a position of the starting point address with data stored in said memory means as an address;
- a second logic circuit for indicating a region from a second directional position to a position of the terminal point address with data stored in said memory means as an address;
- first logical product means for carrying out a logical product between outputs of the first and second logic circuits;
- a flip-flop circuit for sequentially inputting data from the first logical product means;
- second logical product means for carrying out a logical product between an inverted output of the flip-flop circuit and an output of the first logical product means; and
- logical sum means for carrying out a logical sum between outputs of the second logical product means.

15. An image processor as claimed in claim 13, wherein said internal figure-drawing processing means includes:
- a segment address register for storing a portion of an address of a pattern of a mapping memory; and
- mapping address synthesizing means for synthesizing a mapping address from said portion of the address of the pattern of the mapping memory sent from the segment address register.

* * * * *